(12) United States Patent
Warden et al.

(10) Patent No.: US 12,440,377 B2
(45) Date of Patent: Oct. 14, 2025

(54) EYE STENTS AND DELIVERY SYSTEMS AND METHODS

(71) Applicant: Aquea Health, Inc., San Francisco, CA (US)

(72) Inventors: Charles Warden, Hillsborough, CA (US); Anand Doraiswamy, Dallas, TX (US)

(73) Assignee: Aquea Health, Inc., Hillsborough, CA (US)

( * ) Notice: Subject to any disclaimer, the term of this patent is extended or adjusted under 35 U.S.C. 154(b) by 0 days.

(21) Appl. No.: 18/946,868

(22) Filed: Nov. 13, 2024

(65) Prior Publication Data

US 2025/0143926 A1    May 8, 2025

Related U.S. Application Data

(63) Continuation of application No. PCT/US2024/054604, filed on Nov. 5, 2024.

(60) Provisional application No. 63/654,008, filed on May 30, 2024, provisional application No. 63/596,496, filed on Nov. 6, 2023.

(51) Int. Cl.
  *A61F 9/007* (2006.01)
  *A61F 2/966* (2013.01)

(52) U.S. Cl.
  CPC .......... *A61F 9/00781* (2013.01); *A61F 2/966* (2013.01); *A61F 2230/0091* (2013.01)

(58) Field of Classification Search
  CPC ..... A61F 9/00781; A61F 2/95; A61B 17/3421
  See application file for complete search history.

(56) References Cited

U.S. PATENT DOCUMENTS

| | | | |
|---|---|---|---|
| 5,180,362 | A | 1/1993 | Worst |
| 5,733,329 | A | 3/1998 | Wallace et al. |
| 6,214,042 | B1 | 4/2001 | Jacobsen et al. |
| 6,254,592 | B1 | 7/2001 | Samson et al. |
| 6,375,642 | B1 | 4/2002 | Grieshaber et al. |
| 6,464,724 | B1 | 10/2002 | Lynch et al. |
| 6,524,275 | B1 | 2/2003 | Lynch et al. |

(Continued)

FOREIGN PATENT DOCUMENTS

| | | |
|---|---|---|
| CN | 115212029 A | 10/2022 |
| EP | 0898947 A2 | 3/1999 |

(Continued)

OTHER PUBLICATIONS

Co-pending U.S. Appl. No. 17/569,329, inventor Anand; Doraiswamy, filed on Jan. 5, 2022.

(Continued)

*Primary Examiner* — Ariana Zimbouski
(74) *Attorney, Agent, or Firm* — Wilson Sonsini Goodrich & Rosati

(57) ABSTRACT

A device for maintaining patency of a channel of an uveolymphatic region or a Schlemm's canal in a patient's eye may include a single elongated element configured for radial expansion of the channel of the uveolymphatic region or the Schlemm's canal when inserted into the channel, wherein the single elongated element is configured to follow an arc of a circumference of the channel, wherein the arc subtends an angle comprising a degree of arc greater than approximately 75 degrees.

29 Claims, 48 Drawing Sheets

(56) References Cited

U.S. PATENT DOCUMENTS

| | | | |
|---|---|---|---|
| 6,626,858 B2 | 9/2003 | Lynch et al. | |
| 7,412,993 B2 | 8/2008 | Tzeng | |
| 7,740,604 B2 | 6/2010 | Schieber et al. | |
| 7,850,637 B2 | 12/2010 | Lynch et al. | |
| 7,857,782 B2 | 12/2010 | Tu et al. | |
| 7,909,789 B2 | 3/2011 | Badawi et al. | |
| 8,034,105 B2 | 10/2011 | Stegmann et al. | |
| 8,267,882 B2 | 9/2012 | Euteneuer et al. | |
| 8,282,592 B2 | 10/2012 | Schieber et al. | |
| 8,337,509 B2 | 12/2012 | Schieber et al. | |
| 8,372,026 B2 | 2/2013 | Schieber et al. | |
| 8,414,518 B2 | 4/2013 | Schieber et al. | |
| 8,425,449 B2 | 4/2013 | Wardle et al. | |
| 8,439,972 B2 | 5/2013 | Badawi et al. | |
| 8,512,404 B2 | 8/2013 | Frion et al. | |
| 8,529,494 B2 | 9/2013 | Euteneuer et al. | |
| 8,529,622 B2 | 9/2013 | Badawi et al. | |
| 8,540,659 B2 | 9/2013 | Berlin | |
| 8,545,430 B2 | 10/2013 | Silvestrini | |
| 8,551,166 B2 | 10/2013 | Schieber et al. | |
| 8,617,139 B2 | 12/2013 | Silvestrini et al. | |
| 8,657,776 B2 | 2/2014 | Wardle et al. | |
| 8,663,150 B2 | 3/2014 | Wardle et al. | |
| 8,734,377 B2 | 5/2014 | Schieber et al. | |
| 8,808,222 B2 | 8/2014 | Schieber et al. | |
| 8,876,898 B2 | 11/2014 | Badawi et al. | |
| 8,961,447 B2 | 2/2015 | Schieber et al. | |
| 9,039,650 B2 | 5/2015 | Schieber et al. | |
| 9,050,169 B2 | 6/2015 | Schieber et al. | |
| 9,066,750 B2 | 6/2015 | Wardle et al. | |
| 9,066,783 B2 | 6/2015 | Euteneuer et al. | |
| 9,155,655 B2 | 10/2015 | Schieber et al. | |
| 9,211,213 B2 | 12/2015 | Wardle et al. | |
| 9,226,852 B2 | 1/2016 | Schieber et al. | |
| 9,351,874 B2 | 5/2016 | Schieber et al. | |
| 9,358,156 B2 | 6/2016 | Wardle et al. | |
| 9,402,767 B2 | 8/2016 | Schieber et al. | |
| 9,480,598 B2 | 11/2016 | Clauson et al. | |
| 9,561,132 B2 | 2/2017 | Stegmann et al. | |
| 9,579,234 B2 | 2/2017 | Wardle et al. | |
| 9,610,196 B2 | 4/2017 | Schieber et al. | |
| 9,693,902 B2 | 7/2017 | Euteneuer et al. | |
| 9,827,143 B2 | 11/2017 | Lynch et al. | |
| 9,833,357 B2 | 12/2017 | Berlin | |
| 9,931,243 B2 | 4/2018 | Wardle et al. | |
| 10,154,924 B2 | 12/2018 | Clauson et al. | |
| 10,406,030 B2 | 9/2019 | Badawi et al. | |
| 10,537,474 B2 | 1/2020 | Euteneuer et al. | |
| 10,617,558 B2 | 4/2020 | Schieber et al. | |
| 11,026,836 B2 | 6/2021 | Wardle et al. | |
| 11,135,088 B2 | 10/2021 | Wardle et al. | |
| 11,166,847 B2 | 11/2021 | Badawi et al. | |
| 11,446,179 B2 | 9/2022 | Chu | |
| 11,523,940 B2 | 12/2022 | Roeber et al. | |
| 11,857,460 B2 | 1/2024 | Badawi et al. | |
| 11,872,158 B2 | 1/2024 | Badawi et al. | |
| 11,951,037 B2 | 4/2024 | Badawi et al. | |
| 12,083,044 B2 | 9/2024 | Doraiswamy | |
| 12,171,689 B2 | 12/2024 | Badawi et al. | |
| 2002/0077693 A1 | 6/2002 | Barclay et al. | |
| 2004/0193262 A1 | 9/2004 | Shadduck | |
| 2004/0254520 A1 | 12/2004 | Porteous et al. | |
| 2007/0088432 A1 | 4/2007 | Solovay et al. | |
| 2009/0210045 A1 | 8/2009 | Sorensen et al. | |
| 2009/0287136 A1 | 11/2009 | Castillejos | |
| 2011/0046728 A1 | 2/2011 | Shareef et al. | |
| 2011/0196487 A1* | 8/2011 | Badawi | A61F 2/14 623/4.1 |
| 2012/0010702 A1 | 1/2012 | Stegmann et al. | |
| 2013/0253438 A1* | 9/2013 | Badawi | A61F 9/00736 604/239 |
| 2013/0331760 A1 | 12/2013 | Grieshaber et al. | |
| 2014/0066821 A1 | 3/2014 | Friedland et al. | |
| 2014/0081195 A1 | 3/2014 | Clauson et al. | |
| 2014/0213958 A1 | 7/2014 | Clauson et al. | |
| 2016/0220417 A1 | 8/2016 | Schieber et al. | |
| 2016/0287438 A1 | 10/2016 | Badawi et al. | |
| 2020/0038243 A1 | 2/2020 | Badawi et al. | |
| 2021/0177657 A1 | 6/2021 | Orge | |
| 2021/0386584 A1 | 12/2021 | Badawi et al. | |
| 2022/0142817 A1 | 5/2022 | Doraiswamy | |
| 2022/0354695 A1 | 11/2022 | Badawi et al. | |
| 2023/0174415 A1 | 6/2023 | Poprawe et al. | |
| 2023/0210693 A1 | 7/2023 | Trauthen | |
| 2023/0301832 A1 | 9/2023 | Mansour et al. | |
| 2024/0009029 A1 | 1/2024 | Doraiswamy | |

FOREIGN PATENT DOCUMENTS

| | | |
|---|---|---|
| EP | 2215996 A2 | 8/2010 |
| EP | 2531138 B1 | 11/2016 |
| EP | 3403622 B1 | 5/2020 |
| JP | 2002541976 A | 12/2002 |
| JP | 5856569 B2 | 2/2016 |
| KR | 20190009569 A | 1/2019 |
| RU | 2021794 C1 | 10/1994 |
| RU | 130840 U1 | 8/2013 |
| WO | WO-0049973 A2 | 8/2000 |
| WO | WO-0064391 A1 | 11/2000 |
| WO | WO-2014043698 A2 | 3/2014 |
| WO | WO-2021007559 A1 | 1/2021 |

OTHER PUBLICATIONS

EP20837679.8 Extended European Search Report dated Jul. 17, 2023.
Kumar et al. A novel stainless steel spiral intracanalicular device for Schlemm's canal dilation to treat open-angle glaucoma. 2016. 7 pages.
PCT/US2020/041704 International Search Report and Written Opinion of the International Searching Authority dated Oct. 8, 2020.
U.S. Appl. No. 17/569,329 Third Party Submission Under Rule 37 CFR 1.290 dated Jan. 17, 2024.
U.S. Appl. No. 18/473,203 Notice of Allowance dated Apr. 9, 2024.
U.S. Appl. No. 18/473,203 Office Action dated Nov. 15, 2023.
Yan, Xiaoqin et al. Schlemm's Canal and Trabecular Meshwork in Eyes with Primary Open Angle Glaucoma: A Comparative Study Using High-Frequency Ultrasound Biomicroscopy. PLoS One 11(1):e0145824, 1-15 (2016).
PCT/US2024/054604 Invitation to Pay Additional Fees dated Jan. 8, 2025.
PCT/US2024/054604 International Search Report and Written Opinion dated Feb. 28, 2025.
U.S. Appl. No. 17/569,329 Corrected Notice of Allowability dated Apr. 29, 2025.
U.S. Appl. No. 17/569,329 Notice of Allowance dated Apr. 4, 2025.
U.S. Appl. No. 17/569,329 Office Action dated Feb. 19, 2025.

* cited by examiner

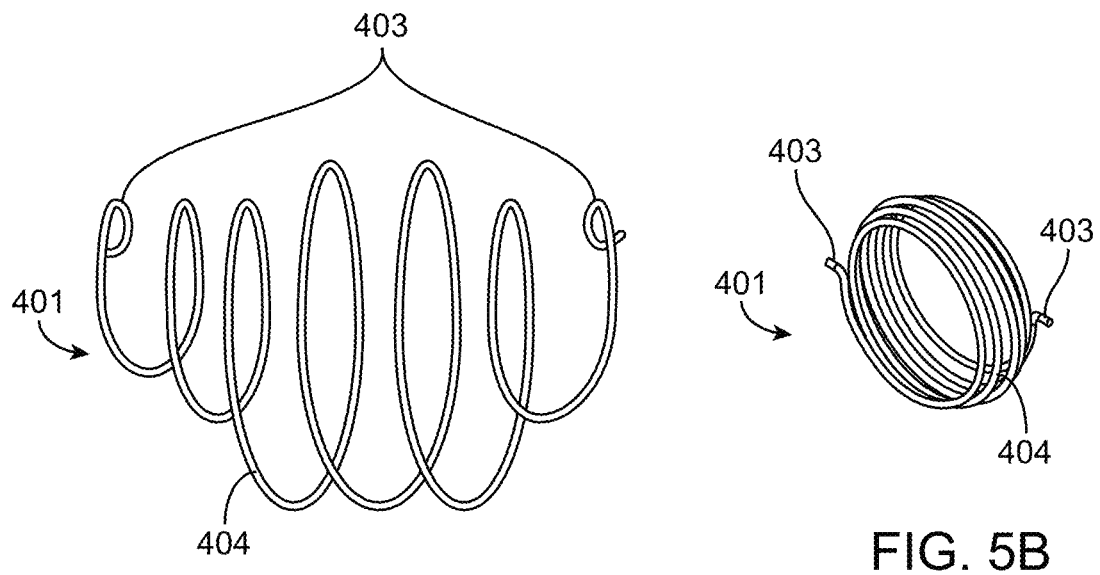
FIG. 5A
FIG. 5B
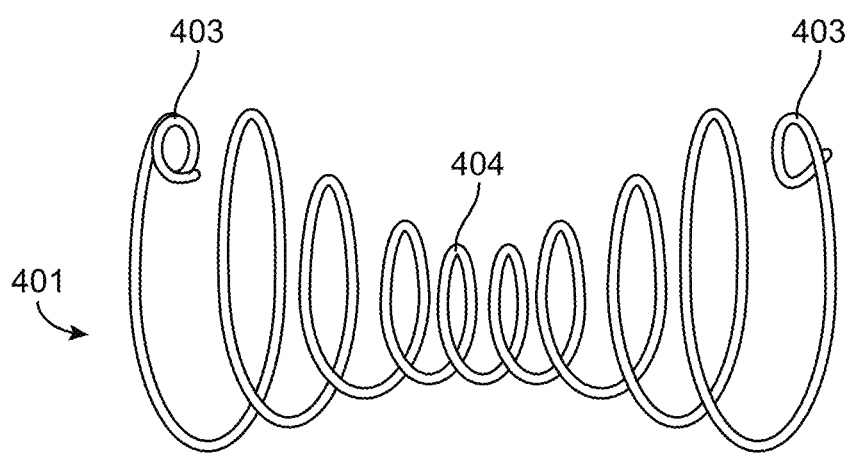
FIG. 5C

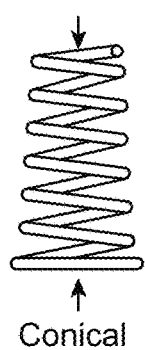
FIG. 11A
Conical
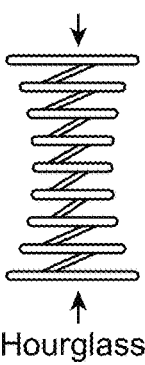
FIG. 11B
Hourglass
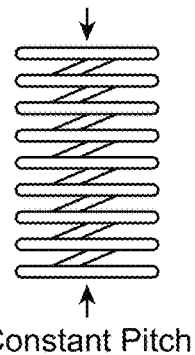
Constant Pitch
FIG. 11C
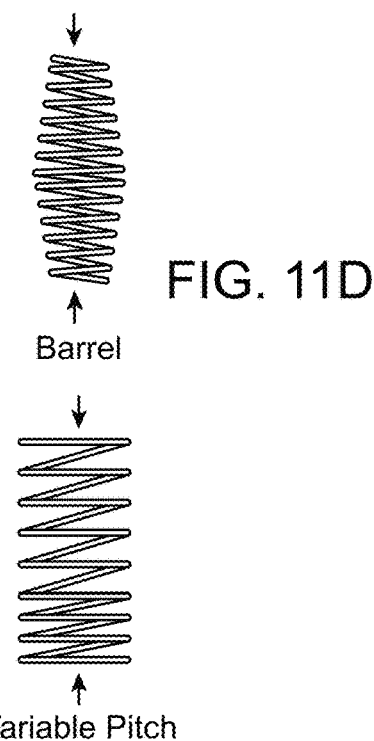
FIG. 11D
Barrel
Variable Pitch
FIG. 11E
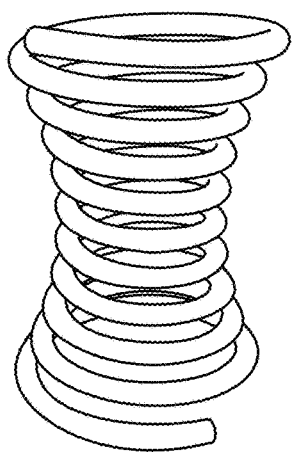
FIG. 11F
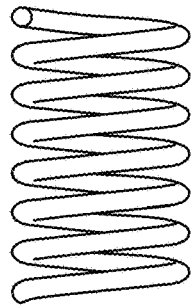
FIG. 11H
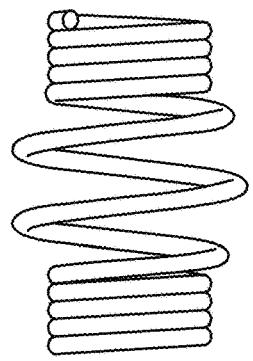
FIG. 11J
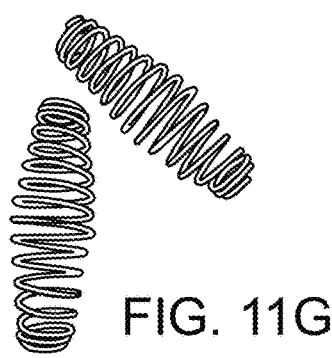
FIG. 11G
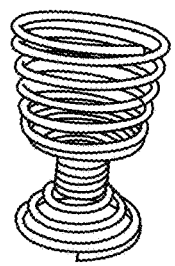
FIG. 11I

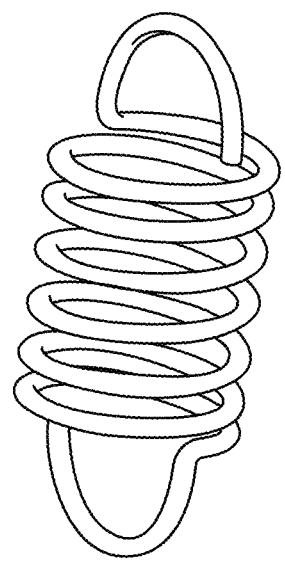
FIG. 12
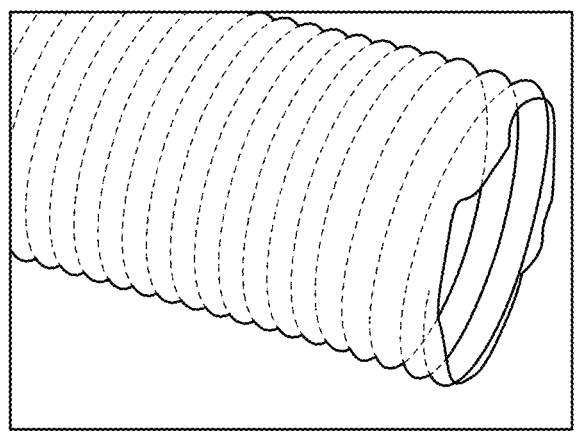 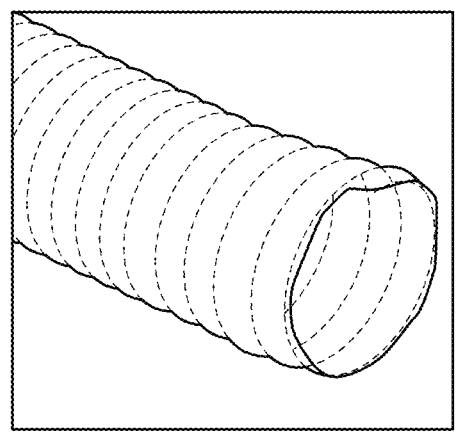
FIG. 13A  FIG. 13B

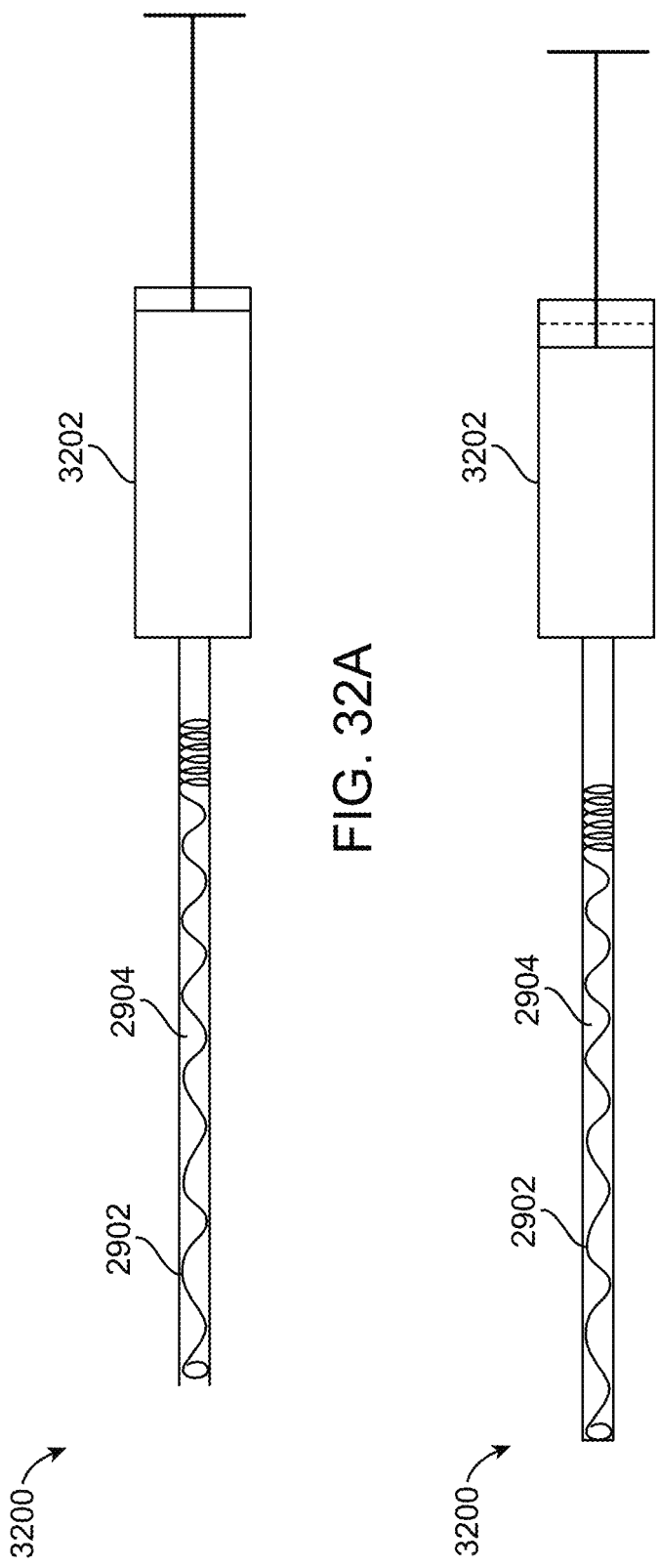

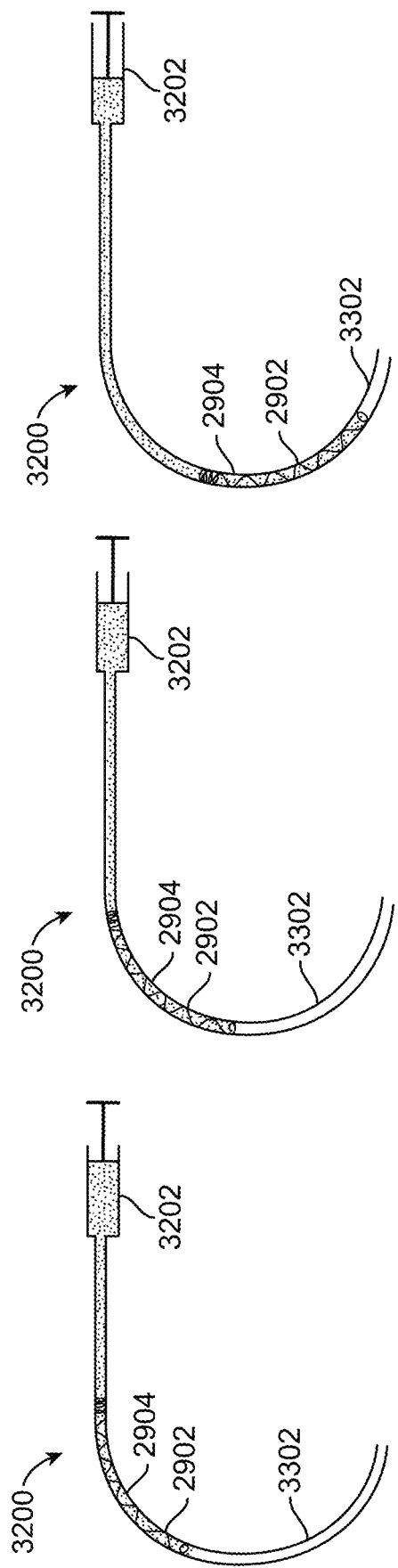

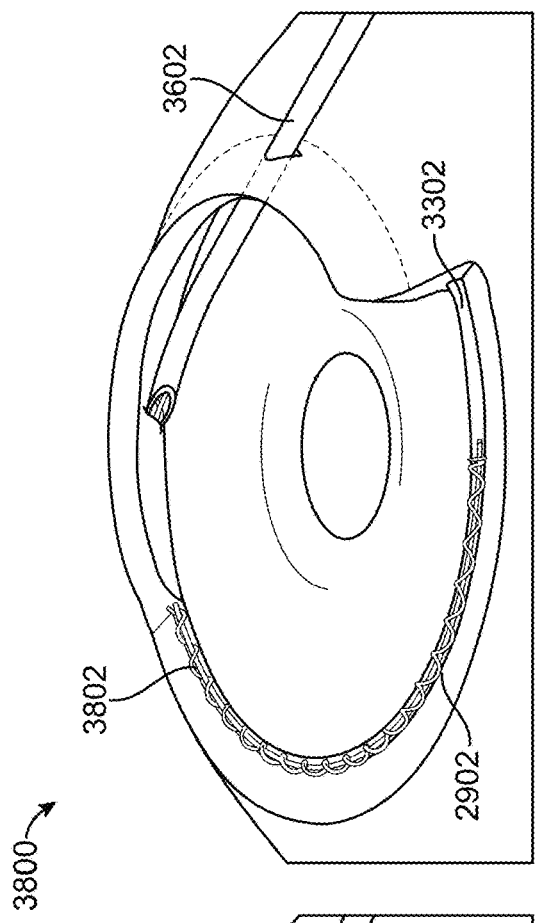
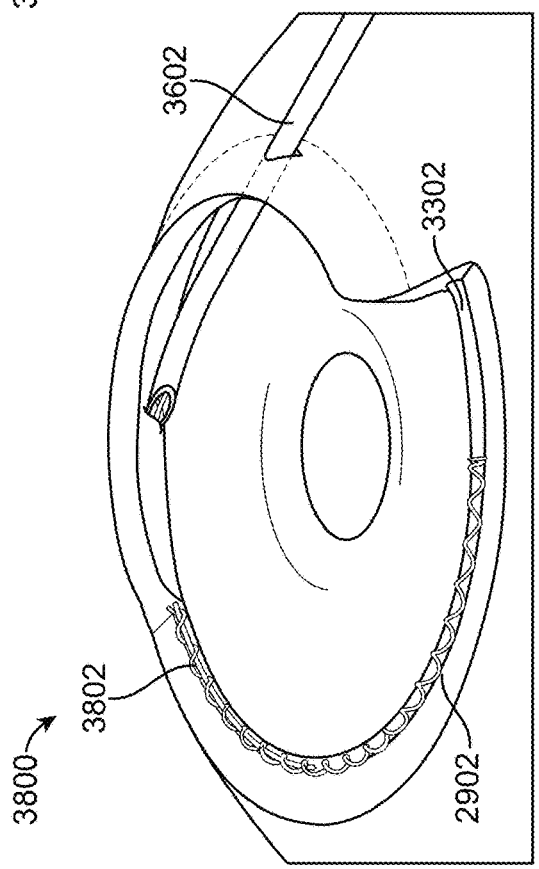

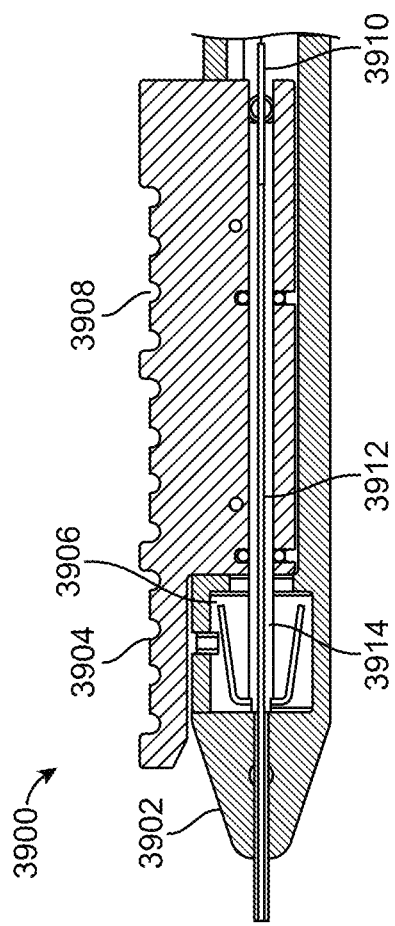
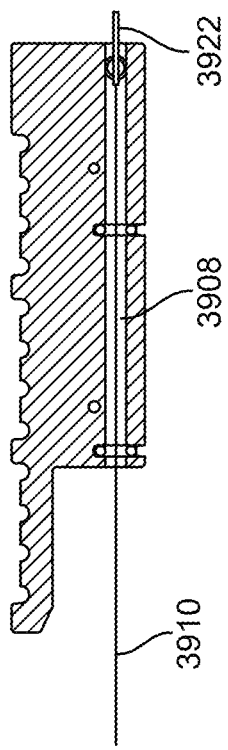
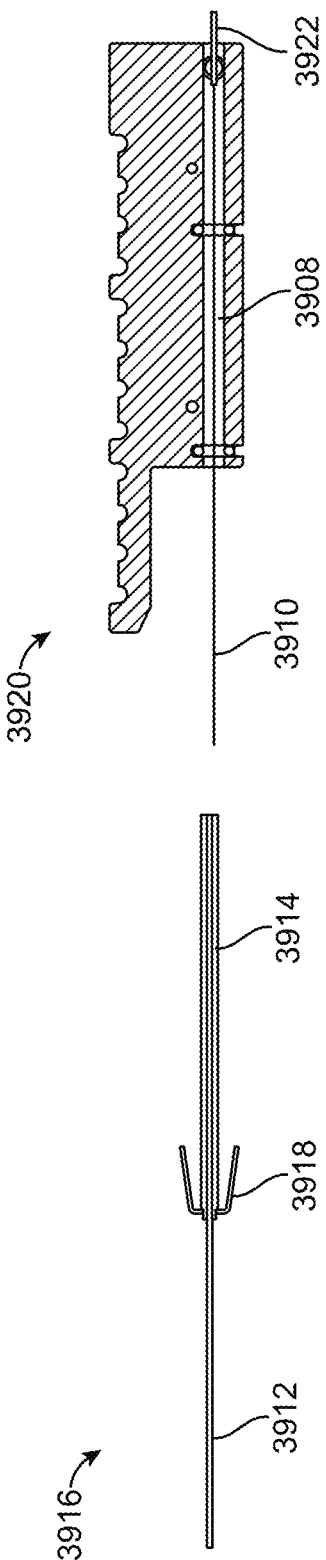

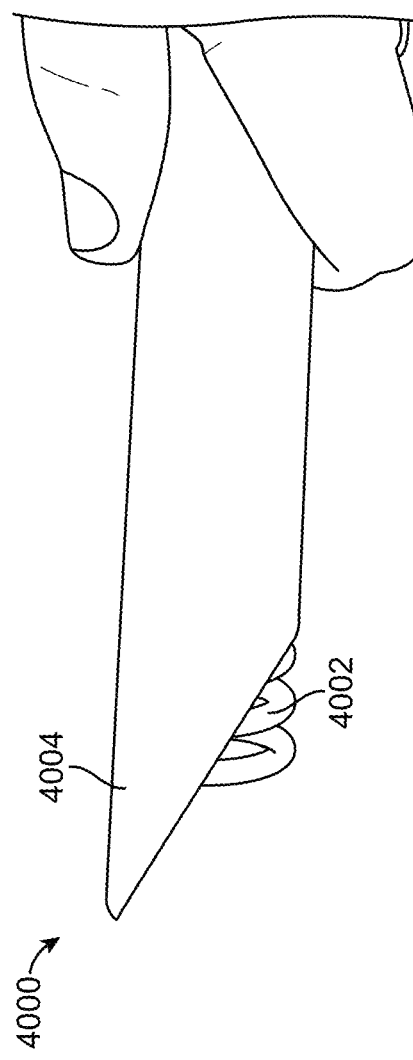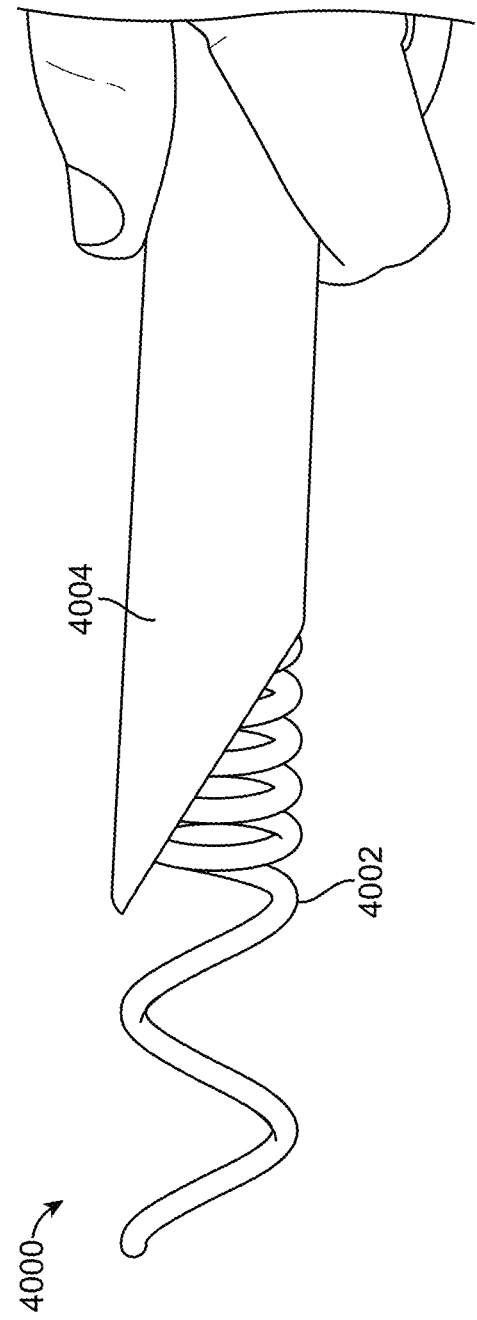

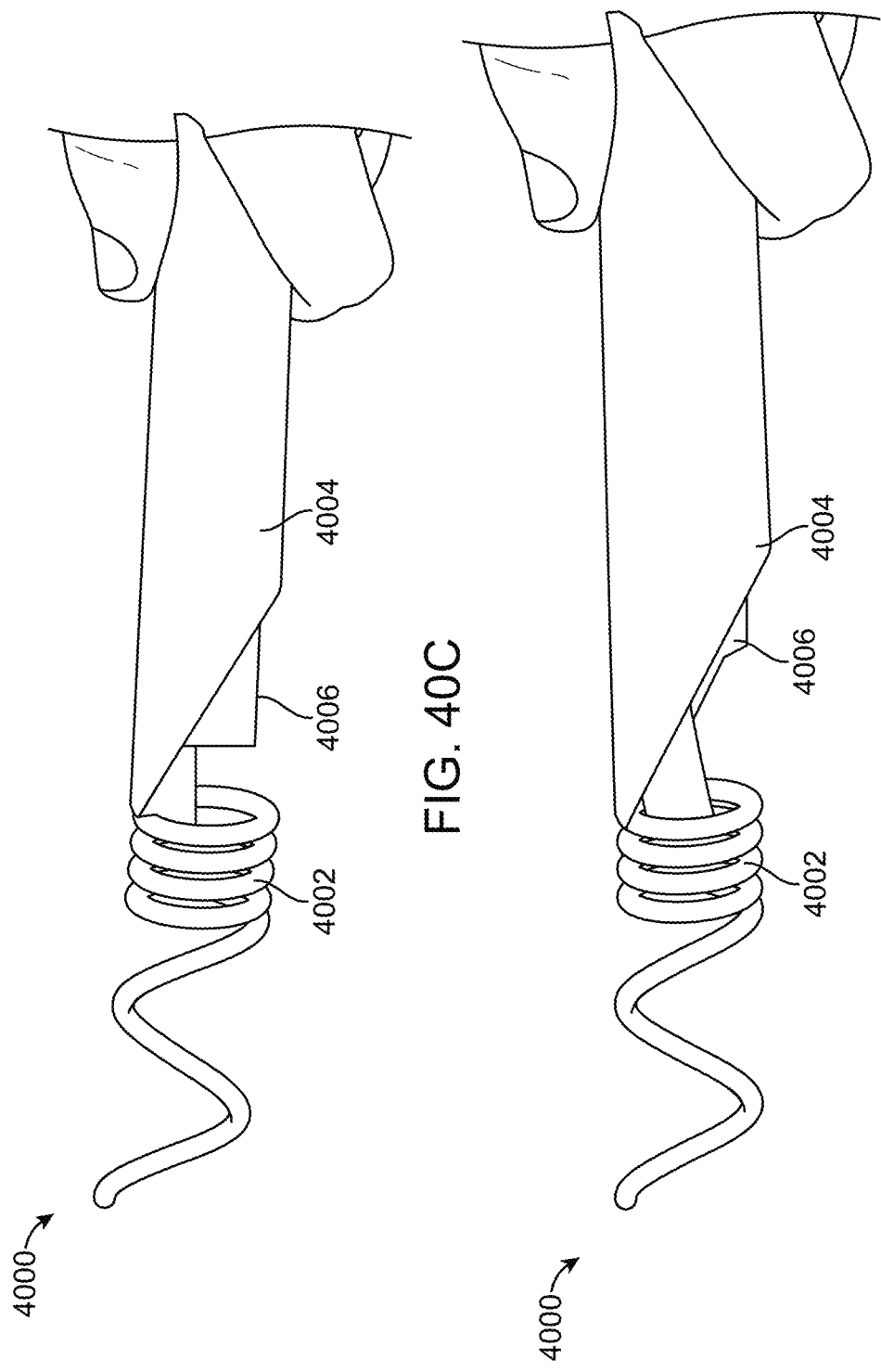

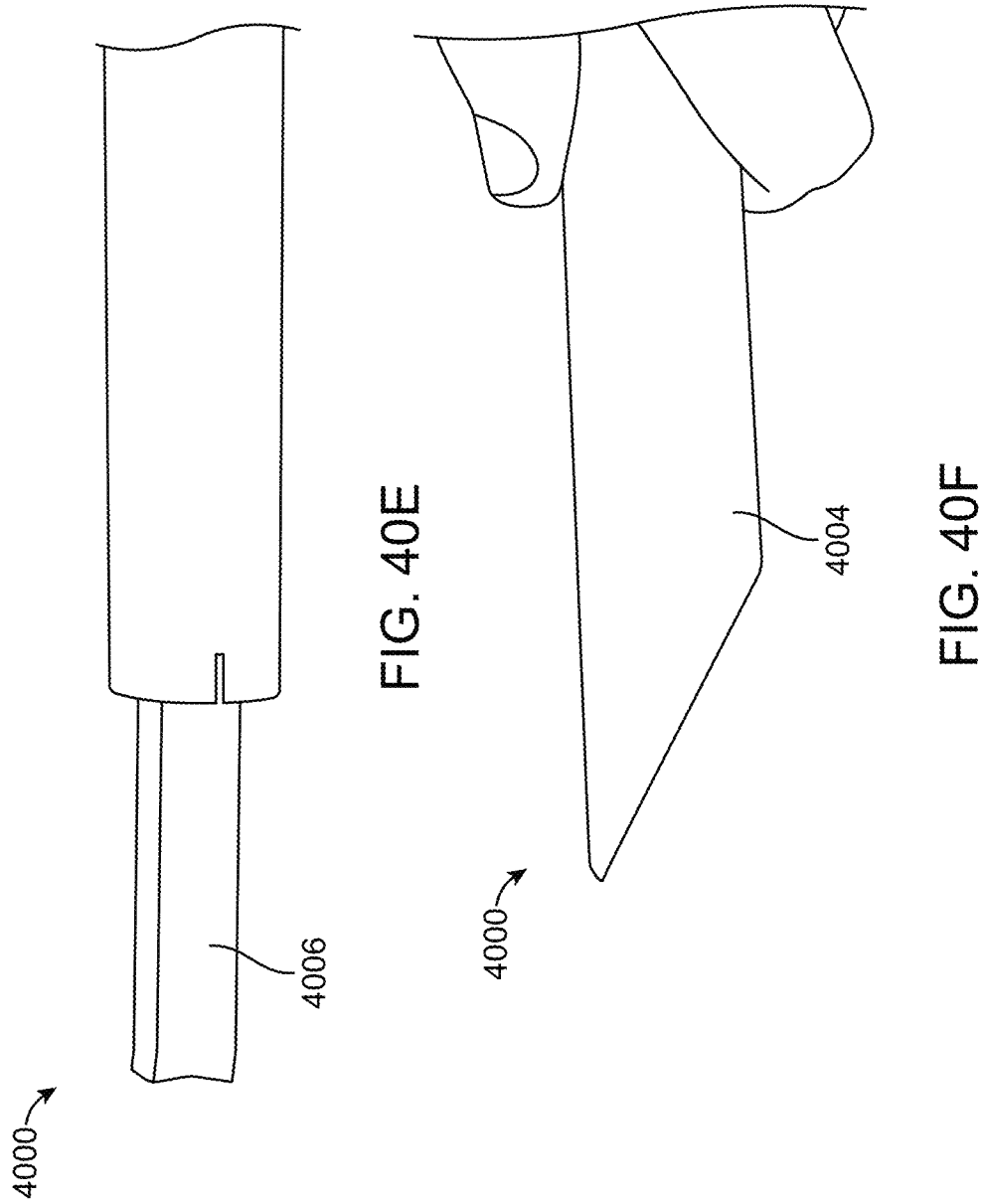

EYE STENTS AND DELIVERY SYSTEMS AND METHODS

CROSS-REFERENCE

This application is a continuation of International Patent Application PCT/US2024/054604, filed Nov. 5, 2024, which takes the benefit of U.S. Provisional Application No. 63/596,496, filed Nov. 6, 2023; and U.S. Provisional Application No. 63/654,008, filed May 30, 2024.

The subject matter of this application is related to that of the application Ser. No. 18/473,203, filed Sep. 22, 2023, now U.S. Pat. No. 12,083,044; application Ser. No. 17/569,329, filed Jan. 5, 2022; and PCT Application Serial No. PCT/US2020/041704, filed Jul. 10, 2020; all of which are incorporated herein by reference.

BACKGROUND

Glaucoma is the second leading cause of blindness in the world and every year, several millions of Americans lose their sight to this disabling and degenerative disease. Glaucoma is a condition that results from the elevated intraocular pressure due to various factors that irreversibly damage the eye's optic nerve. Glaucoma tends to be inherited and may not have any symptoms leading to the signs. It is estimated that there are approximately 2-3 million patients in the US who have open-angle glaucoma, a rate of ~1.9% for the US population age 40 and older.

Glaucoma represents a significant public health concern, characterized by progressive optic nerve damage and irreversible vision loss, often associated with elevated intraocular pressure (IOP). Aqueous humor flows from the anterior chamber of the eye into the Schlemm's canal and exits through 20-30 peripheral collector channels. This way, the Schlemm's canal drains the aqueous humor from the interior eye into the blood vessels. The blockage or collapse of Schlemm's canal, or obstruction of collection channels results in elevated IOP and increases the risk of glaucoma.

SUMMARY

Disclosed herein are devices, systems, and methods for treating glaucoma by maintaining patency of a channel of an uveolymphatic region or a Schlemm's canal in a patient's eye. In some cases, the device comprises a single elongated element that is configured for radial expansion when inserted into a channel. In some embodiments, the system includes a single elongated element and a delivery device. Methods can comprise implanting the single elongated element into an uveolymphatic region or a Schlemm's canal in a patient's eye.

Provided herein is a device for maintaining or restoring patency of a channel of a Schlemm's canal in a patient's eye. The device can comprise a single elongated element configured for radial expansion when inserted into a channel of the Schlemm's canal. The single elongated element can be configured to follow an arc of a circumference of the channel. The arc can subtend an angle comprising a degree of arc greater than approximately 140 degrees.

Disclosed herein is a system for treating glaucoma in a patient. The system can comprise a delivery device. The system can comprise at least one single elongated element configured for radial expansion when inserted into a channel of the Schlemm's canal. In some cases, the at least one single elongated element comprises a first single elongated element configured to follow a first arc of a circumference of the channel. In some cases, the arc subtends an angle comprising a degree of arc greater than approximately 140 degrees.

Provided herein is a method of treating glaucoma in a patient. The method can comprise implanting at least one single elongated element into a channel of a Schlemm's canal of the patient. In some cases, the at least one single elongated element is configured to radially expand when inserted into the channel. In some cases, the at least one single elongated element comprises a first single elongated element configured to follow a first arc of a circumference of the channel. In some cases, the arc subtends an angle comprising a degree of arc greater than approximately 140 degrees.

Disclosed herein is a fluid to enabled delivery system for introducing at least one single elongated element into the eye. The system can comprise a delivery device. The system can comprise a fluid disposed within the delivery device. The at least one single elongated element can be configured for radial expansion when inserted into a channel of the Schlemm's canal. In some cases, the at least one single elongated element is configured to be disposed within the fluid within the delivery device. In some cases, a first adherence of the fluid to the at least one single elongated element is greater than a second adherence of the fluid to the delivery device.

Provided herein is a device for treating glaucoma. The device can comprise a helical, flexible, single elongated element comprising a proximal end operatively coupled to a viscoelastic fluid delivery system. In some cases, the single elongated element comprises an atraumatic exterior surface configured to reduce friction when encased in viscoelastic fluid. In some cases, the single elongated element is configured to follow an arc of a circumference of a channel of the Schlemm's canal, wherein the arc subtends an angle comprising a degree of arc greater than approximately 80 degrees.

Provided herein is a method for treating glaucoma. The method can comprise coating at least one single elongated element with a viscoelastic fluid. In some cases, the at least one single elongated element comprises a proximal end configured to be operatively connected to a viscoelastic fluid delivery system. The method can comprise inserting the at least one coated single elongated element into Schlemm's canal. In some cases, the at least one coated single elongated element is configured to enhance aqueous humor outflow and reduce intraocular pressure via the viscoelastic fluid.

Disclosed herein is a system for delivering a stent into Schlemm's canal. The system can comprise at least one single elongated element configured for radial expansion when inserted into a channel of the Schlemm's canal. The system can comprise a guidewire. In some cases, the guidewire is configured to guide the at least one single elongated element along a first arc of a circumference of the channel. In some cases, the arc subtends an angle comprising a degree of arc at least about 140 degrees.

Provided herein is a method for delivering a stent into Schlemm's canal. The method can comprise advancing at least one single elongated element and a guidewire through a channel of the Schlemm's canal. In some cases, the at least one single elongated element comprises a first single elongated element configured to follow a first arc of a circumference of the channel. In some cases, the arc subtends an angle comprising a degree of arc greater than approximately 140 degrees. In some cases, the at least one single elongated element is mounted over a guidewire disposed in a delivery device. In some cases, the at least one single elongated element is configured to radially expand when inserted into the channel. In some cases, a proximal end of the guidewire is coupled to the delivery device. The method can comprise retracting the guidewire out of the channel. In some cases, the at least one single elongated element is configured to remain in the channel.

Disclosed herein is a method for delivering a stent into Schlemm's canal. The method can comprise detachably coupling a helical single elongated element to a pusher disposed inside a delivery device. In some cases, the helical single elongated element is configured to radially expand when inserted into a channel of the Schlemm's canal. The method can comprise advancing the helical single elongated element into the channel. The method can comprise adjusting the advancement of the helical single elongated element into the channel. The method can comprise uncoupling the helical single elongated element from the pusher. In some cases, the delivery device is configured to block retraction of the helical single elongated element.

Provided herein is a system for delivering a stent into Schlemm's canal. The system can comprise at least one helical single elongated element configured for radial expansion when inserted into a channel of the Schlemm's canal. The system can comprise a pusher detachably coupled to the at least one helical single elongated element and disposed in a delivery device. In some cases, the pusher is configured to control advancement, retraction, and adjustment of the at least one helical single elongated element in the channel. In some cases, the delivery device is configured to uncouple the pusher from the at least one helical single elongated element when the at least one helical single elongated element reaches a predetermined location in the channel.

Disclosed herein is a delivery device for delivering at least one single elongated element into Schlemm's canal. The delivery device can comprise a pusher tube configured to advance the at least one single elongated element into Schlemm's canal. The delivery device can comprise a locking tube configured to block retraction of the at least one single elongated element into the delivery device from Schlemm's canal. The delivery device can comprise a slider coupled to a guidewire, wherein the at least one single elongated element is mounted on the guidewire. In some cases, the slider is configured to advance and retract the guidewire.

Provided herein is a system for treating glaucoma in a patient. The system can comprise a delivery device. The system can comprise a first single elongated element configured for radial expansion when inserted into a channel of the Schlemm's canal. The system can comprise a second single elongated element configured for radial expansion when inserted into a channel of the Schlemm's canal. In some cases, the first single elongated element and the second single elongated element are each configured to follow an arc of a circumference of the channel. In some cases, the first single elongated element follows a first arc of the circumference. In some cases, the first arc subtends an angle comprising a first degree of arc. In some cases, the second single elongated element follows a second arc of the circumference. In some cases, the second arc subtends an angle comprising a second degree of arc. In some cases, each of the first degree of arc and the second degree of arc are greater than approximately 140 degrees.

Disclosed herein is a method of treating glaucoma in a patient. The method can comprise implanting a first single elongated element into a channel of a Schlemm's canal of the patient. In some cases, the first single elongated element is configured to radially expand when inserted into the channel. The method can comprise implanting a second single elongated element into the channel. In some cases, the second single elongated element is configured to radially expand when inserted into the channel. In some cases, the first single elongated element and the second single elongated element are each configured to follow an arc of a circumference of the channel. In some cases, the first single elongated element follows a first arc of the circumference, wherein the first arc subtends an angle comprising a first degree of arc. In some cases, the second single elongated element follows a second arc of the circumference. In some cases, the second arc subtends an angle comprising a second degree of arc. In some cases, each of the first degree of arc and the second degree of arc are greater than approximately 140 degrees.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings (also "Figure" and "FIG." herein), of which:

FIGS. 5A and 5B contain variants of the self-expanding eye stent (SES) device in a helical form with the manipulating features and tension rings. FIG. 5A contains a variant of the SES device where the central portion of the tension ring is larger in diameter than the peripheral ends.

FIG. 5C contains a variant of the SES device where the central portion of the tension ring is smaller in diameter than the peripheral ends.

FIGS. 11A-11J illustrates variants of the SES device where the device has variable shapes and sizes along the free length of the helical coil of the SES.

FIG. 12 illustrates a variant of the SES device where the manipulation feature allows a hook-loop to reposition or retrieve the SES.

FIGS. 13A and 13B illustrate a variant of the SES device where the helical coil has a polymeric sheath at the entry or exit or through the length of SES allowing regulation of flow into the canal.

FIGS. 26C and 26C1-1 illustrate a variant of a curved and electropolished SES device in situ in the uveolymphatic canal with the proximal end extended along the same plane as the channel to create a collapsed wound opening and by-pass for fluid flow.

FIGS. 32A-32B illustrate consecutive steps of side views of an example device and method for treating glaucoma during deployment in accordance with some embodiments described herein.

FIGS. 33A-33C illustrate consecutive steps of top-down views of an example device and method for treating glaucoma during deployment in accordance with some embodiments described herein.

FIGS. 38A-38B illustrate consecutive steps of perspective views of an example device and method for treating glaucoma during deployment in accordance with some embodiments described herein.

FIGS. 39A-39D show cross-sectional side views of an example device for delivering a stent and guidewire in accordance with embodiments described herein.

FIGS. 40A-40J show side (FIGS. 40A-40F) and see-through side (FIGS. 40G-40I) views of consecutive steps of ejecting an example device in accordance with example methods described herein.

DETAILED DESCRIPTION

Figure 1:
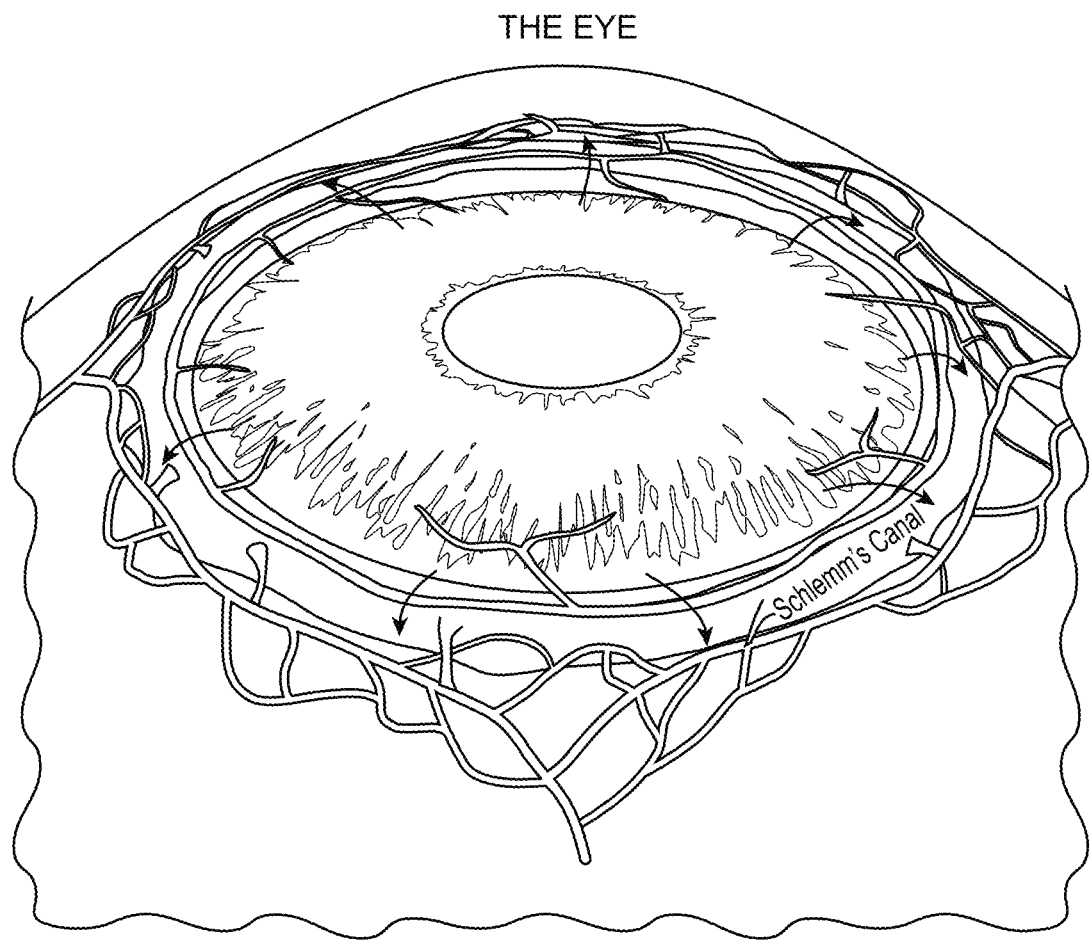
FIG. 1 illustrates an isometric sketch of the eye with a label indicating the location of the Schlemm's canal or the uveolymphatic vessel.
Figure 2:
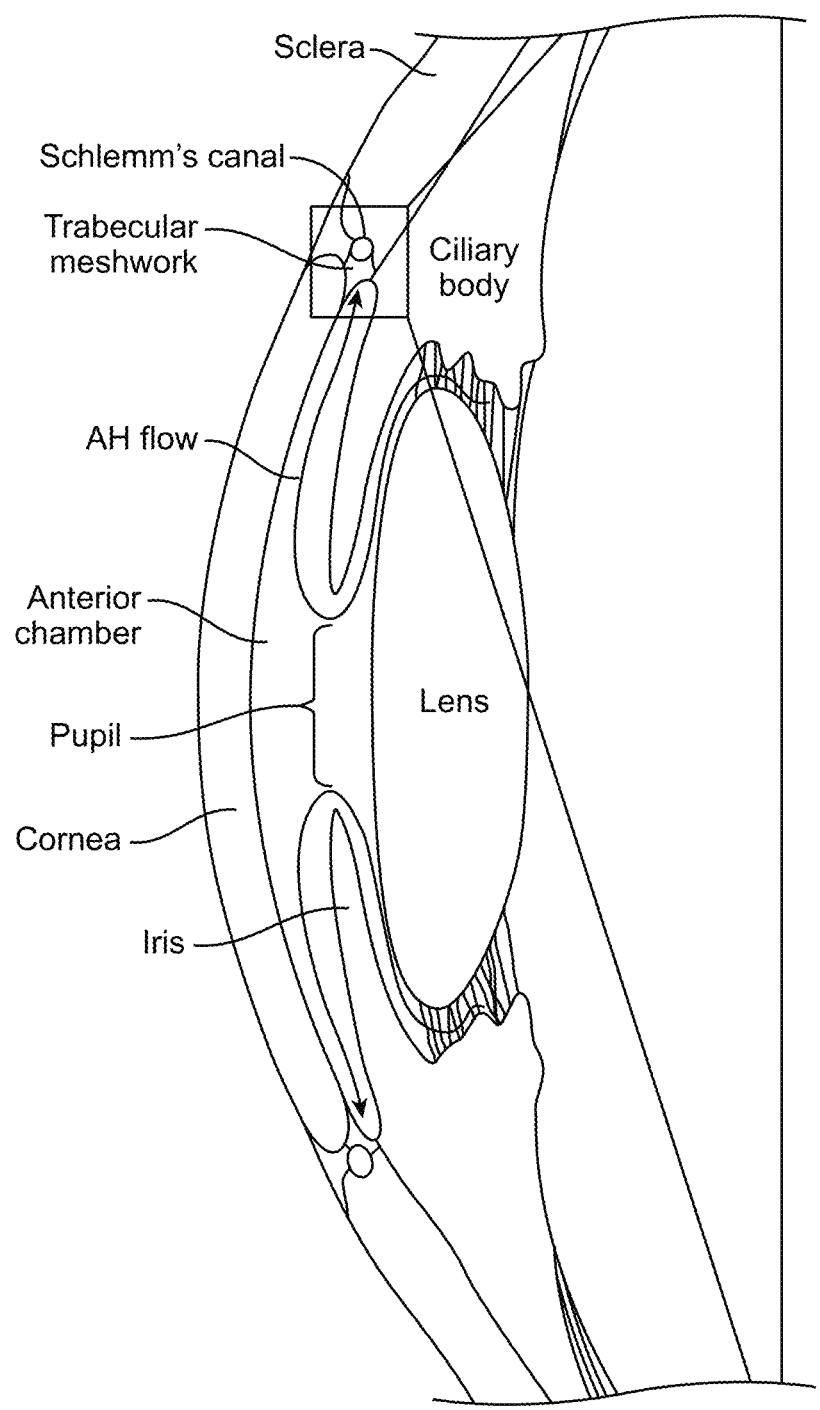
FIG. 2 illustrates a cross-sectional sketch of the eye with labels indicating aqueous humor flow from the posterior chamber ciliary body to the trabecular meshwork and into the Schlemm's canal.
Figure 3A:
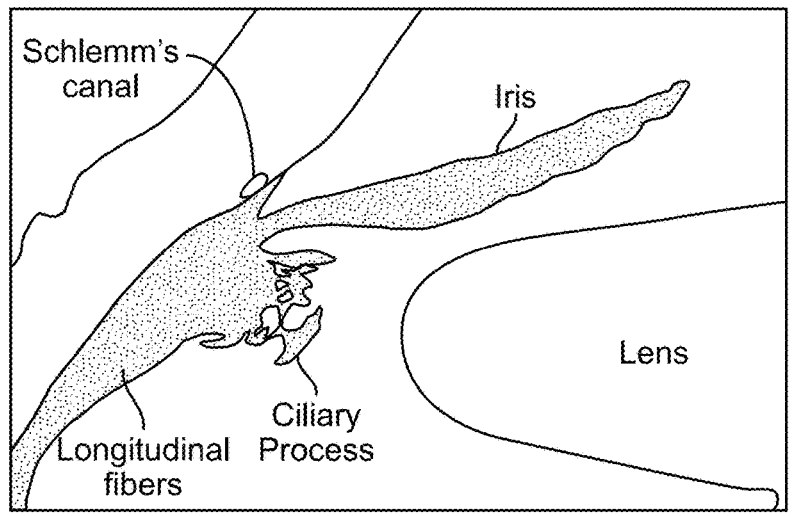
FIG. 3A illustrates a cross-sectional stained micrograph of the human eye with the Schlemm's canal's location clearly labeled.
Figures 3B, 3C:
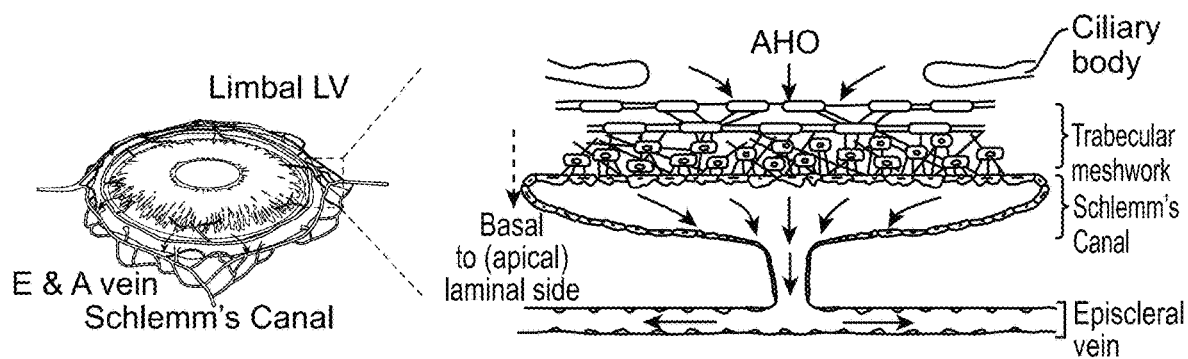
FIGS. 3B-3D illustrates detailed developmental cellular schematics of the uveolymphatic vessel, including how the aqueous humor outflow occurs.
Figure 3D:
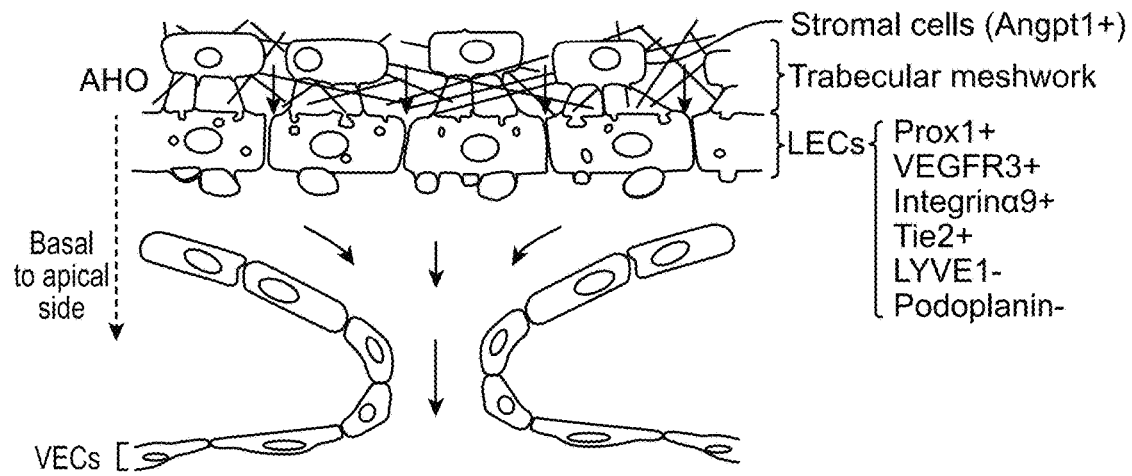

Lowering intraocular pressure (IOP) has been a method of treating glaucoma for over a century. However, little progress has been made in understanding how the aqueous clearance work in the eye. Discoveries in lymphology have suggested that the Schlemm's canal acts like a lymphatic vessel in managing outflow and regulating the IOP. Lymphedema is a condition that results from the impaired flow of the lymphatics, and glaucoma is akin to 'lymphedema of the eye.' Similar to other forms of lymphedema, swelling and elevated pressure is a potential side-effect from the build-up of fluid with inadequate clearance.

Treatments of glaucoma can include IOP-lowering drops, trabeculectomy, or other forms of surgical drainage devices that funnel fluid into various locations (ab-interno vs. ab-externo). Moderate and severe glaucoma can be treated with combination approaches of surgical devices and eye-drops. However, ineffective location of devices, ineffective outflow and poor compliance with eye-drops makes it difficult to address disease progression, especially since glaucoma is an asymptomatic disease.

Pharmacologic approaches for treatment include use of prostaglandin (PG) monotherapy with single agents, carbonic anhydrase inhibitors, prostaglandin analogues, beta-blockers, alpha-2 agonists, etc. Pharmacologic approaches are inadequate in the effectiveness and often used as short-term treatments. Compliance remains a large constraint for long-term effectiveness and prevention of progress. Additionally, side-effects of pharmacologic approach include brow ache, pupil constriction, burning, and reduced night vision.

Surgical therapies can include selective laser trabeculoplasty (SLT) and microinvasive glaucoma surgery (MIGS). SLT is irreversible and requires ablation of the trabecular meshwork to create outflow networks. MIGS include a variety of devices that offer a flow channel for the aqueous fluid outside the eye (ab-externo) or inside the eye (ab-interno). Ab-interno devices can reside in the trabecular meshwork and ab-externo devices can be trans/sub-conjunctival placement.

Several factors influence the onset and progression of glaucoma as discussed in previous sections. The region where aqueous drainage occurs is in the uveolymphatic vessel or Schlemm's canal. When this region is blocked or constricted, it can create a cascading effect of inflammation that can include edema or elevation of intraocular pressure. Dilating or creating by-pass flow for the uveolymphatic vessel or Schlemm's canal allows for continuous and regulated clearance of the aqueous humor, which restores the lymphatic function of the eye and hence regulates the intraocular pressure. Creating by-pass flow, or restoring the natural patency of Schlemm's canal and subsequent flow to the collector channels can restore flow through the eye and lower IOP. An increase in Schlemm's canal patency can increase aqueous flow. An increase in collector channel access can also increase aqueous flow. In some cases, the devices, systems, and methods described herein may be designed to advance through a majority of the Schlemm's canal to maximize the aqueous flow. In this way, a stent device, and methods and systems to support its advancement, may be beneficial when it can lie along a majority of the Schlemm's canal. However, in some cases, there may be difficulty in arcing the stent device past the point of 180 degrees such that the stent reverses directions. The devices, systems, and methods described herein may describe methods to overcome this difficulty.

Disclosed herein are devices, systems, and methods comprising adjustable self-expanding eye stent (SES) or reversible eye tension ring (ETR) embodiments that can be configured to adjust the diameter and opening of the Schlemm's canal. SESs can include various prosthetic devices, including tubular members configured to maintain or improve the patency of at least a portion of the uveolymphatic vessel, such as the Schlemm's canal. In some embodiments, a device can improve the patency of the Schlemm's canal, but not other uveal regions.

In some cases, the devices disclosed herein may be inserted into the Schlemm's canal with the assistance of fluids, pushers, guidewires, or other devices making up the systems and methods described herein.

Devices

Some embodiments of the present disclosure can leverage the expansion, dilation or by-pass of the Schlemm's canal using adjustable reversible self-expanding eye stents (SES) or eye tension rings (ETRs) of desired sizes to control and improve aqueous flow throughout the range of the uveolymphatic canal. As such, some embodiments include tension ring(s) or cylinders that sit inside, outside, or both inside and outside the Schlemm's canal wall and can be within the canal and partially or fully anchored, attached, adhered, or otherwise held in place with respect to the wall or elsewhere in the canal. The partial or complete expansion of the canal can be pre-configured based on pre-operative metrology of the Schlemm's canal to a customized and adjustable fit across the various zones within the uveolymphatic canal and based on the patient specific and evolving needs. Additionally, the SES can utilize entry and exit features for by-pass of fluid, varying control of dilation across its shape that may also allow anchoring, repositioning, and retrieval.

The present disclosure provides devices for maintaining or restoring patency of a channel of a uveolymphatic region in the eye or of the Schlemm's canal, referred to interchangeably as a channel, comprising a single elongated element configured for radial expansion or support of the channel of the uveolymphatic region or the Schlemm's canal when inserted into the channel, wherein the single elongated element is configured to follow an arc of a circumference of the channel, wherein the arc subtends an angle comprising a degree of arc greater than approximately 75 degrees. In some embodiments, the arc degree is greater than approximately 130 degrees. In some embodiments, the arc degree is greater than approximately 180 degrees. In some embodiments, the arc degree is greater than approximately 270 degrees.

In some embodiments, the single elongated element comprises an SES. In some embodiments, the single elongated element comprises an ETR. In some cases, "radial expansion or support" means that a cross-section or lumen of the channel of the uveolymphatic region or the Schlemm's canal is held open and available for fluid communication with collector channels surrounding the uveolymphatic region or the Schlemm's canal to permit or enhance drainage flow from the channel of the uveolymphatic region or the Schlemm's canal into the collector channels. In some cases, the single elongated element follows substantially a full circumference of the channel of a uveolymphatic region in the eye or of the Schlemm's canal. This can allow maximization of access to the collector channels across the full circumference, or substantially the full circumference, of the Schlemm's canal.

In some cases, the single elongated element can follow a degree of arc from about 30 degrees to about 360 degrees. In some cases, the single elongated element can follow a degree of arc from about 30 degrees to about 60 degrees, about 30 degrees to about 90 degrees, about 30 degrees to about 120 degrees, about 30 degrees to about 150 degrees, about 30 degrees to about 180 degrees, about 30 degrees to about 210 degrees, about 30 degrees to about 240 degrees, about 30 degrees to about 270 degrees, about 30 degrees to about 300 degrees, about 30 degrees to about 330 degrees, about 30 degrees to about 360 degrees, about 60 degrees to about 90 degrees, about 60 degrees to about 120 degrees, about 60 degrees to about 150 degrees, about 60 degrees to about 180 degrees, about 60 degrees to about 210 degrees, about 60 degrees to about 240 degrees, about 60 degrees to about 270 degrees, about 60 degrees to about 300 degrees, about 60 degrees to about 330 degrees, about 60 degrees to about 360 degrees, about 90 degrees to about 120 degrees, about 90 degrees to about 150 degrees, about 90 degrees to about 180 degrees, about 90 degrees to about 210 degrees, about 90 degrees to about 240 degrees, about 90 degrees to about 270 degrees, about 90 degrees to about 300 degrees, about 90 degrees to about 330 degrees, about 90 degrees to about 360 degrees, about 120 degrees to about 150 degrees, about 120 degrees to about 180 degrees, about 120 degrees to about 210 degrees, about 120 degrees to about 240 degrees, about 120 degrees to about 270 degrees, about 120 degrees to about 300 degrees, about 120 degrees to about 330 degrees, about 120 degrees to about 360 degrees, about 150 degrees to about 180 degrees, about 150 degrees to about 210 degrees, about 150 degrees to about 240 degrees, about 150 degrees to about 270 degrees, about 150 degrees to about 300 degrees, about 150 degrees to about 330 degrees, about 150 degrees to about 360 degrees, about 180 degrees to about 210 degrees, about 180 degrees to about 240 degrees, about 180 degrees to about 270 degrees, about 180 degrees to about 300 degrees, about 180 degrees to about 330 degrees, about 180 degrees to about 360 degrees, about 210 degrees to about 240 degrees, about 210 degrees to about 270 degrees, about 210 degrees to about 300 degrees, about 210 degrees to about 330 degrees, about 210 degrees to about 360 degrees, about 240 degrees to about 270 degrees, about 240 degrees to about 300 degrees, about 240 degrees to about 330 degrees, about 240 degrees to about 360 degrees, about 270 degrees to about 300 degrees, about 270 degrees to about 330 degrees, about 270 degrees to about 360 degrees, about 300 degrees to about 330 degrees, about 300 degrees to about 360 degrees, or about 330 degrees to about 360 degrees. In some cases, the single elongated element can follow a degree of arc of about 30 degrees, about 60 degrees, about 90 degrees, about 120 degrees, about 150 degrees, about 180 degrees, about 210 degrees, about 240 degrees, about 270 degrees, about 300 degrees, about 330 degrees, or about 360 degrees. In some cases, the single elongated element can follow a degree of arc of at least about 30 degrees, about 60 degrees, about 90 degrees, about 120 degrees, about 150 degrees, about 180 degrees, about 210 degrees, about 240 degrees, about 270 degrees, about 300 degrees, or about 330 degrees. In some cases, the single elongated element can follow a degree of arc of at most about 60 degrees, about 90 degrees, about 120 degrees, about 150 degrees, about 180 degrees, about 210 degrees, about 240 degrees, about 270 degrees, about 300 degrees, about 330 degrees, or about 360 degrees.

As a non-limiting example, the single elongated element can follow a degree of arc between approximately 300 degrees and approximately 360 degrees. The single elongated element can follow a degree of arc between approximately 340 degrees and approximately 350 degrees.

In some cases, the single elongated element's length when coiled is from about 6 mm to about 12 mm. In some cases, the single elongated element's length when coiled is from about 6 mm to about 8 mm, about 6 mm to about 10 mm, about 6 mm to about 12 mm, about 8 mm to about 10 mm, about 8 mm to about 12 mm, or about 10 mm to about 12 mm. In some cases, the single elongated element's length when coiled is about 6 mm, about 8 mm, about 10 mm, or about 12 mm. In some cases, the single elongated element's length when coiled is at least about 6 mm, about 8 mm, or about 10 mm. In some cases, the single elongated element's length when coiled is at most about 8 mm, about 10 mm, or about 12 mm. In some cases, the length is about 9 mm.

In some cases, the single elongated element's length when coiled is from about 10 mm to about 20 mm. In some cases, the single elongated element's length when coiled is from about 10 mm to about 12 mm, about 10 mm to about 14 mm, about 10 mm to about 16 mm, about 10 mm to about 18 mm, about 10 mm to about 20 mm, about 12 mm to about 14 mm, about 12 mm to about 16 mm, about 12 mm to about 18 mm, about 12 mm to about 20 mm, about 14 mm to about 16 mm, about 14 mm to about 18 mm, about 14 mm to about 20 mm, about 16 mm to about 18 mm, about 16 mm to about 20 mm, or about 18 mm to about 20 mm. In some cases, the single elongated element's length when coiled is about 10 mm, about 12 mm, about 14 mm, about 16 mm, about 18 mm, or about 20 mm. In some cases, the single elongated element's length when coiled is at least about 10 mm, about 12 mm, about 14 mm, about 16 mm, or about 18 mm. In some cases, the single elongated element's length when coiled is at most about 12 mm, about 14 mm, about 16 mm, about 18 mm, or about 20 mm.

In some cases, one stent is used in a single eye's Schlemm's canal. In some cases, multiple devices can be used in a single eye's Schlemm's canal. In some cases, 2 or more stents can be used in a single eye's Schlemm's canal. They may be inserted from different or opposing areas of the Schlemm's canal. They may be inserted at the same or similar area of Schlemm's canal, such that the second stent can push the first. They may be inserted at the same or similar area of Schlemm's canal, such that originate in a similar location but are pushed in opposing directions. In some cases, one delivery device may sequentially inject both. The delivery device may be able to hold both stents at once, such that they can be loaded once. In some cases, there may be one delivery device per stent. In some cases, the length of each of the stents can be between about 6 mm and about 12 mm and/or between about 10 mm and about 20 mm. The stents can be the similar lengths or different lengths. A different combination of stent lengths can be used in each eye of a patient.

The Schlemm's canal can have an average circumference of about 36 mm. In some cases, the stent lengths combined together can be from about 12 mm to 36 mm. In some cases, the stent lengths combined together can be from about 12 mm to about 16 mm, about 12 mm to about 18 mm, about 12 mm to about 24 mm, about 12 mm to about 28 mm, about 12 mm to about 32 mm, about 12 mm to about 36 mm, about 16 mm to about 18 mm, about 16 mm to about 24 mm, about 16 mm to about 28 mm, about 16 mm to about 32 mm, about 16 mm to about 36 mm, about 18 mm to about 24 mm, about 18 mm to about 28 mm, about 18 mm to about 32 mm, about 18 mm to about 36 mm, about 24 mm to about 28 mm, about 24 mm to about 32 mm, about 24 mm to about 36 mm, about 28 mm to about 32 mm, about 28 mm to about 36 mm, or about 32 mm to about 36 mm. In some cases, the stent lengths combined together can be about 12 mm, about 16 mm, about 18 mm, about 24 mm, about 28 mm, about 32 mm, or about 36 mm. In some cases, the stent lengths combined together can be at least about 12 mm, about 16 mm, about 18 mm, about 24 mm, about 28 mm, or about 32 mm. In some cases, the stent lengths combined together can be at most about 16 mm, about 18 mm, about 24 mm, about 28 mm, about 32 mm, or about 36 mm.

In some cases, the stent lengths combined together can follow a degree of arc of from about 120 degrees to about 360 degrees. In some cases, the stent lengths combined together can follow a degree of arc of from about 120 degrees to about 140 degrees, about 120 degrees to about 160 degrees, about 120 degrees to about 280 degrees, about 120 degrees to about 240 degrees, about 120 degrees to about 280 degrees, about 120 degrees to about 320 degrees, about 120 degrees to about 360 degrees, about 140 degrees to about 160 degrees, about 140 degrees to about 280 degrees, about 140 degrees to about 240 degrees, about 140 degrees to about 280 degrees, about 140 degrees to about 320 degrees, about 140 degrees to about 360 degrees, about 160 degrees to about 280 degrees, about 160 degrees to about 240 degrees, about 160 degrees to about 280 degrees, about 160 degrees to about 320 degrees, about 160 degrees to about 360 degrees, about 280 degrees to about 240 degrees, about 280 degrees to about 280 degrees, about 280 degrees to about 320 degrees, about 280 degrees to about 360 degrees, about 240 degrees to about 280 degrees, about 240 degrees to about 320 degrees, about 240 degrees to about 360 degrees, about 280 degrees to about 320 degrees, about 280 degrees to about 360 degrees, or about 320 degrees to about 360 degrees. In some cases, the stent lengths combined together can follow a degree of arc of about 120 degrees, about 140 degrees, about 160 degrees, about 280 degrees, about 240 degrees, about 280 degrees, about 320 degrees, or about 360 degrees. In some cases, the stent lengths combined together can follow a degree of arc of at least about 120 degrees, about 140 degrees, about 160 degrees, about 280 degrees, about 240 degrees, about 280 degrees, or about 320 degrees. In some cases, the stent lengths combined together can follow a degree of arc of at most about 140 degrees, about 160 degrees, about 280 degrees, about 240 degrees, about 280 degrees, about 320 degrees, or about 360 degrees.

In some embodiments, the single elongated element can follow the curvature of the channel of a uveolymphatic region in the eye or of the Schlemm's canal. In some cases, the channel of a uveolymphatic region in the eye or of the Schlemm's canal comprises an elliptical or circular region with a radius of curvature. In some cases, the single elongated element is configured to be sufficiently flexible to follow the curvature of the uveolymphatic region in the eye or of the Schlemm's canal. In some cases, the single elongated element is sufficiently flexible to not exert force on the sides of the uveolymphatic region in the eye or of the Schlemm's canal when it sits within uveolymphatic region in the eye or of the Schlemm's canal by taking on the curvature of the channel. In some cases, the single elongated element can be stiffer such that a bowing effect can occur if the single elongated element has a different arc than the channel. This bowing effect can result in the single elongated element flexing against the curvature of the channel to open up space within the channel.

The single elongated element can comprise an expansion member in a bent configuration, wherein the angle of the bent configuration comprises the degree of arc. The expansion member in its bent configuration can have (i) sufficient radial strength to withstand compressive stresses exerted by uveolymphatic region in the eye or the Schlemm's canal and (ii) sufficient void space in its structure to minimize blockage of collector channels in the uveolymphatic region in the eye or the Schlemm's canal, when the expansion member is implanted in the uveolymphatic region in the eye or the Schlemm's canal. While the expansion member may optionally be expanded in situ within the channel, as described below, the expansion member can be introduced into the channel in a fully expanded form and open or support the walls of the channel as it is advanced forwardly into the channel.

The bent configuration of the single elongated element may comprise any one or combination of curves, loops, twists, turns, corners, kinks, arcs, or other non-linearities along an axial length of the single elongated elements that define a volume-occupying virtual envelope that radially supports a wall region of the uveolymphatic region in the eye or the Schlemm's canal when implanted therein. This virtual envelope can be cylindrical but can have other shapes as well. As a non-limiting example, the single elongated element comprises repeating helical turns. In some examples, the single elongated element comprises repeating serpentine loops. The single elongated element can comprise a coil.

In some cases, the single elongated element may be curved along its length in its bent configuration when free from constraint. In some cases, the single elongated element may conform to a shape of the uveolymphatic region in the eye or the Schlemm's canal. In other cases, the at least one end of the single elongated element may have a geometry different than that of the remainder of the single elongated element. The at least one end of the single elongated element may have both ends with a geometry different than that of a central region of the single elongated element. The geometries at the ends may differ in dimensions, e.g., being helical with a different wire diameter, helical diameter, pitch or any combination thereof; or may differ in shape, e.g., being loops terminating either or both ends of the single elongated element; or both in dimension and shape.

In some embodiments, the single elongated elements of the devices of the present disclosure may comprise a pre-shaped metal or polymeric filament or "monofilament," where monofilament comprises a single strand of metal or polymer. While such elongated elements may comprise a single-stranded, solid core elongated wire, strand, fiber, or the like, in some cases the elongated elements may comprise a thread, cord, cable, or the like. Elongated elements can comprise multiple individual strands which are tightly wound or otherwise bound together to act as a single solid entity. As a non-limiting examples, the single elongated strand or filament may comprise a pre-shaped metal wire, such as a shape or heat memory alloy wire. In another example, the single elongated element comprises a nickel-titanium alloy wire. Nickel-titanium and other metal wire devices may be formed by drawing the wire into a desired diameter and subsequently heat treating or otherwise forming the wire into a desired helical or other geometry.

In some embodiments, a flexible monofilament or single-stranded helical element, usually a metal wire, such as a nickel-titanium alloy, is formed into a bent, typically helical, geometry with sufficient cross-sectional radial strength, "hoop" strength, or crush resistance to open and support the walls of the channel to allow uveolymphatic fluid flow within Schlemm's canal. In some cases, a flexible monofilament or single-stranded helical element comprises sufficient longitudinal flexibility to conform to a peripheral or arcuate radius of Schlemm's canal. The single-stranded helical member may comprise a closed distal loop, coil or the like to permit easy insertion and tracking within the canal, a flexible open pitch intermediate section to permit conformance to and tenting of the canal along the natural arc of the canal, and a tightly pitched or partially opened pitch at a proximal end to permit a porting effect.

Dimensions for shape memory helical wire embodiments of the single elongated element in its bent configuration are set forth in Table I.

TABLE I

| | Broad Range | Medium Range | Narrow Range |
| --- | --- | --- | --- |
| Wire Diameter | 0.0001 mm to 1 mm | 0.01 mm to 0.15 mm | 0.05 mm to 0.1 mm |
| Helical Pitch (Distance between successive turns of the helix measured at midpoints of each turn) | 0.0001 mm to 10 mm | 0.1 mm to 2 mm | 0.15 mm to 1 mm |
| Helical Diameter (Measured at across outside of helical region of bent wire structure) | 0.0001 mm to 10 mm | 0.05 mm to 1 mm | 0.2 mm to 0.4 mm |
| Helical circumference per rotation | 0.0003 mm to 31 mm | 0.15 mm to 3.1 mm | 0.6 mm to 1.3 mm |
| Degrees of Arc | 0° to 360° | 300° to 360° | 340° to 350° |

In some cases, at least one end of the single elongated element is formed into or otherwise comprises a tubular structure or member, such as a helix having a tighter pitch and smaller diameter than those of the central region. Both ends of the single elongated element may be formed into a helix having a tighter pitch and smaller diameter than those of the central region, wherein tighter pitch can comprise a range from 0.001 mm to 1 mm, from 0.01 mm to 0.2 mm, and from 0.05 mm to 0.15 mm, and the smaller diameter is in a range from 0.001 mm to 1 mm, from 0.05 mm to 0.4 mm, and from 0.1 mm to 0.3 mm.

In some embodiments, the helical diameter of the single elongated element can be between 0.1 mm to 0.4 mm. In some embodiments, the helical diameter can be between 0.1 mm to 0.2 mm, 0.1 mm to 0.3, 0.1 mm to 0.4, 0.2 mm to 0.3 mm, 0.2 mm to 0.4 mm, or 0.3 mm to 0.4 mm. In some embodiments, the helical diameter can be between 0.25 mm to 0.35 mm. In some embodiments, the helical diameter can be between 0.25 mm to 0.30 mm, 0.25 mm to 0.35 mm, or 0.3 to 0.35 mm. In some embodiments, the diameter is 0.3 mm.

In some embodiments, the helical diameter of the single elongated element may be smaller to hold open the scleral spur and avoid obstructing perimetric collector channels. In some embodiments, the helical diameter can be between 0.01 mm to 0.1 mm. In some embodiments, the helical diameter can be between 0.01 mm to 0.04 mm, 0.01 mm to 0.06 mm, 0.01 mm to 0.08 mm, 0.01 mm to 0.1 mm, 0.04 mm to 0.06 mm, 0.04 mm to 0.08 mm, 0.04 mm to 0.1 mm, 0.06 mm to 0.08 mm, 0.06 mm to 0.1 mm, or 0.08 mm to 0.1 mm. In some embodiments, the helical diameter is between 0.04 mm to 0.06 mm. In some embodiments, the helical diameter is 0.05 mm.

In some embodiments, the helical circumference of each rotation of the single elongated element can be between about 0.0003 mm to 31 mm long. The helical circumference can be between 0.0003 mm to 0.003 mm, 0.0003 mm to 0.3 mm, 0.0003 mm to 3 mm, 0.0003 mm to 31 mm, 0.003 mm to 0.3 mm, 0.003 mm to 3 mm, 0.003 mm to 31 mm, 0.03 mm to 3 mm, 0.03 mm to 31 mm, 0.3 mm to 3 mm, 0.3 mm to 31 mm, or between 3 mm to 31 mm. In some cases, the helical circumference can be at least 1 mm, at least 3 mm, at least 5 mm, at least 7 mm, at least 9 mm, at least 11 mm, at least 13 mm, at least 15 mm, at least 17 mm, at least 19 mm, at least 21 mm, at least 23 mm, at least 25 mm, at least 27 mm, at least 29 mm, or at least 31 mm long.

In some embodiments, the helical circumference of each rotation of the single elongated element can be between about 0.15 mm to 3.1 mm. The helical circumference can be between 0.15 mm to 1 mm, 0.15 mm to 2 mm, 0.15 mm to 3.1 mm, 1 mm to 2 mm, 1 mm to 3.1 mm, or between 2 mm to 3.1 mm. In some embodiments, the helical circumference can be between 0.6 mm to 1.3 mm. The helical circumference can be between 0.6 mm to 0.8 mm, 0.6 mm to 1 mm, 0.6 mm to 1.2 mm, 0.6 mm to 1.3 mm, 0.8 mm to 1 mm, 0.8 mm to 1.2 mm, 0.8 to 1.3 mm, 1 mm to 1.2 mm, 1 mm to 1.3 mm, or between 1.2 mm to 1.3 mm. In some embodiments, the helical circumference can be no more than 0.6 mm, no more than 0.7 mm, no more than 0.8 mm, no more than 0.9 mm, no more than 1 mm, no more than 1.1 mm, no more than 1.2 mm, or no more than 1.3 mm.

The single elongated element is configured to follow an arc of a circumference of the channel of Schlemm's canal or the uveolymphatic region in the eye, wherein the arc subtends an angle comprising a degree of arc. In some embodiments, the single elongated element can proceed through some or all of the area radius of Schlemm's canal or the uveolymphatic region in the eye. Schlemm's canal or the uveolymphatic region in the eye proceeds 360 degrees around the eye. The single elongated element's arc degree can constitute the degree of rotation between two ends of the single elongated element. In some embodiments, the single elongated element's arc degree can be between 0 degrees to 360 degrees. In some embodiments, the single elongated element's arc degree is between 0 degrees to 60 degrees, 0 degrees to 120 degrees, 0 degrees to 180 degrees, 0 degrees to 240 degrees, 0 degrees to 300 degrees, 0 degrees to 360 degrees, 60 degrees to 120 degrees, 60 degrees to 180 degrees, 60 degrees to 240 degrees, 60 degrees to 300 degrees, 60 degrees to 360 degrees, 120 degrees to 180 degrees, 120 degrees to 240 degrees, 120 degrees to 300 degrees, 120 degrees to 360 degrees, 180 to 240 degrees, 180 to 300 degrees, 180 to 360 degrees, or between 240 to 360 degrees.

In some embodiments, the single elongated element's arc degree is no less than 0 degrees and no more than 360 degrees. In some embodiments, the single elongated element's arc degree is no more than 10 degrees, 20 degrees, 30 degrees, 40 degrees, 50 degrees, 60 degrees, 70 degrees, 75 degrees, 80 degrees, 90 degrees, 100 degrees, 110 degrees, 120 degrees, 130 degrees, 140 degrees, 150 degrees, 160 degrees, 170 degrees, 180 degrees, 190 degrees, 200 degrees, 210 degrees, 220 degrees, 230 degrees, 240 degrees, 250 degrees, 260 degrees, 270 degrees, 280 degrees, 290 degrees, 300 degrees, 310 degrees, 320 degrees, 330 degrees, 340 degrees, 350 degrees, or 360 degrees.

In some embodiments, the single elongated element's arc degree constitutes full perimetric coverage. In some embodiments, the single elongated element's arc degree constitutes near-full perimetric coverage. Perimetric coverage can refer to following along, or covering, the perimeter or circumference of something. In some cases, the single elongated element follows substantially a full circumference of the channel of a uveolymphatic region in the eye or of the Schlemm's canal. As a non-limiting example, the single elongated element can follow a degree of arc between approximately 300 degrees and approximately 360 degrees. In some embodiments, substantially a full circumference of the channel comprises over 50%, over 60%, over 70%, over 80%, over 90%, or 100% of the circumference of the channel.

Larger coverage can improve the single elongated element's ability to interact with collector channels, thereby improving movement of liquid through Schlemm's canal or the uveolymphatic region in the eye. A larger arc degree of the single elongated element may cause more blockage of collector channels, so there must be sufficient void space to interact with collector channels without blocking them. In some embodiments, larger coverage may improve fluid movement in glaucoma patients by accessing more collector channels. In some cases, full perimetric coverage may improve fluid movement in glaucoma patients by accessing more collector channels. In some cases, full perimetric coverage may improve fluid movement in patients with moderate to severe glaucoma. Moderate to severe glaucoma can be classified as an intra-ocular pressure of approximately 15 mm Hg or less.

In some embodiments, the increase in collector channels access in devices with larger coverage can be less than 2× increase, 2× increase, 3× increase, 4× increase, 5× increase, 6× increase, or more than a 6× increase. In some cases, full perimetric coverage may increase access to collector channels by less than 2× increase, 2× increase, 3× increase, 4× increase, 5× increase, 6× increase, or more than a 6× increase.

The single elongated element's arc degree can be between about 300 to 360 degrees. In some embodiments, the single elongated element's arc degree is between 300 to 310 degrees, 300 to 320 degrees, 300 to 330 degrees, 300 to 340 degrees, 300 to 350 degrees, 300 to 360 degrees, 310 to 320 degrees, 310 to 330 degrees, 310 to 340 degrees, 310 to 350 degrees, 310 to 360 degrees, 320 to 330 degrees, 320 to 340 degrees, 320 to 350 degrees, 320 to 360 degrees, 330 to 340 degrees, 330 to 350 degrees, 330 to 360 degrees, 340 to 350 degrees, 340 to 360 degrees, or between 350 to 360 degrees. In some embodiments, the arc degree is between approximately 340 degrees to 350 degrees.

In some embodiments, one or more single elongated elements can be implanted into a Schlemm's canal or uveolymphatic canal in series to achieve full perimetric coverage. In some embodiments, one or more single elongated elements can be implanted into a Schlemm's canal or uveolymphatic canal in series to achieve near-full perimetric coverage. In some embodiments, one or more single elongated elements can be implanted into a Schlemm's canal or uveolymphatic canal in series to achieve a total arc degree of between 0 degrees to 360 degrees. In some embodiments, one or more single elongated elements can be implanted into a Schlemm's canal or uveolymphatic canal in series to achieve a total arc degree of between about 300 degrees to 360 degrees. In some embodiments, one or more single elongated elements can be implanted into a Schlemm's canal or uveolymphatic canal in series to achieve a total arc degree of between about 340 degrees to 350 degrees. In some cases, the number of single elongated elements to be implanted into a Schlemm's canal or uveolymphatic canal can be 1, 2, 3, 4, 5, 6, or more than 6 single elongated elements in series to achieve full or near-full perimetric coverage.

In further embodiments of the device for maintaining or restoring patency of the present disclosure, the single elongated element may comprise any one or more of a variety of features, such as a radius of curvature selected to approximate the radius of curvature of the uveolymphatic canal or the Schlemm's canal of the eye. The single elongated element may be polished via mechanical, chemical or electrochemical methods to improve finish and biocompatibility. The single elongated element may comprise at least one end formed in a loop. The single elongated element may have at least one end formed as a tightly wound coil. The single elongated element may comprise at least one feature at one or more ends thereof configured to facilitate manipulation. The single elongated element may be at least partially biodegradable or bioresorbable. The single elongated element may comprise a drug-eluting member formed on a surface thereof or embedded therein. The single elongated element may comprise a hydrophilic or hydrophobic coating to aid in the safety and efficacy of the device within the eye. The single elongated element may include a by-pass feature configured to permit aqueous flow between Schlemm's canal and an anterior chamber of the eye, where the by-pass feature may locate at an entry, an exit, or along a length of the device.

While the single elongated element may comprise a single-stranded or other elongated element from other structure, the device may comprise additional elements and features, such as structures located, coupled, or attached at either or both ends of the single elongated expansion member for assisting in manipulation or anchoring of the device in the uveolymphatic region and/or in the Schlemm's canal. Such features may comprise, for example, tubular, helical or other structures located at a proximal end of the single elongated element and configured to extend across the channel into the anterior chamber to create by-pass for fluid flow. In some cases, such features disposed at either of both ends on a single-stranded device can be formed from the single strand itself, e.g., by varying the pitch of a helical filament.

Disclosed herein are manipulation features 403 contained within devices disclosed herein, such as SES 401. In some embodiments, the SES 401 can include one, two, or many manipulating features 403 including, but not limited to, barbs, grooves or loops to allow easy anchoring, capture, re-alignment, re-positioning and removal of the SES 401, when needed. The manipulation feature may be on or off axis. The manipulation feature may be inside or outside the canal wall. The manipulation feature may be penetrating or non-penetrating with respect to the canal wall. Some embodiments of the manipulation features allow control for reversibility of the procedure by removing the SES from the eye. In some embodiment, the SES comprises a manipulating feature that is anchored inside the canal wall to allow subsequent manipulating of the SES. In some cases, the SES can be delivered in a shrunken or smaller state by manipulating temperature of the SES using external energy (electrical, mechanical, thermal, RF, light, etc.).

In some embodiments, the devices described herein comprise one or more manipulation features proximate at least one of the proximal ends and the distal end. In some embodiments, the one or more manipulation features are selected from the group comprising an eyelet, a hook, and a loop. In some embodiments, the one or more manipulation features are selected from the group comprising of an eyelet, a hook, and a loop. In some embodiments, the manipulation features are used for anchoring into the canal.

Figure 4A:
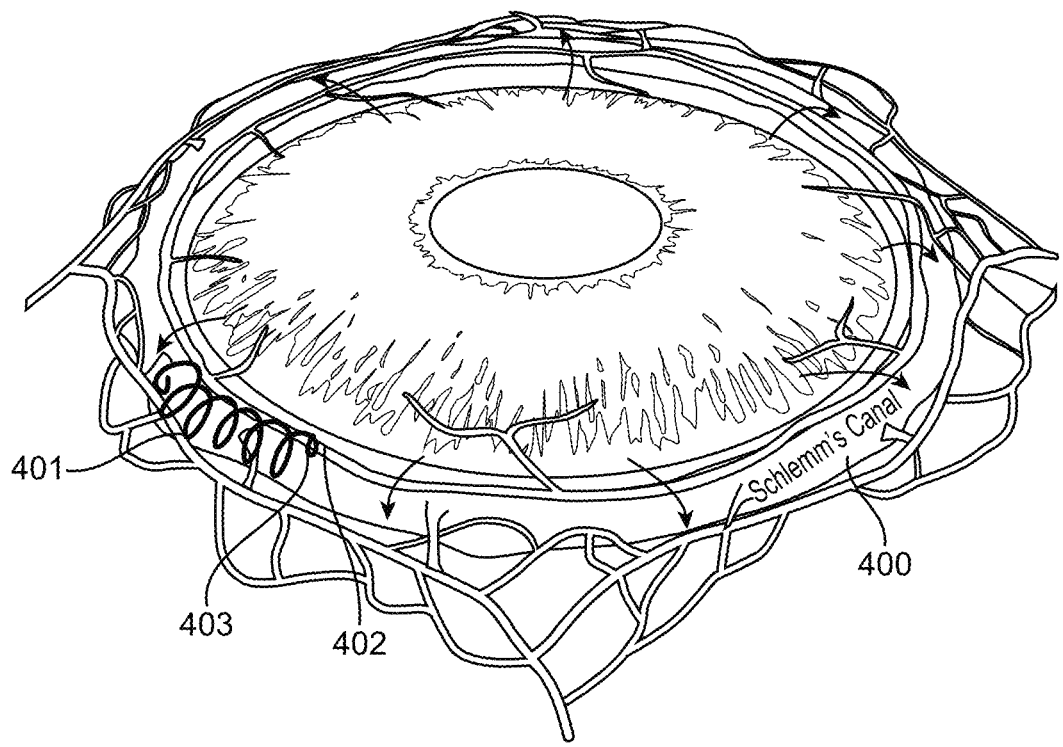
FIG. 4A illustrates an isometric sketch of the eye with a variant of the self-expanding eye stent (SES) device in a helical form dilating the uveolymphatic vessel or Schlemm's canal.
Figure 4B:
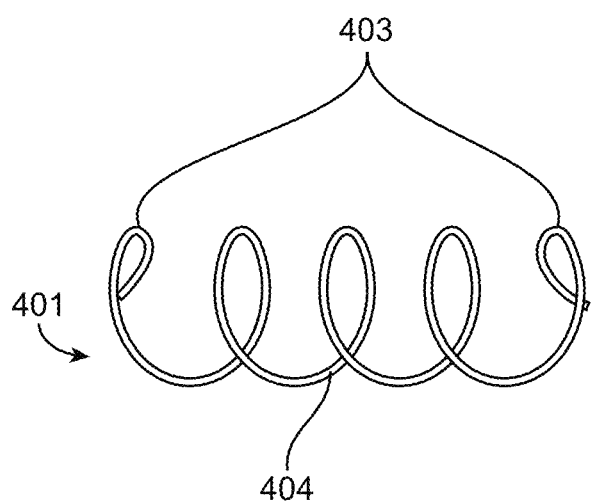
FIGS. 4B and 4C illustrate variant of the self-expanding eye stent (SES) device in a helical form with the manipulating features and tension rings in axially expanded and contracted configurations.
Figure 4C:
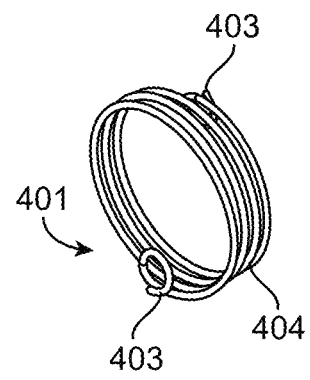

Disclosed herein are embodiments of prosthetic devices such as SES 401 in a wire form with a manipulating feature or features 403 at the proximal or distal end of the SES. FIG. 4B illustrates various views of such an embodiment. The manipulating feature can be, for example, an eyelet 403 extending radially inwardly or outwardly in other embodiments, or other features as disclosed elsewhere herein.

Disclosed herein are embodiments of prosthetic devices such as SES 401 in a flat or angulated ribbon form with a manipulating feature or features 403 at the proximal or distal end of the SES. For example, the structure can be helical with a plurality of revolutions as shown, with a flattened cross-section such as oval or rectangular for example. FIGS. 5A-5C illustrate various views of an embodiment of the SES 401 where the tension rings 404 are continuous along the length of the SES 401, but in varying diameter. In other embodiments, either or both of the central or lateral portions can have gradual or stepped variable diameters. Manipulation features 403, such as eyelets or other disclosed herein, can be attached, connected, or integrally formed at one or both ends of the device, or at other locations, and be made of the same, or different materials as the rest of the device itself. In some embodiments, the expanded length and/or number of rotations of the larger diameter central portion is about, or no more than about 50%, 60%, 70%, 80%, 90%, or more of that of the entire expanded length and/or number of rotations of the device.

Figure 6A:
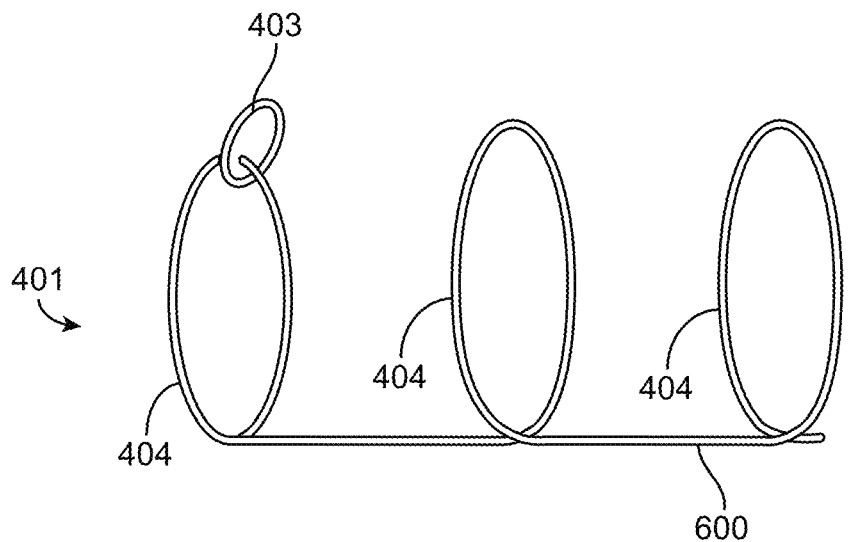
FIG. 6A illustrates a variant of the self-expanding eye stent (SES) device where the device is connected by a structural feature holding the multiple tension rings.
Figure 6B:
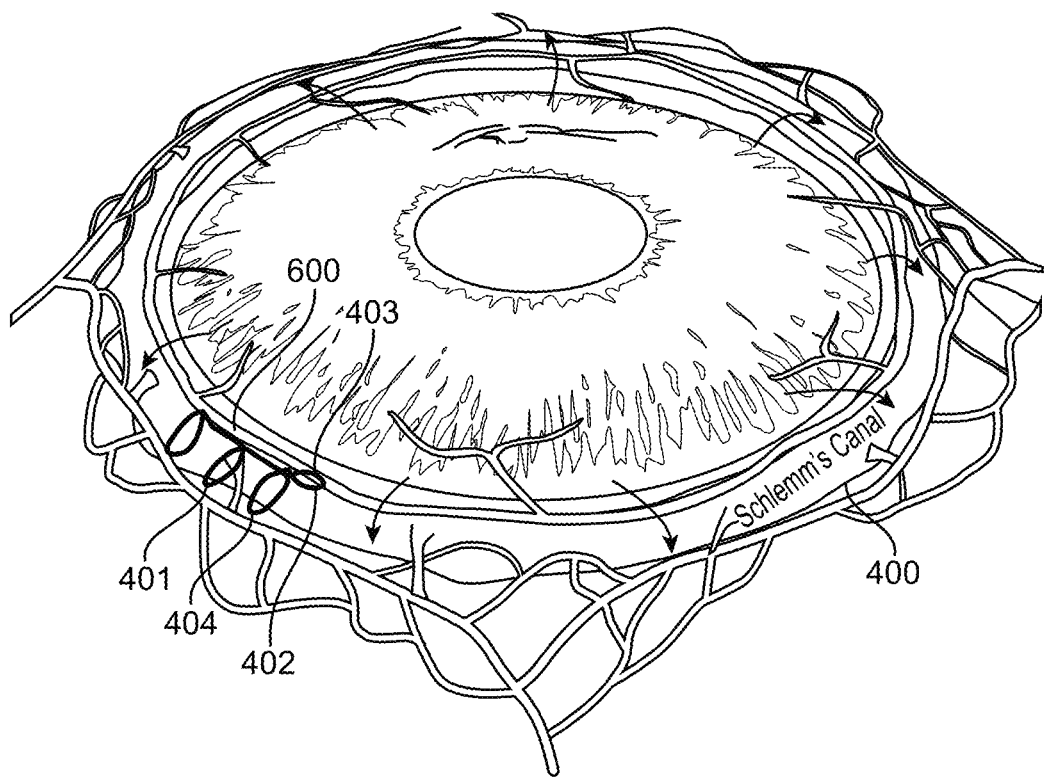
FIG. 6B illustrates a variant of this SES device dilating the uveolymphatic vessel or Schlemm's canal.

Disclosed herein are embodiments of prosthetic devices, including SES 401 that can connect eye tension rings 404 via a connecting anchor or support structure 600 for stability, as shown in FIGS. 6A and 6B. In some embodiments, there may be several of the eye tension rings 404 connected in a similar continuous or separate manner.

Figure 7A:
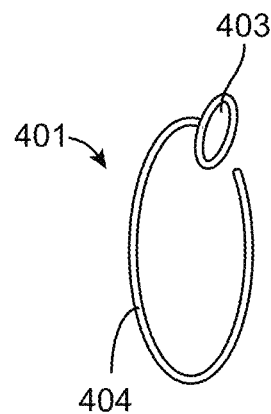
FIG. 7A illustrates a variant of the self-expanding eye stent (SES) device where the device is a single tension ring with a manipulating feature.
Figure 7B:
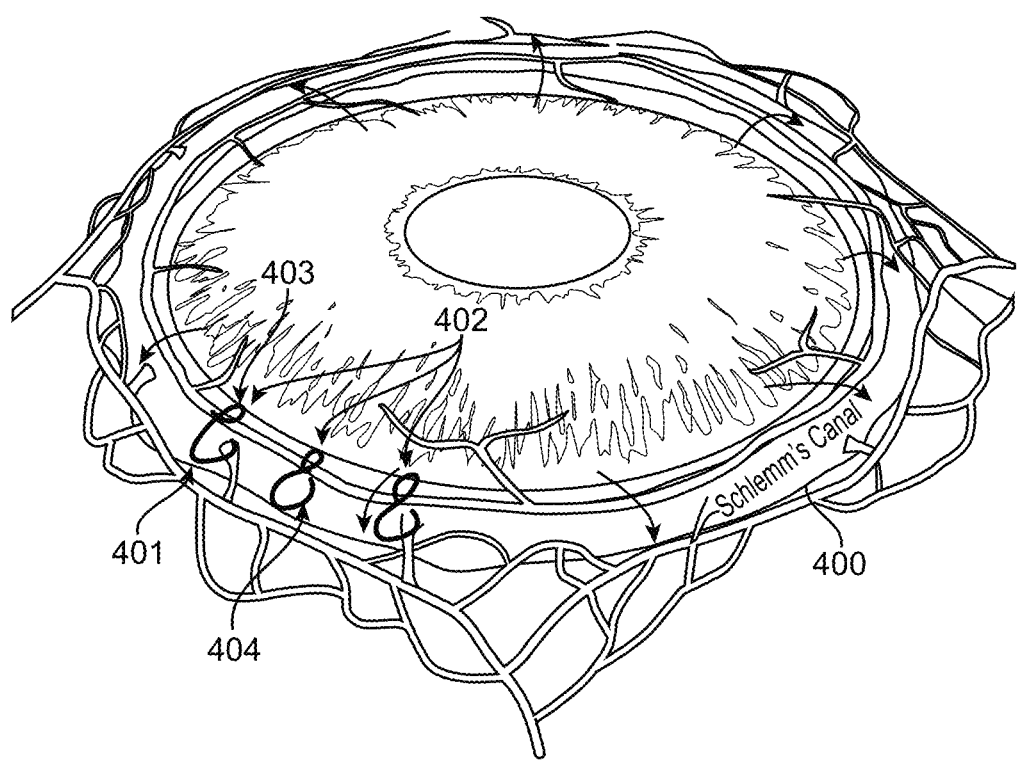
FIG. 7B illustrates a variant of this SES device dilating the uveolymphatic vessel or Schlemm's canal in multiple locations within the canal.

Disclosed herein are embodiments of prosthetic devices, including SES 401 that are non-continuous independent tension rings 404 with a manipulating feature 403 that may be positioned outside or inside the canal 400, as shown in FIGS. 7A and 7B. In some embodiments, these SESs 401 may be inserted one at a time or several across various locations within the canal 400.

Figure 8A:
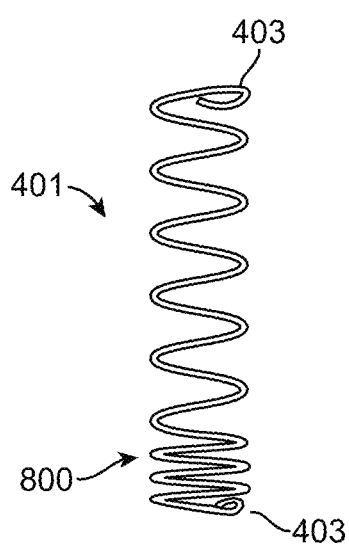
FIGS. 8A and 8B illustrate variants of the self-expanding eye stent (SES) device where the device has variable pitch with an entry by-pass feature and a manipulating feature.
Figure 8B:
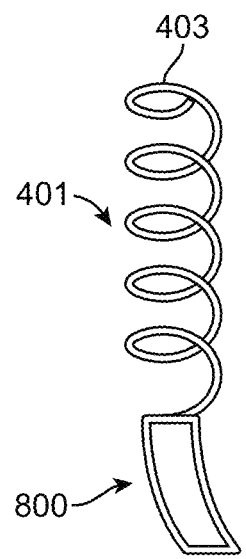
Figure 8C:
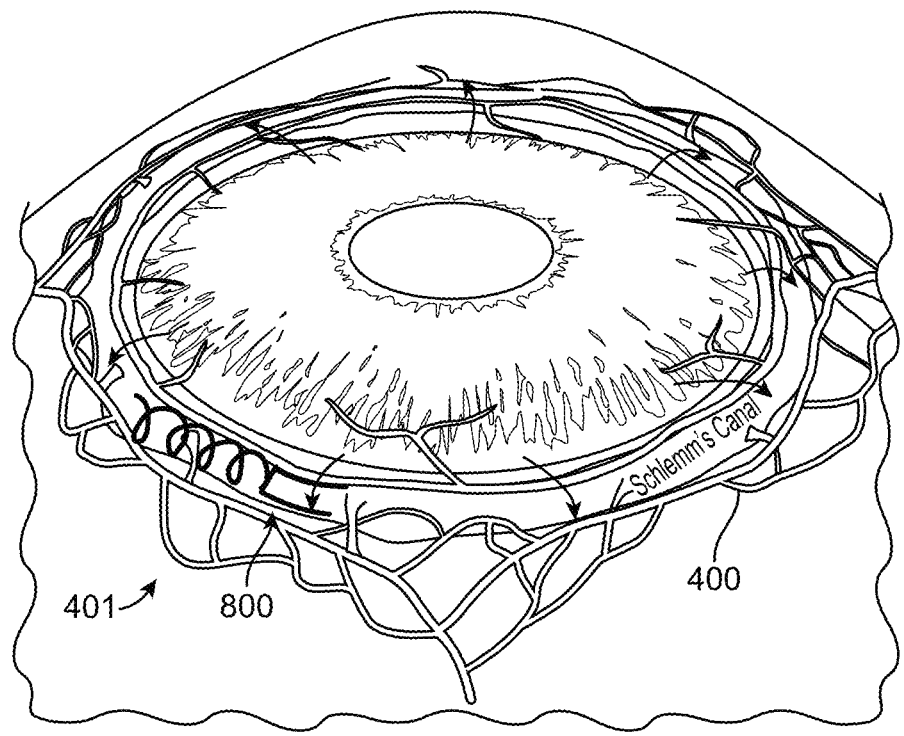
FIG. 8C illustrates a variant of this SES device dilating the uveolymphatic vessel or Schlemm's canal while the by-pass feature is within or through the canal wall.

Disclosed herein are embodiments of prosthetic devices, including SES 401 that are of variable pitch and length, as shown in FIGS. 8A and 8B. The SES 401 may have a by-pass and dilating feature 800 to regulate aqueous flow through the canal and by-pass of fluid within and across the canal. This feature 800 may be at the entry of the canal wall as shown in FIG. 8C, which may also serve to anchor the SES 401 in the canal along with ease of manipulation to reposition or retrieve the SES 401 device within or away from the canal.

Figures 9A, 9B, 9C, 9D:
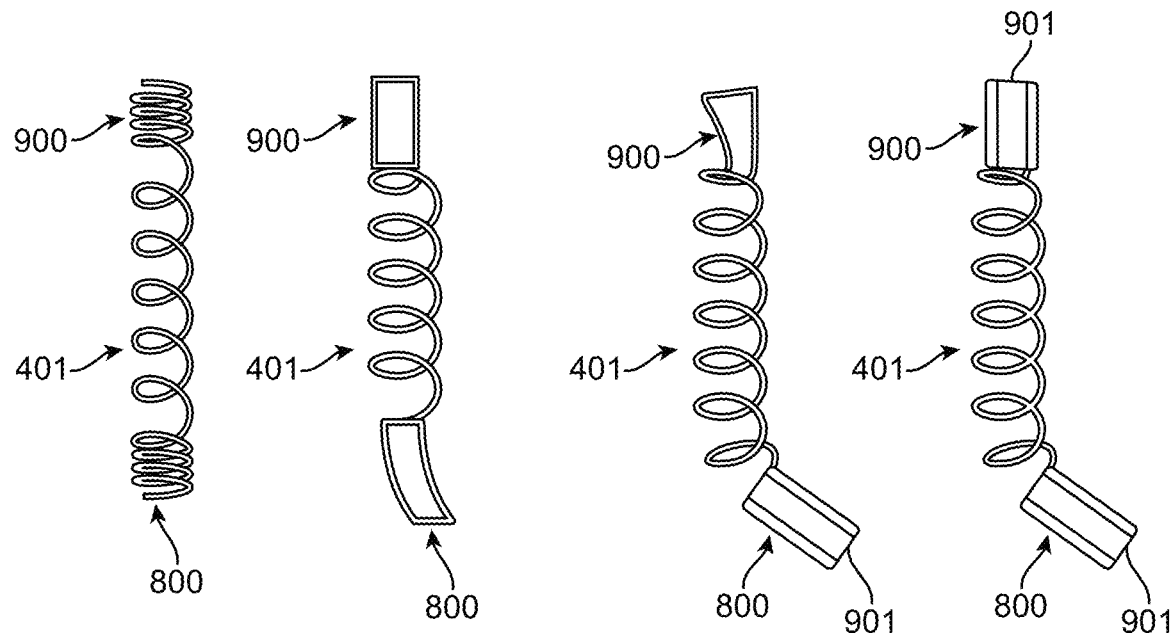
FIGS. 9A-9D illustrate variants of the SES device where the device has variable pitch with a double entry by-pass features and manipulating features.
Figure 9E:
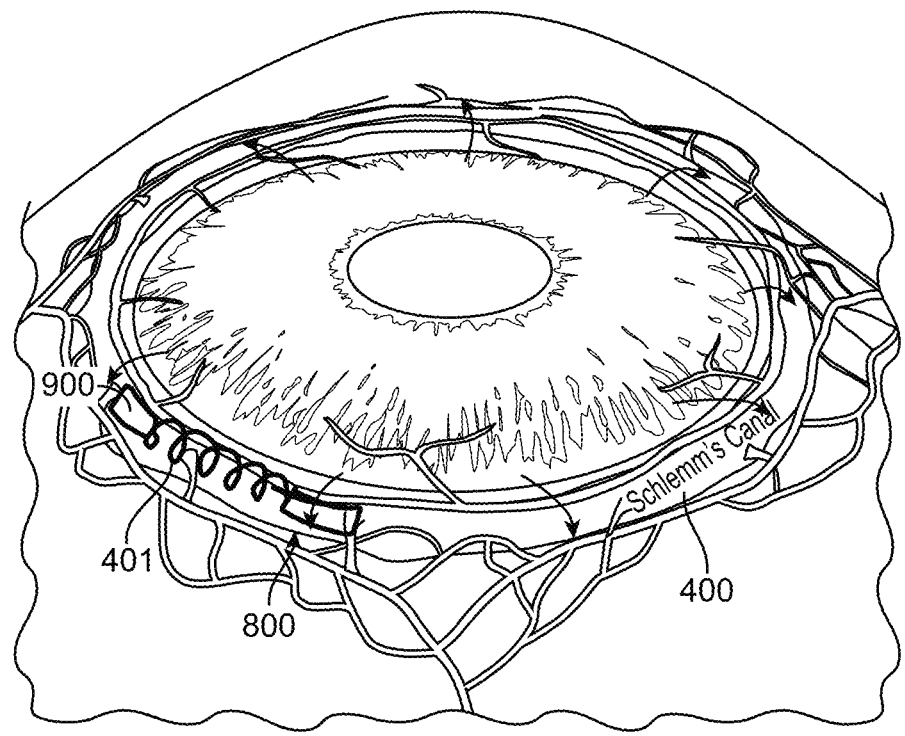
FIG. 9E illustrates a variant of this SES device dilating the uveolymphatic vessel or Schlemm's canal while by-pass features at either end are within or through the canal walls.
Figure 10A:
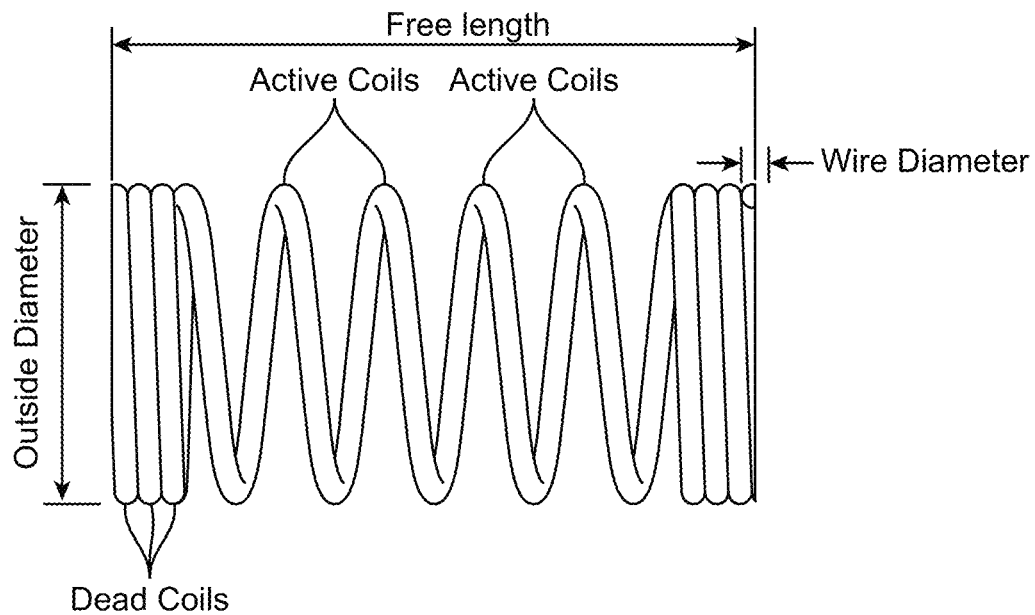
FIGS. 10A-10F illustrates variants of the SES device where the device has variable pitch along the free length of the helical coil of the SES.
Figure 10B:
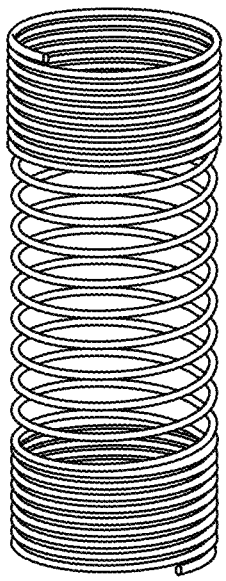
Figure 10C:
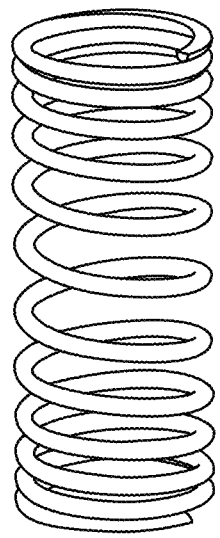
Figure 10D:
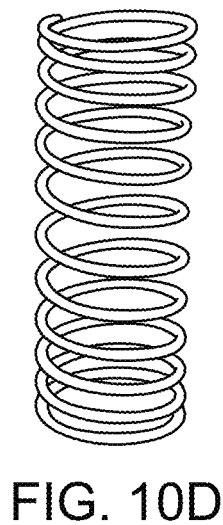
Figure 10E:
Figure 10F:
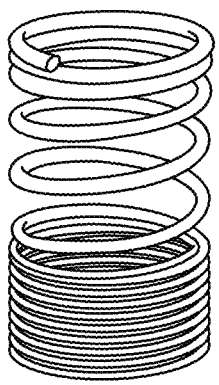

Disclosed herein are embodiments of prosthetic devices, including SES 401 that are of variable pitch and length, as shown in FIGS. 9A-9D. The SES 401 may have multiple by-pass and dilating features 800 and 900 to regulate aqueous flow through the canal and by-pass of fluid within and across the canal. These features 800 or 900 may be at each end of the SES device 401 or continuously along the length of the device 401. These features as shown in FIGS. 9A-9D may also serve to anchor the SES 401 in the canal along with ease of manipulation to reposition or retrieve the SES 401 device within or away from the canal, as shown in FIG. 9E. Additionally, these features may have varying inner diameter 901, similar to tube or channels to control entry and out-flow of fluid across and within the canal. Additionally, the entry access or by-pass features 800 or 900 may be at multiple locations along the length of canal in a given embodiment and may be fully enclosed within the canal, or partially or fully across the canal into the anterior chamber.

Disclosed herein are embodiments of prosthetic devices, including SES 401 that are of variable pitch across the free length of the SES 401, as shown in FIGS. 10A-10F. The variation of the pitch of the helical coil of the SES 401 may be utilized to regulate and customize dilation, by-pass, anchor, and manipulation of the SES 401 to regulate aqueous flow and IOP.

Disclosed herein are embodiments of prosthetic devices, including SES 401 that are of variable pitch and diameter and shape across the free length of the SES 401, as shown in FIGS. 11A-11J. The variation of the pitch and diameter of the helical coil along the free length of the SES 401 may be utilized to regulate and customize dilation, by-pass, anchor, and manipulation of the SES 401 to regulate aqueous flow and IOP.

Disclosed herein are embodiments of prosthetic devices, including SES 401 that have unique shapes, such as hooks or C-loops or rings or eyelets to control positioning, deployment, anchoring, removal, retrieval, and general manipulation of the SES 401. These features may allow the SES 401 to regulate and customize dilation, by-pass, anchor, and manipulation of the SES 401 to regulate aqueous flow and IOP.

Disclosed herein are embodiments of prosthetic devices, including SES 401 that have a polymeric sheath across the SES 401. Some embodiments, with reference to FIGS. 13A and 13B, may have the sheath across the coil of the SES 401 at the entry, exit, center, or various zones within the length of the SES 401, or continuously through the entire length of SES. This sheath may allow regulation and customization of dilation, by-pass, anchor, and manipulation of the SES 401 to regulate aqueous flow and IOP. The polymeric sheath may be made of various degradable and non-degradable polymers, including polytetrafluoroethylene (PTFE), silicone, lubricants, degradable polymers, hydrophobic polymers, hydrophilic polymers, hybrid polymers, etc. The polymeric sheath may be continuous or discontinuous across the length and diameter of the SES 401. The polymeric sheath may be cast, molded, spray-coated, dip-coated, or coated using other techniques over the base metal, alloy or polymeric coil that constitutes the SES 401.

Figure 14:
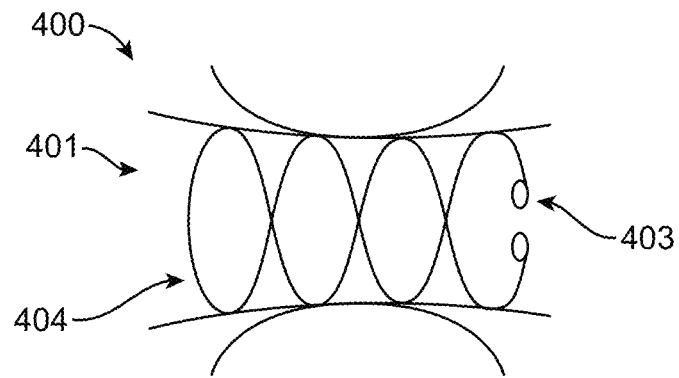
FIG. 14 illustrates a variant of the SES device where the device is a double helical coil with manipulation features.

Disclosed herein are embodiments of prosthetic devices, including SES 401 that can form a double-helix or return pattern as shown in FIG. 14, in some cases with two discrete ends distally and a continuous loop end proximally without free ends. In some embodiments, there are two manipulating features 403 shown with both in the entry plane on the distal end of the device 401, although some embodiments can include only one, or three, four or more manipulating features for example.

Disclosed herein are embodiments of prosthetic devices, including SES 401 that are configured to be delivered in a minimally invasive form and retain the intended shape in-situ. In some embodiments, the SES may be circular in shape with multiple sweeps or rotations. In some cases, SES 401 may have between about 2 to 30 total sweeps or rotations, whole or partial sweeps, such as 2, 3, 4, 5, 6, 7, 8, 9, 10, 12, 15, 20, 25, or 30 sweeps, or ranges including any two of the foregoing values. In some embodiments the pitch, the separation between each ring, can be between about 0.0001" and about 0.1", such as about 0.0001", 0.0005", 0.001", 0.002", 0.003", 0.005", 0.01", 0.05", 0.1", or ranges including any two of the foregoing values. Disclosed herein are embodiments that either partially or wholly cover the Schlemm's canal, such as for example, at least about, about, or no more than about 10%, 20%, 30%, 40%, 50%, 60%, 70%, 80%, 90%, 100% of the axial length of the Schlemm's canal, or ranges including any two of the foregoing values The illustrations shown here also demonstrate the manipulation features 901 that allow ease of manipulation, relocation, and retraction using a separate retrieving device. In some embodiments, the implanted SES will not extend axially into any other uveal regions. In some embodiments, the implanted SES extends axially into one or more of the uveal or trabecular meshwork regions.

Disclosed herein are embodiments of prosthetic devices, including SES 401 that are delivered in a minimally invasive form and retain the intended shape in-situ. In some embodiments, the SES may be circular in shape with multiple sweeps or rotations. In some variants, SES 401 may have 2 to 30 total sweeps or rotations, whole or partial sweeps. In some embodiments, the pitch, the separation between each ring, can be between 0.0001" to 0.1". Disclosed herein are embodiments that either partially or wholly cover the Schlemm's canal. The illustrations shown here also demonstrate the manipulation features 403 that allow ease of manipulation, relocation, and retraction using a separate retrieving device. In some embodiments, the central portion of the SES may have the largest diameter to allow better anchoring within the Schlemm's canal and prevent migration within the, with gradually decreasing diameters from the central portion to one or both ends.

In some embodiments, the larger diameter portions of the prosthetic devices can have an average or maximum diameter, for example, about or at least about 5%, 10%, 15%, 20%, 25%, 30%, 35%, 40%, 45%, 50%, 60%, 70%, 80%, 90%, 100%, or more relative to the average or maximum diameter of the smaller diameter portions, or ranges including any two of the foregoing values.

Figure 16A:
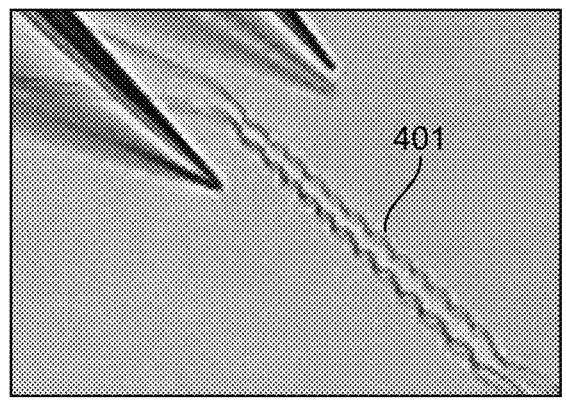
FIG. 16A are photographic images of the SES device made with shape-memory alloys and polymeric materials.
Figure 16B:
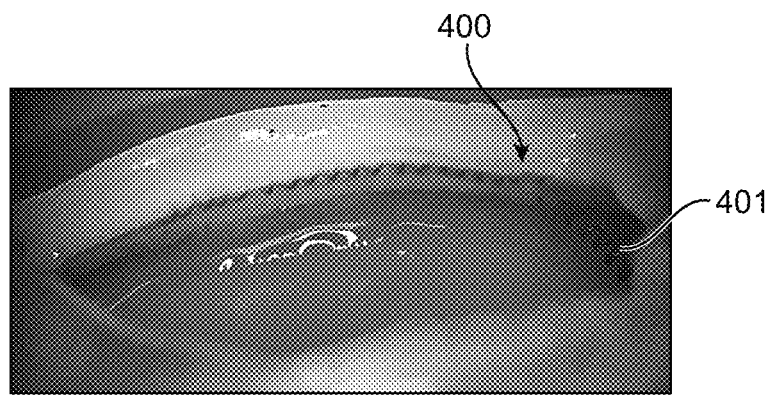
FIGS. 16B and 16C are photographic images of the SES device in-situ in the uveolymphatic vessel adequately dilated.
Figure 16C:
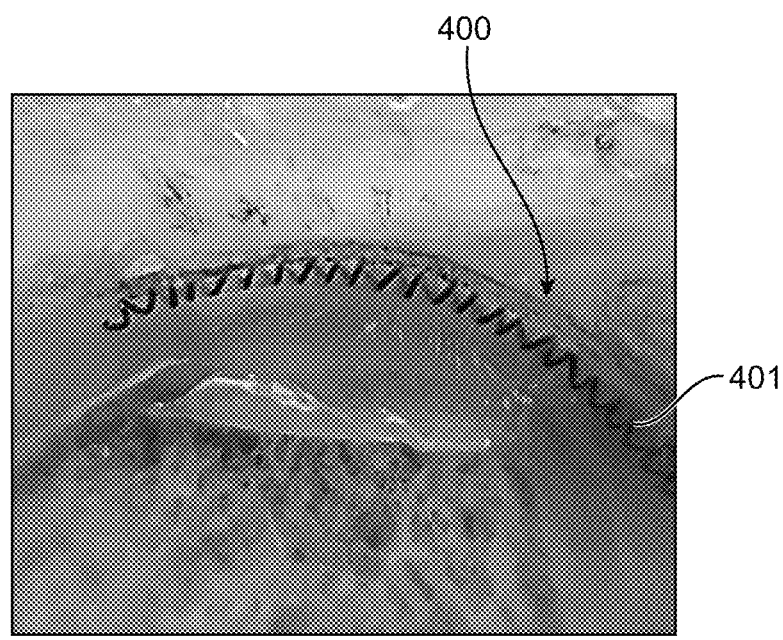

In some embodiments the SES device 401 may be directly implanted and slid into the uveolymphatic canal. FIG. 16A illustrates variants of the SES device made with shape-memory alloys and polymeric materials. FIGS. 16B and 16C show the SES device 401 in-situ in the uveolymphatic vessel 400, adequately dilating the canal or vessel. Embodiments shown in FIG. 16A may be utilized depending on the required dilation of the canal or vessel.

Figure 17:
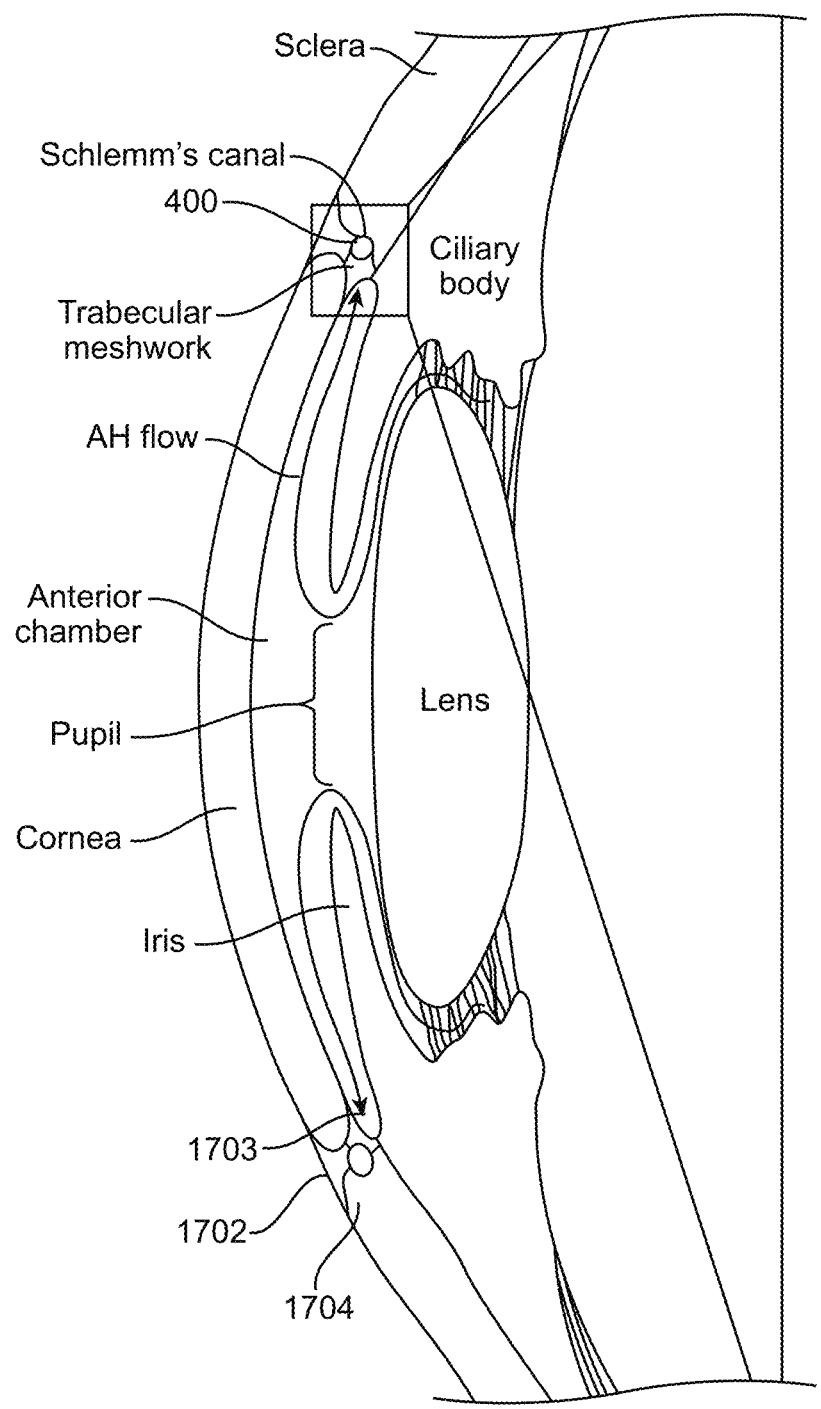
FIG. 17 illustrates a cross-sectional view of the eye, with indications for various locations of possible insertion of the SES device into the uveolymphatic vessel.

In some embodiments the SES device 401 may be delivered into the uveolymphatic canal or Schlemm's canal from the angle in the anterior chamber 1703, outside the eye in the sub-conjunctival region, the limbus region 1702, or the scleral region 1704. FIG. 17 illustrates a cross-sectional view of the eye, with indications for various locations of possible insertion of the SES device to access the uveolymphatic vessel or Schlemm's canal. One location shown in FIG. 17 is from the angle 1703 inside the anterior chamber of the eye. Other locations outside the eye, such as the limbus region 1702 or the sclera 1704 may be utilized to make an incision and access the uveolymphatic canal 400 directly below or underneath the scleral tissue. The access may be made easier by selective staining or dying of the canal. Such an access may provide additional benefits in safety and ease of delivery. Additionally, the corneal region may also be used as a location for first incision.

Figure 24A:
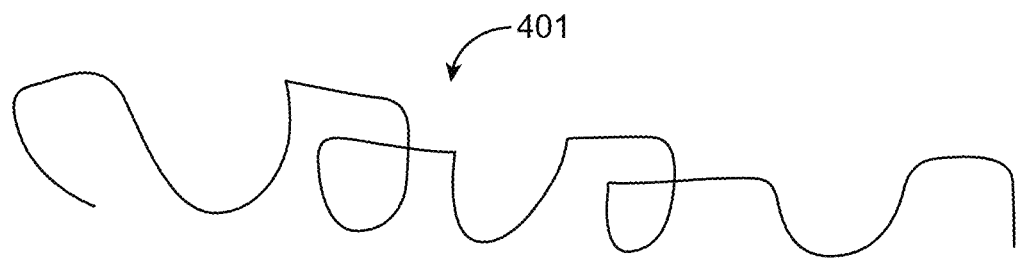
FIGS. 24A-24C illustrate a variant of an SES device and delivery system that utilizes a guide-wire to control the advancement, deployment, and retraction of the SES device.
Figure 24B:
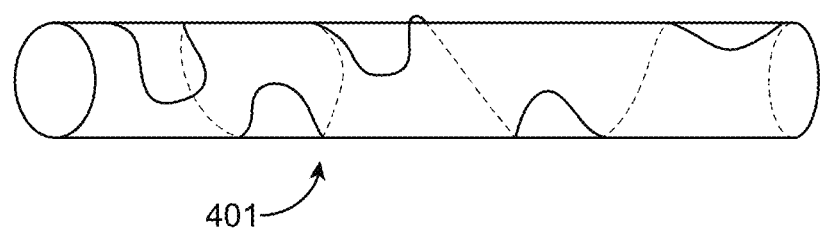
Figure 24C:
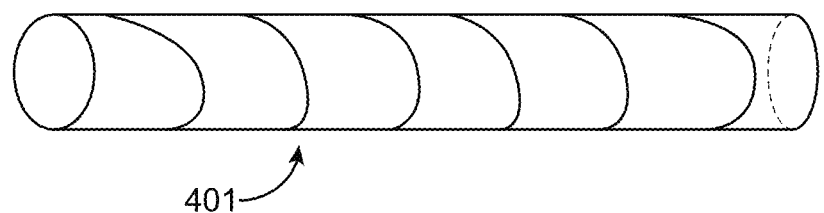

Disclosed herein are variants of the SES device 401 in a wire form that may be developed in non-helical forms with partial or semi-circular sweeps. In some embodiments, the SES device 401 in the wire form may have sweeps or turns, either complete or partial, to adequately stent the longitudinal section of the canal 400. FIGS. 24A-24C contain illustrations and examples of some such embodiments.

Figure 25A:
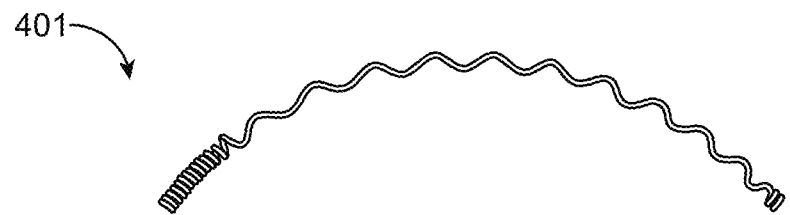
FIG. 25A illustrates a variant of a curved and electropolished SES device with wide pitch along the length of the device and a tighter finished closed loop ends.
Figure 25B:
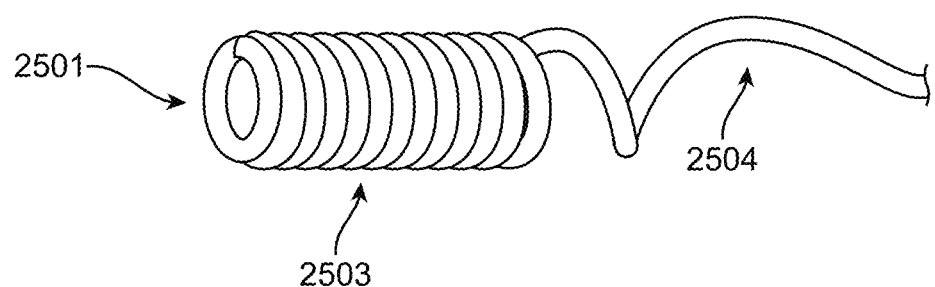
FIGS. 25B and 25C illustrate closer view of the proximal and distal end, respectively.
Figure 25C:
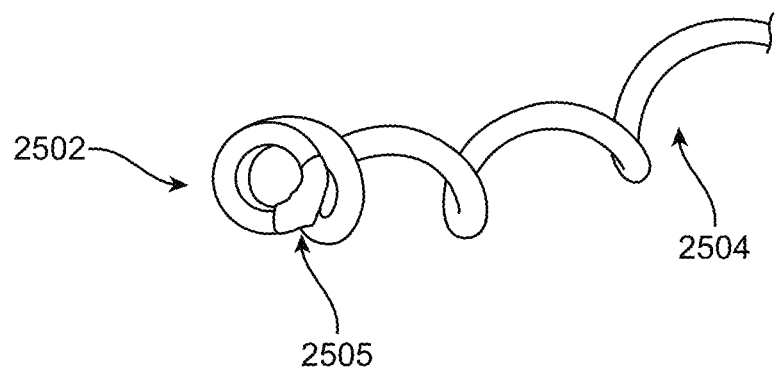

FIGS. 25A-25C illustrate a curved and electropolished SES device 401 formed from a wire. In some embodiments, the wire is a single-stranded, helical, nickel-titanium or other metal wire. The SES device 401 of FIG. 25A displays a variable pitch along the length of the device and finished closed loop ends as illustrated in FIGS. 25B and 25C. In some embodiments, the radius of curvature for the SES device 401 may be designed to approximate the curvature of the uveolymphatic canal perimeter in the globe, so that no forces are applied which can deform the canal. In addition to having a conforming shape, in some embodiments the SES 401 be highly flexible with a very low bending stiffness so that no significant deforming forces will be transmitted to the canal even if there is a mismatch between the shape of the SES device and the shape of the canal and channel. In some embodiments, the radius of curvature and stiffness properties of the SES device may be designed to provide some tension or additional expansion to improve the drainage through the collector channels.

In some embodiments, the SES device 401 may display one or more of (1) a very high flexibility, (2) a sufficient column strength to allow self-insertion, and (3) a sufficient hoop strength or crush resistance to maintain or restore patency of the canal or channel. The SES device 401 may have low bending stiffness along its length and so that it has minimal or no ability to deform the curvature of the Schlemm's canal or the uveolymphatic canal perimeter. In such cases, the width, diameter, or cross-section of the coiled or otherwise bent wire in the main body 2504 can be sufficient to open and support the walls of the uveolymphatic canal to promote drainage of uveolymphatic fluid through the collector channels 2603, as described below.

While the helical monofilament SES device 401 of the present disclosure can have a low bending stiffness and high flexibility, they may have sufficient column strength so that they may be inserted into and advanced through at least a portion of the Schlemm's canal without the use of a supporting mechanism or other deployment structure during implantation.

Additionally, the helical turns or other bends of the SES device 401 may be configured to open and support the walls of the Schlemm's canal or the uveolymphatic canal perimeter after the SES device is implanted therein so that fluid may flow through the main channel of the Schlemm's canal or the uveolymphatic canal into the surrounding collector channels.

FIGS. 25B and 25C illustrate closer views of the proximal and distal end, respectively. In some embodiments, the proximal end 2501, distal end 2502, or both of the SES may have tighter, often but not necessarily closed, pitch 2503 in comparison to the main body 2504 of the device to allow smoother travel across the channel during delivery and additionally act as a by-pass into the aqueous chamber for improved circulation and drainage of fluid. The main body of the SES device 401 may have wider pitch 2504 to balance the least amount of material required to keep the uveolymphatic channel dilated for aqueous patency. In some embodiments, the SES may be processed via polishing methods such as mechanical, chemical, electrochemical polishing methods to improve the finish of the surface(s) as well as improve the biocompatibility of the surface(s). In some embodiments, the ends of the SES may be welded or otherwise rounded using LASER, heat, microwave, or other energy sources to form a closed loop 2505 or other desired shape for ease of travel and safer implantation, as shown in FIG. 25C.

In some cases, welded ends or otherwise rounded ends may be smooth. Welded or otherwise rounded ends may have equal diameter as the body of the device. Welded or otherwise rounded ends may have a different diameter than the body of the device. The diameter can be smaller, thus creating a tapered look of the device at one or more ends of the SES. In some embodiments, a device with a tapered entry can allow for a smooth delivery to the Schlemm's canal or uveolymphatic channel. In some embodiments, tapered ends can allow for a smooth insertion into the canal or channel. In some cases, tapered ends can allow for a smooth travel through the canal or channel once implanted.

Figure 26A:
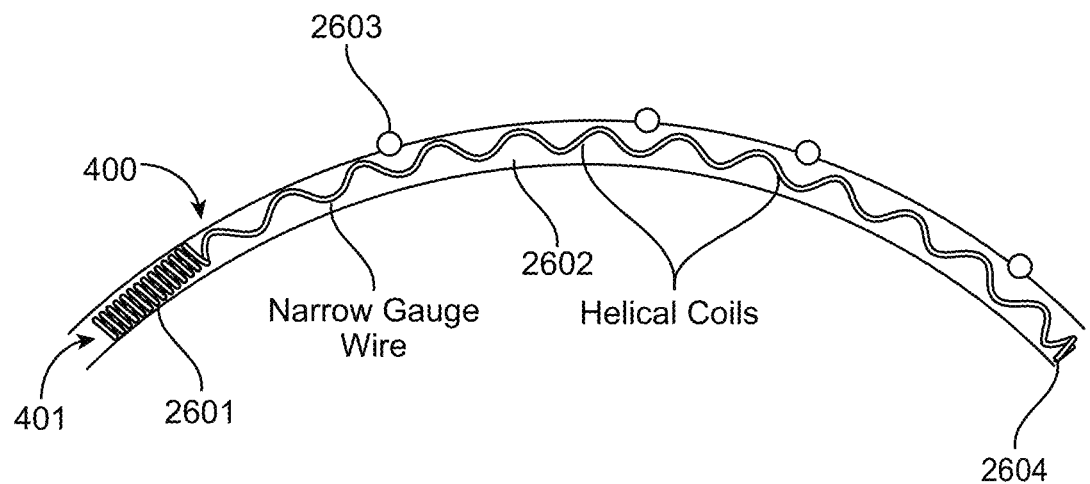
FIG. 26A illustrates a variant of a curved and electropolished SES device in situ in the uveolymphatic canal.
Figure 26B:
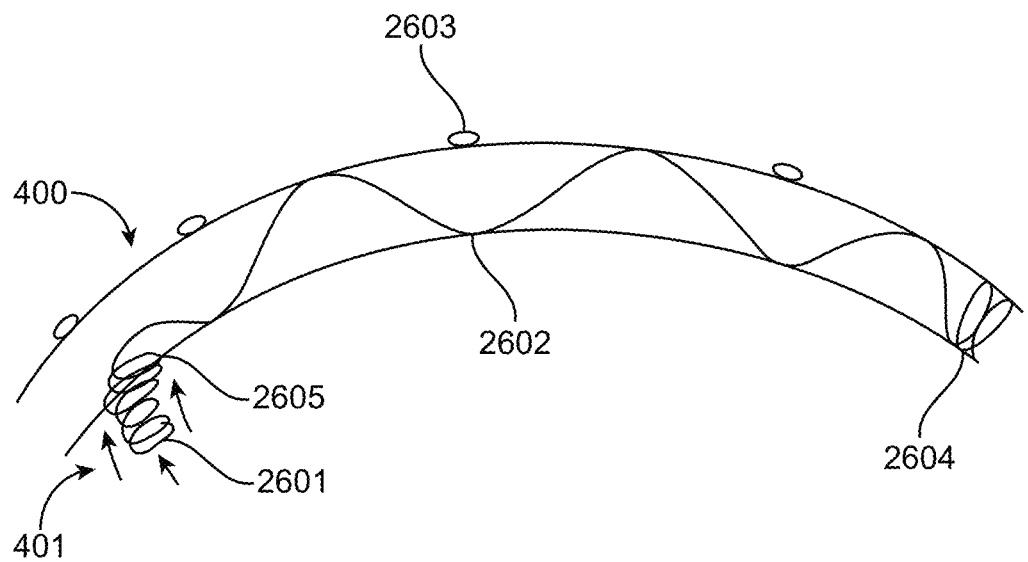
FIG. 26B illustrates a variant of a curved and electropolished SES device in situ in the uveolymphatic canal with the proximal end extended across the channel into the anterior chamber to create by-pass for fluid flow.
Figure 26C:
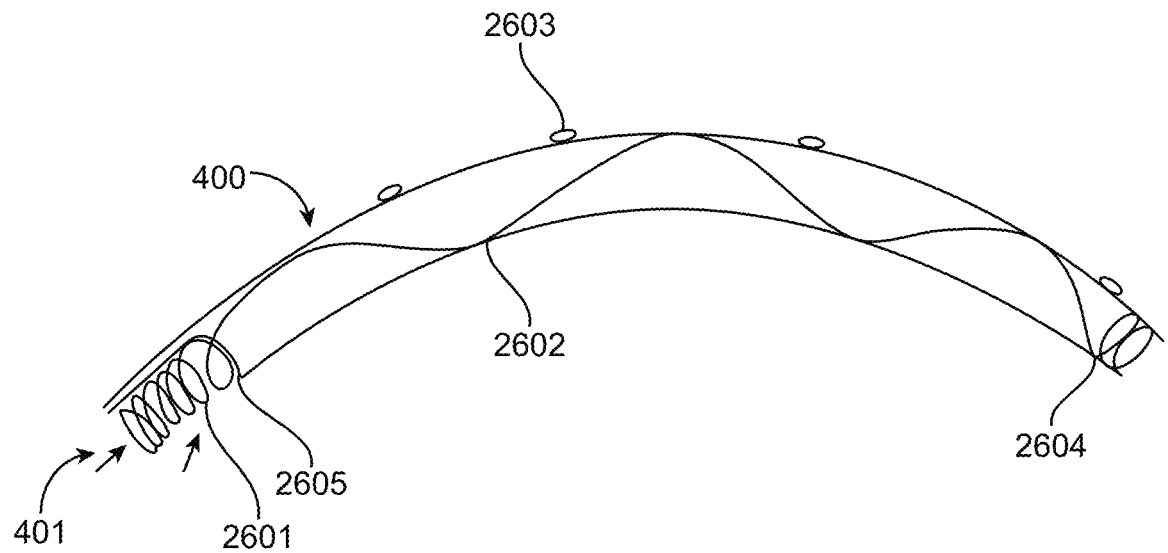
Figure 26D:
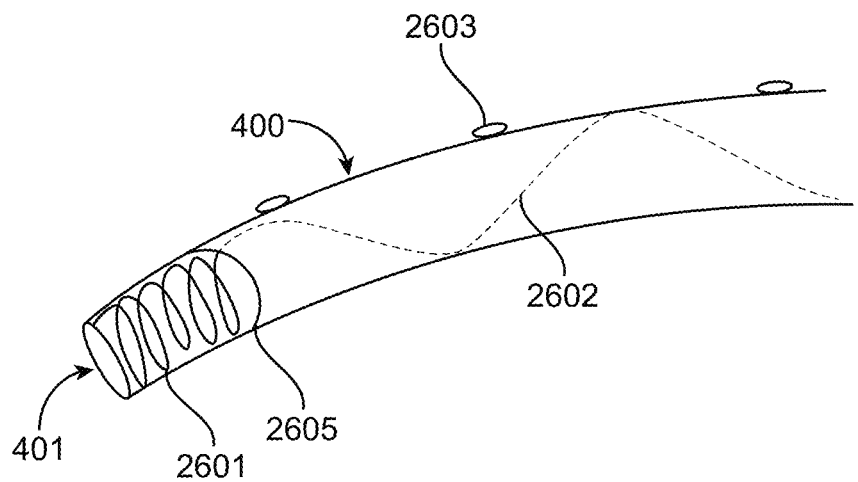
FIG. 26D contains a perspective closer view of the proximal end by-pass variant.
Figures 1, 26C:
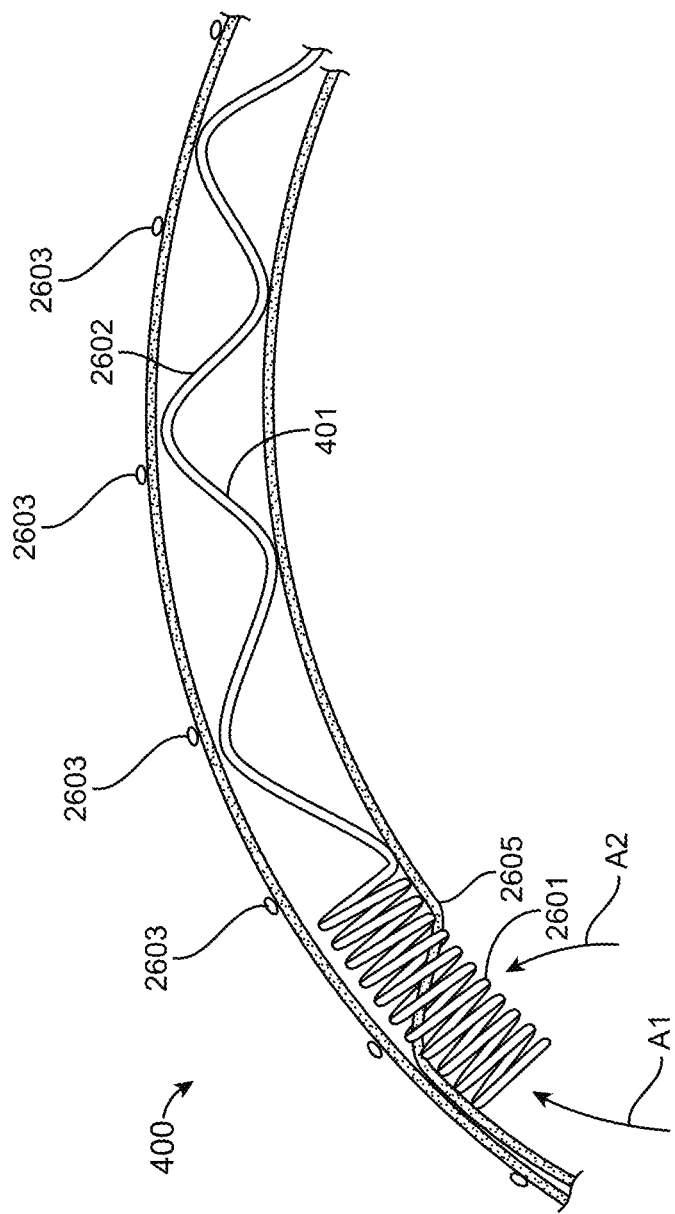

Disclosed herein are variants of the SES device in situ. FIG. 26A illustrates a variant of a curved and electropolished SES device 401 in situ in the uveolymphatic canal 400. The narrow-gauge wire of the 401 device prevents it from blocking the collector channels 2603 across the perimeter of the canal 400. With reference to FIG. 26A, the degree of arc is approximately 75°. In some embodiments, the SES device 401 may have even pitch across the length of the device. In some other embodiments as shown in FIG. 26A the SES device 401 may have tightly wound pitch towards the two ends 2601 and 2604 and wider pitch 2602 towards the main body. The wider pitch 2602 on the main body can provide adequate patency of fluid within the channel without blocking any of the collector channels. The tightly wound ends can provide a complete or partial by-pass of fluid from the anterior chamber into the channel for aid fluid flow, clearance and reduce intraocular pressure. In some embodiments (as shown in FIG. 26B) the SES device 401 may reside in situ in the uveolymphatic canal 400 to dilate the canal with the proximal end 2601 extended across the channel at the wound 2605 into the anterior chamber to create by-pass for fluid flow. In similar embodiments, the wound 2605 and the proximal end 2601 can provide uninterrupted aqueous flow and clearance into the dilated uveolymphatic channel 400 to reduce intraocular pressure. In some embodiments, such a by-pass may be provided at both ends of the device. In some embodiments, as shown in FIG. 26C, the SES device 401 may reside in situ in the uveolymphatic canal 400 to dilate the canal while with the proximal end 2601 extends along the same plane as the channel to create a partially collapsed wound opening 2605. For example, the canal to the left of the wound opening in FIG. 26C is collapsed by the coil, and by-pass for fluid flow. In some embodiments, such a by-pass may be provided at both ends of the device. FIG. 26D contains a perspective closer view of the proximal end by-pass variant where the tightly wound proximal end, distal end 2061, or both can be seen residing outside the canal 400 with access into the canal 400 at the wound 2605. The wider main body 2602 of the narrow gauge wire is shown to not block the collector channels 2603.

Figure 28:
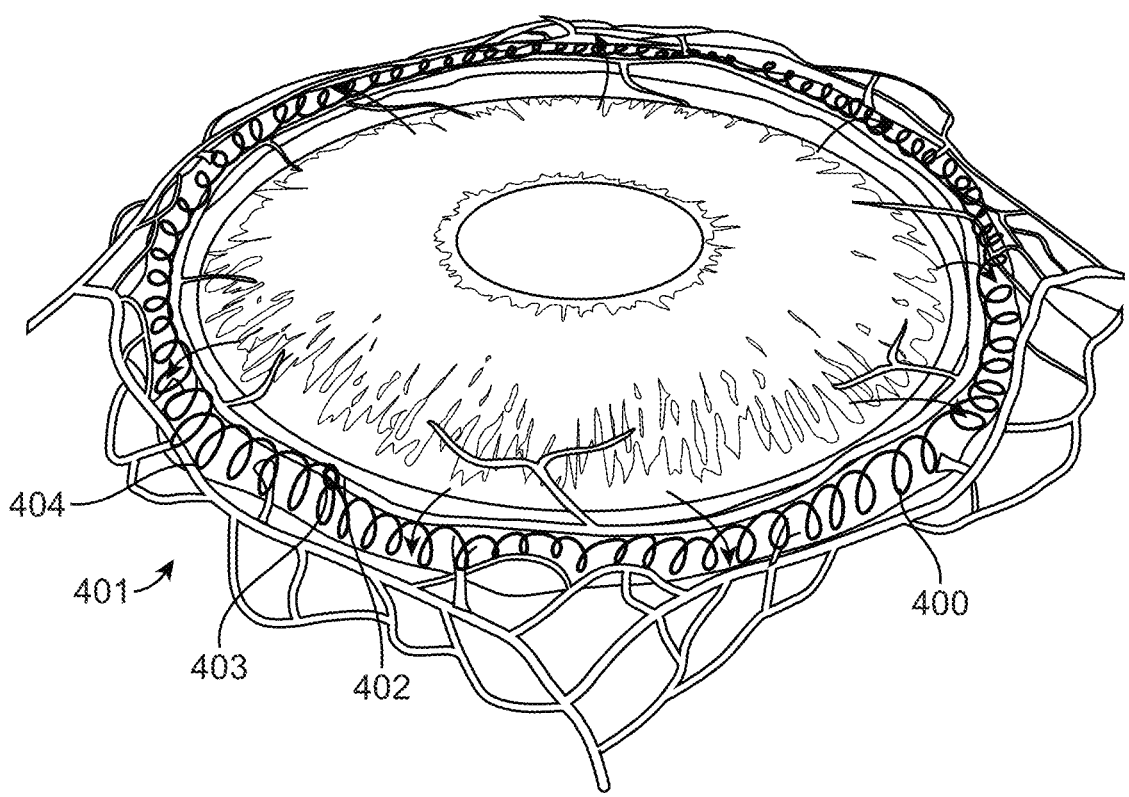
FIG. 28 illustrates a full perimetric coverage variant of a curved and electropolished SES device in situ in the uveolymphatic canal.

In another embodiment of a curved and electropolished SES device 401 in situ in the uveolymphatic canal 400, with reference to FIG. 28, the degree of arc is approximately 360 degrees. The degree of arc can be between approximately 340 degrees to approximately 350 degrees. The larger the degree of arc and coverage of the uveolymphatic canal 400, the higher chance for accidental blockage of collector channels and decreased drainage of fluid. In some cases, a larger degree of arc and coverage of the uveolymphatic canal 400 engages more collector channels to drain fluid. The SES wire is formatted to engage more collector channels without blocking them. In some embodiments the SES device 401 may have tightly wound pitch towards the two ends and wider pitch towards the main body. The wider pitch on the main body can provide adequate patency of fluid within the channel without blocking any of the collector channels. The tightly wound ends can provide a complete or partial by-pass of fluid from the anterior chamber into the channel for aid fluid flow, clearance and reduce intraocular pressure. In some embodiments the SES device 401 may reside in situ in the uveolymphatic canal 400 to dilate the canal with the proximal end extended across the channel at the wound into the anterior chamber to create by-pass for fluid flow. In similar embodiments, the wound and the proximal end can provide uninterrupted aqueous flow and clearance into the dilated uveolymphatic channel 400 to reduce intraocular pressure. In some embodiments, such a by-pass may be provided at both ends of the device. In some embodiments, the SES device 401 may reside in situ in the uveolymphatic canal 400 to dilate the canal while with the proximal end extends along the same plane as the channel to create a partially collapsed wound opening. For example, the canal to the left of the wound opening is collapsed by the coil, and by-pass for fluid flow. In some embodiments, such a by-pass may be provided at both ends of the device.

As shown in FIG. 26C-1, in some cases, the coil at proximal end 2601 of the SES 401 which is positioned through the wound 2605, as shown in FIG. 26C, may have an open pitch that permits both axial flow through an open end of the coil in the direction of arrow A1 and lateral flow into the coil through exposed openings between adjacent turns of the coil in the direction of arrow A2. This is a particular advantage as it enhances fluid flow into the canal 400 which has been opened by the SES 401.

In some embodiments, the device has by-pass and dilating feature(s) at the entry or exit or along the length of the device, or any combination thereof. In some cases, the bypass and dilating features lead into or out of the Schlemm's canal to/from the anterior chamber. In some embodiments, the device has by-pass feature(s) at the entry and/or exit or along the length of the device, into or out of the Schlemm's canal to/from the anterior chamber at the wound or incision. In some embodiments, the device has by-pass feature(s) at the entry or exit or along the length of the device, or any combination thereof, along the same perimetric plane of the Schlemm's canal away from the anterior chamber at the wound and/or incision.

In some embodiments, one end or both ends of the device are wound tightly such that Schlemm's canal is collapsed by the tightly wound coils, thereby allowing flow between Schlemm's canal and the trabecular meshwork through the tightly wound coils and down the length of the tightly wound portion or portions. In some embodiments, one end or both ends of the device are wound portion or portions protrude through the wall of canal into the trabecular meshwork such that flow between canal and trabecular meshwork is enabled through the tightly wound coils and down the length of the tightly wound portion or portions.

In some embodiments, the device has a polymeric sheath along the length of device in a continuous or non-continuous manner.

In some embodiments, the single elongated element may comprise a polymeric material selected from a group comprising polyvinylidene fluoride, polyvinylidene difluoride (PVDF), polyvinylpyrrolidone (PVP), polyurethane, polyethylene glycol (PEG), polylactic acid (PLA), polycaprolactone (PCL), polyglycolic acid (PGA), polymethylmethacrylate (PMMA), polyacrylates, polyamide, polyimide, polyesters, silicone, carbon-composites, and the like. Such materials may be used in substantially pure form or as mixtures or composites with other materials.

In some embodiments, the single elongated element may comprise at least one metal or alloy selected from a comprising titanium, stainless steel, cobalt-chrome alloy, gold, platinum, silver, iridium, tantalum, tungsten, aluminum, vanadium, and the like.

Some embodiments of the devices disclosed herein are directed to minimally invasive devices for treating glaucoma, by utilizing one, two, or more adjustable shape memory canal tension rings or stents configured to be placed within the canal of the uveolymphatic vessel or the Schlemm's canal. The tension ring(s) exert a radially outward mechanical force on the canal to restore the patency of the canal and improve aqueous flow therethrough, typically although not exclusively in a non-penetrating fashion. The rings can include a proximal end, distal end, and a coiled section comprising a plurality of revolutions therebetween, and proximal and distal eyelets for ease in manipulation, relocation, or retraction using a separate insertion or retrieving device. The coiled section has a variable outer diameter along its length. The rings can be made of a small diameter shape memory wire or tube (e.g., about 5-30 µm wire diameter and 150-500 µm device outer diameter), including but not limited to shape-memory alloy (SMAs), flexible metals such as stainless steel, titanium, etc. and flexible polymers including shape memory polymers (SMPs), silicone, polyvinylidene fluoride (PVDF), polymethylmethacrylate (PMMA), polypropylene (PP), polyethersulfone (PES), poly-lactic acid (PLA), poly-glycolic acid (PGA), and tunable biodegradable polymers, drug-eluting, and/or shape memory alloys (nitinol, etc.).

Some embodiments of the device advantageously leverage the expansion of the uveolymphatic vessel or the Schlemm's canal using adjustable and reversible self-expanding eye stents (SESs) or eye tension rings (ETRs) in the eye of desired sizes to control and improve flow throughout the range of the canal. As such, some embodiments include an adjustable tension ring(s) or cylinders that sits at least partially within the canal and is partially or fully anchored, attached, adhered, or otherwise held in place with respect to the canal opening or other locations within the canal or elsewhere in the uvea. The expansion of the canal can be configured to change at the various zones within the Schlemm's canal independently and based on the patient specific needs. In some embodiments, the tension rings may be 1, 2, 3, 4, 5, 6, or more separate rings of various sizes. In some embodiments, the system can be configured to control the flow rate of aqueous through the canal. In some embodiments, the rings can be substituted by cylinders, including some with fixation elements. The adjustable reversible eye tension rings can be configured to fit a specific patient's range in canal dimensions in some embodiments.

In some embodiments, the adjustable reversible self-expanding eye stents (SESs) or eye tension rings (ETRs) can include one, two, or more fixation elements. The fixation elements can promote fixation of the SES to the canal wall. In some embodiments, the SES may include a protrusion or indentation for stabilizing or fixing the SES at the wall. The fixation elements can also include sub-elements to anchor the SES to the wall, for example, grooves, teeth, ridges, or a saw-tooth pattern. In some embodiments, two or more of the same or different fixation elements can be used in combination. In some embodiments, the SES can include one or many features such as grooves or loops to allow easy capture and removal of the SES, if needed.

Disclosed herein are various materials for the SES including, but not limited to, shape-memory alloy (SMAs), flexible metals such as stainless steel, titanium, etc. and flexible polymers including shape memory polymers (SMPs), silicone, polyvinylidene fluoride (PVDF), polymethylmethacrylate (PMMA), polypropylene (PP), polyethersulfone (PES), poly-lactic acid (PLA), poly-glycolic acid (PGA), poly-glycolic acid (PGA), drug-eluting, shape memory alloys (nitinol, etc.), and/or tunable biodegradable polymers, that can be implanted through a small incision and spring back to the original configuration without damage. In some embodiments, the SES material may include coatings to prevent degradation and encrustation. The coating might be of hydrophobic or hydrophilic in nature such as silicone or polytetrafluoroethylene, or other lubricious coating. In some embodiments, the SES may include a drug-eluting coating on the surface or in the matrix/bulk to further promote healing of the eye.

In some embodiments, an adjustable self-expanding eye stent (SES) or Eye Tension Ring (ETR) embodiment stored and loaded into a delivery system can spring once the stored embodiment is deployed. The SES or ETR can take shape with its shape memory and form a tension or torsion ring or rings that is inside or outside the canal wall and is larger than the canal diameter, providing separation between the previously compressed canal of the Schlemm's canal or uveolymphatic vessel. One or more embodiments with varying sizes can be deployed in the compressed canal at various locations. The embodiments can be a combination of smaller diameter at the ends and larger diameter in the middle to anchor and prevent migration or the same SES can contain these variations.

In some embodiment, the SES comprises round, rectangular, or square polymer. In some embodiment, the SES comprises metal or alloy wire or tubing. The wire tubing OD can be between about 0.0005" to 0.10". The non-circular wire embodiment can be between 0.0005"-0.10"×0.0005"-0.10".

In some embodiment, the SES can be shaped to approximate the radius or arc of the perimeter of the globe or uveolymphatic canal path. In some embodiments, the shape may exert no bowing or contracting of the canal. In some other embodiments the shape may have an inward bowing of the canal.

In some embodiment, the SES comprises shallow or variable pitch across the length of the SES. The pitch of a helical SES may vary from about 0.00005" to 0.10". In some embodiments, the tighter pitch can be either on the proximal end, distal end, or both. In some embodiments, the wider pitch can be either on the proximal end, distal end, or both.

In some embodiment, the SES comprises a rigidity that permits it to be pushed linearly into Schlemm's canal without losing its integrity and without deforming.

In some embodiment, the SES comprises open distal or proximal ends or both. In some embodiments, the SES may have one or more coils that are welded together to form a closed loop at any point or points along the length, or ends, of the SES. In some other embodiments, the SES pitch of the distal end, proximal end, or both ends, are shallow such that the coil comes back on itself to form a closed loop. In some other embodiments, the SES's proximal end, or distal end, or both are welded to the preceding or subsequent coil to complete a loop.

In some embodiment, the SES comprises one end or both ends wound tightly such that Schlemm's canal is collapsed by the tightly wound coils thereby allowing flow between Schlemm's canal and the trabecular meshwork through the tightly wound coils and down the length of the tightly wound portion or portions.

In some embodiment, the SES comprises various perforations and extensions to anchor to the canal wall. In some embodiment, the SES comprises a plurality of perforations or features to allow rapid exchange, repositioning, or removal.

In some embodiment, the SES can be designed and selected based on patient specific IOP through pre-operative measurement.

In some embodiment, the SES can be designed with irregularities on the peripheral circumference including ridges, indentations, etc. to allow better anchoring and preventing migration.

In some embodiment, the SES can be designed to vary the sweep between 10 to 360 degrees. The SES may have multiple continuous or dis-continuous sweeps from between about 1 to 10 or between 1 to 30.

In some embodiment, the SES can be used in multiples and with various sizing within the canal to control the shape of the expansion and amount and direction flow.

In some embodiment, the SES can be customized for a specific patient or animal, including age, race, demographic, genetic predispositions, canal dimensions, Schlemm's canal dimensions, intraocular pressure (IOP) measurements, anatomical differences in the eye, and other factors unique to the patient or animal. In some cases, the eye does not need to be measured, because some embodiments of the device can be sized to cover all eyes sizes. In some cases, circumference variations are high. In some embodiments, when circumference variations are high, some embodiments of the device may accommodate small, medium, or large eyes.

In some embodiment, the single elongated element comprises a tension ring which can be customized to shrink or lengthen upon adjusting the manipulating feature of the SES, for safe and easy relocation, repositioning or removal.

In some embodiment, an adjustable self-expanding eye stent (SES) or an Eye Tension Ring (ETR) embodiment can stored and loaded into a delivery system, and once deployed the stored embodiment will spring and take shape with its shape memory and form a tension or torsion ring or rings that is inside or outside the canal wall and is larger than the canal diameter. The SES or ETR can then provide separation between the previously compressed canal of the Schlemm's canal in the body of any animal. A balloon catheter or incision cannula deployed prior to the deployment of the SES to allow enlargement of the Schlemm's canal allowing the SES to be deployed with ease.

In some embodiment, the SES comprises a sharp leading edge or cannula that can pierce the canal wall to anchor and keep it expanded from outside the canal wall.

A device for maintaining or restoring patency of a uveolymphatic region in the eye or the Schlemm's canal, comprising: a self-expanding shape memory member comprising a proximal end, a distal end, and a passageway therebetween configured to facilitate flow of body fluids therebetween, the shape memory member further comprising a plurality of partial or complete loops between the proximal end and the distal end, the shape memory member comprising a central portion and lateral portions, wherein the central portion comprises a first diameter and the lateral portions comprise a second diameter, wherein the first diameter is not equal to the second diameter, wherein the shape memory member further comprises a first radially compressed configuration transformable to a second radially enlarged configuration.

In some embodiments, the shape memory member comprises a biodegradable polymer with controlled resorption into the eye. In some embodiments, the shape memory member comprises a drug-eluting member coated on the surface or embedded into the bulk for controlled release into the eye. In some embodiments, the shape memory member comprises a hydrophobic coating. In some embodiments, the shape memory member comprises a hydrophilic coating. In some embodiments, the shape memory member comprises surface irregularities configured to promote anchoring or prevent migration.

In some embodiments, the first diameter is larger than the second diameter. In some embodiments, the first diameter is smaller than the second diameter. In some embodiments, the central portion has a similar first diameter throughout the entire length of the central portion. In some embodiments, the lateral portions have a similar second diameter throughout the entire length of the central portion.

In some embodiments, non-adjacent loops of the device are only connected to each other via directly adjacent loops.

In some embodiments, the shape memory member has a diameter of between about 0.0005" and about 0.050". In some embodiments, the shape memory member has a non-circular cross section, the cross-section having a major axis and a minor axis, wherein the minor axis dimension is between about 0.0005" and about 0.050".

In some embodiments, the radius of curvature of the device approximates that of the radius of curvature of the uveolymphatic canal in the globe. In some embodiments, the radius of curvature of the device may have an inward or outward bowing of the canal.

In some embodiments, the proximal end of the device may have a pitch dimension between 0.0005" and about 0.050". In some embodiments, the distal end of the device may have a pitch dimension between 0.0005" and about 0.050". In some embodiments, the main body of the device may have a pitch dimension between 0.0005" and about 0.050". In some embodiments, the proximal end, distal end, or both ends of the device may have a smaller pitch in comparison to the main body.

In some embodiments, the proximal end, distal end, or both ends of the device may have the coil ending in the same plane as a closed loop finish. In some embodiments, the proximal or distal end or both ends of the device may be welded to the preceding or subsequent coil to complete a loop. In some embodiments, the single elongated element comprises between about 1 and about 100 partial or complete loops.

In some embodiments, the proximal end, distal end, or both ends of the device may be polished via mechanical, chemical, or electrochemical methods.

In some embodiments, one end or both ends of the device are wound tightly such that Schlemm's canal is collapsed by the tightly wound coils thereby allowing flow between Schlemm's canal and the trabecular meshwork through the tightly wound coils and down the length of the tightly wound portion or portions.

In some embodiments, the proximal end comprises a sharp edge configured to pierce the canal wall to anchor into the canal wall itself and keep it expanded from outside the canal wall.

In some embodiments, single elongated element comprises surface irregularities, including but not limited to one or more of ridges, roughened surface, pores, and indentations.

In some embodiments, the device may be implanted using fluorescence or image-guided to avoid blocking of collector channels within Schlemm's canal.

In some embodiments, the device may be a wire shaped to various configurations to self-expand in the canal and maintain or restore patency. In some embodiments, the device may be of specific dimensions in outer diameter, pitch, wire diameter, and shape to accommodate the required tension needed within the canal. In some embodiments, the device has a polymeric sheath along the length of device in a continuous or non-continuous manner.

In some embodiments, the single elongated element can be aided finite element modeling for selective patient population groups.

Delivery Systems and Methods of Use Thereof

Disclosed herein are systems for treating glaucoma in a patient. The system can comprise a delivery device and a single elongated element configured for radial expansion of the channel of the uveolymphatic region or the Schlemm's canal when inserted into the channel. The single elongated element is configured to follow an arc of a circumference of the channel, wherein the arc subtends an angle comprising a degree of arc greater than approximately 75 degrees. In some embodiments, the arc degree is greater than approximately 130 degrees.

Figure 27:
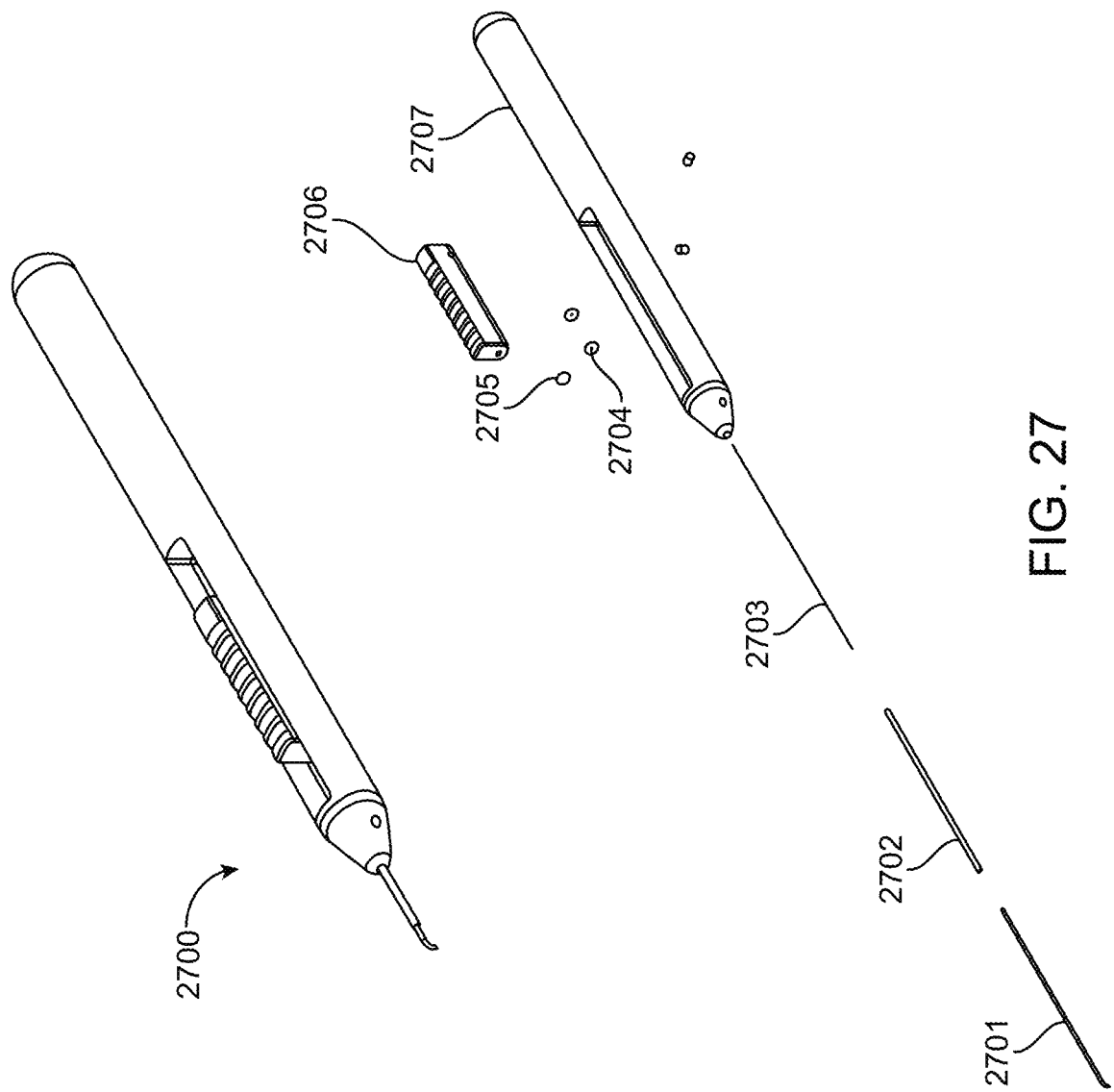
FIG. 27 illustrates a variant of a slide-inserted device to deploy the SES and a detailed exploded view of such a delivery system.

Disclosed herein are systems to deploy the devices described herein. FIG. 27 illustrates an embodiment of a slide-inserted device to deploy the SES and a detailed exploded view of such a delivery system. In some embodiments, the SES delivery system may use a sliding action delivery system. In some embodiments, the delivery device may comprise of a body 2707, set screws 2704, 2705 to control position of the outer or inner cannula 2701. In some embodiments, a plunger 2702 made of a wire or braided wire may be used to deploy, delivery or retrieve the SES device. In some embodiments, the plunger 2702 may be controlled using a sliding wire 2703 which may be controlled using a slider 2706 resting within the inserter body 2707.

An adjustable self-expanding eye stent (SES) or an Eye Tension Ring (ETR) embodiment that can be manipulated by an insertion tool whose temperature can be externally controlled through an energy source (electrical, mechanical, thermal, RF, light, etc.), such that it can alter the shape by shrinking or expanding the SES to make insertion or retrieval procedure minimally invasive, responsive, and easy to manipulate and handle.

In some embodiments, the delivery system comprises an SES comprising extruded metal or plastic tubing that may be stored in a first state, and once the SES is deployed to the desired location, the SES takes shape with its shaped memory and configuration. In some embodiments, the extruded metal or plastic tubing is printed with measurement markers to serve as a reference point in SES deployment.

In some embodiments, the delivery system comprises a cannula or balloon at the distal end of an SES which can facilitate opening of the Schlemm's canal and anchoring from the canal incision/opening to accurately deploy and position the SES.

In some embodiments, the delivery system comprises a SES which a medical practitioner can feel being incrementally advanced towards the distal shaft as guided by the delivery device. The deployment mechanism can be conveyed from the handle of the device. The deployment mechanism can be geared so that the advancement is measured based on the predetermined measured location.

In some embodiments, the delivery system comprises a stapler-type device where the SES is stored in a cartridge containing a predetermined count. For example, the predetermined count can be between about 1 to 6 SESs. In some cases, single SESs are individually dispensed from the cartridge via a trigger mechanism from the handle of the SES delivery system.

In some embodiments, the delivery system comprises SESs pre-loaded into multiple cartridges allowing deployment of all SESs in one single procedure minimizing time needed.

In some embodiments, the delivery system can be either manually via pusher catheter-shaft or tubing; or mechanically driven by e.g., staple; or electromechanically delivered into the desired location, or energy driven e.g. radio frequency, or electronic signal, or both.

In some embodiments, the delivery system comprises features such as a loop, hook, or eyelets to allow easy capture using an SES retrieval system that can allow the SES to compress and withdraw into the system in cases where repositioning or removal is desired.

In some embodiments, the delivery system comprises an SES that can be withdrawn by compression or re-folding the embodiment back into a linear or FIG. 8 shape and fully withdrawn or repositioned.

In some embodiments, the delivery system comprises withdrawing the SES by capturing the manipulating feature of the SES and re-winding into a track or guide. An SES can be withdrawn by capturing the manipulating feature and shrinking the SES by manipulating temperature of the SES using external energy.

In some embodiments, the system comprises a SES delivery device and SES retrieval device that have polymeric coatings including fluoropolymers and silicone, etc. The coatings may also be used to seal and prevent coagulation, debris accumulation, or degradation over time.

An SES can be deployed using a tool and/or mechanism to hold both sections of the SES align with the axis of the SES. The SES is then repositioned by turning the SES perpendicular to the deployed axis.

In some embodiments, the delivery system comprises customized SES sizing based on biometry of the Schlemm's canal space. The Schlemm's canal may be measured or imaged as a pre-operative scan using various qualitative or quantitative measurement tools to determine the customized fit of SES size(s) required for the specific patient's need. Biometric measurements including Schlemm's canal dimensions, Schlemm's canal angle, cross-sectional area (CSA), may be used to determine and customize the SES design to fit the specific physiological and anatomical need of the patient.

In some cases, the eye does not need to be measured, because some embodiments of the device can be sized to cover all eyes sizes or substantially all. In some cases, the device may be of a single size which may comprise a near-universal or universal fit. In some cases, circumference variations are high. In some embodiments, when circumference variations are high, some embodiments of the device may accommodate small, medium, or large eyes. In some cases, the device may comprise a small, a medium, and a large size. In some cases, a medical provider may choose one of a small, a medium, and a large size for implantation. In some cases, the device may comprise a small and a large size. A medical provider may choose either a small or a large size. In some cases, the device may comprise a plurality of sizes. For example, the device may comprise less than 5, less than 10, or less than 20 sizes.

In some embodiments, the delivery system comprises customized SES sizing based on intraocular pressure reading or biometry of the eye. The IOP can be used to determine the customized fit of SES size(s) required for the specific patient's need or required reduction of IOP. As the patient ages and as canal and Schlemm's canal undergoes physiological changes, the SES may be replaced with other sizes or tensile strength to fit the changing need.

In some embodiments, the delivery system comprises a device and a delivery tool comprising a device channel. The device channel can comprise an outer sheath and an inner member, the device configured to be disposed between the inner member and the outer sheath. The delivery tool can comprise a locking member configured to reversibly lock the device within the device channel. In some cases, the delivery may be accessed from the angle inside the anterior chamber, or outside the eye from the sub-conjunctival region or the limbus region or the scleral region. In some embodiments, the inner members, outer members and the device may be controlled using sliders or plungers. In some embodiments, the inner members, outer members and the device may be controlled using torsional or axial contact boards. In some embodiments, the inner members, outer members and the device may be controlled using torsional or axial contact rollers. In some embodiments, inner members may provide the incision required to enter the uveolymphatic vessel or canal.

In some cases, a delivery system can be assisted with dying or visualization to access the canal in a minimally invasive manner. In some cases, the delivery tool comprises a scope or visualization.

In some cases, the delivery tool has a pressured system to control the delivery of the device. The delivery tool can be attached to a syringe. The delivery tool can have a temperature control to manipulate the state of the device before, during, and after delivery.

In some embodiments, the delivery system may have an un-coiler channel to reduce friction in delivery the device. In some embodiments, the delivery system may pre-tighten or wound-up the device.

In some embodiments, the delivery system can be powered by a piezo-electric or vibrational motor.

The delivery system can use a guide-wire to deliver the device. The delivery system can use a guide-wire to reposition or retract the device.

Disclosed herein are methods for treating glaucoma in a patient comprising implanting a single elongated element in a channel of an uveolymphatic region or a Schlemm's canal of the patient, wherein the single elongated element is configured for radial expansion of the channel. In some embodiments, the single elongated element is configured to follow an arc of a circumference of the channel, wherein the arc subtends an angle comprising a degree of arc greater than approximately 75 degrees. In some cases, the single elongated element is configured to an arc of a circumference of the channel, wherein the arc subtends an angle comprising a degree of arc greater than approximately 130 degrees. In some embodiments, the single elongated element is configured to follow substantially a full circumference of the channel. Substantially a full circumference of the channel can comprise greater than 50%, 60%, 70%, 80%, 90% or up to 100% of the circumference of the channel. In some embodiments, the single elongated element is configured to follow an arc of a circumference of the channel, wherein the arc subtends an angle comprising a degree of arc between approximately 300 degrees and approximately 360 degrees. In some embodiments, the degree of arc can be between approximately 340 degrees to approximately 350 degrees. In some embodiments, aqueous flow between Schlemm's canal and the anterior chamber of the eye is not substantially limited when the degree of arc increases.

Disclosed herein are embodiments of methods to deliver a prosthetic device such as SES 401. In some embodiments, fluid pressure with a sealed region may be used to deliver the device. In some other embodiments, feather-boards or collet advancers may be used to deliver the device, such that horizontal compression may lead to vertical motion or vice versa. In some other embodiments, shape-memory setting of the SES device 401 may be employed to deliver the device is a wire and have it self-expanded in-situ in the canal 400. In some other embodiments, the delivery device may have an un-coiler channel to improve vector and reduce friction in delivery the SES device 401. In some other embodiments, the SES device 401 may be pre-tightened or wound-up and delivered in this state and may relax and uncoil or expand in-situ in the canal 400. In some embodiments, torsional or axial rollers may be used to deliver the SES device 401 within the cannulas of the delivery device and in-situ in the canal 400. In some embodiments, piezo-electric vibrations with micromotors and vibrations may be used to deliver the SES device.

Disclosed herein are embodiments of methods to use pre-operative measurements of the Schlemm's canal physiology to customize the device, e.g., SES for the specific requirement. Imaging techniques such as optical microscopy, ultrasonography, fluoroscopy, near infra-red imaging, CT-scan, measurement of CSA (cross-sectional area), diameter, can be utilized, such as in a pre-treatment procedure to determine and customize the SES 401 design to fit the specific physiological and anatomical need of the patient. One or a plurality of customized devices can then be manufactured and then implanted, e.g., in a separate procedure. The sizing procedure and implantation procedure can be combined into a single procedure in other embodiments.

In some cases, the eye does not need to be measured, because some embodiments of the device can be sized to cover all or substantially all eyes sizes. In some cases, circumference variations are high. In some embodiments, when circumference variations are high, some embodiments of the device may accommodate small, medium, or large eyes.

In some embodiments, the present disclosure provides methods of treating glaucoma in a patient. The method can comprise implanting a single elongated element in an uveolymphatic channel or a Schlemm's canal of the patient. The single elongated element, when implanted, opens the uveolymphatic channel or the Schlemm's canal of the patient with (i) sufficient radial strength to withstand compressive stresses exerted by uveolymphatic region in the eye or the Schlemm's canal and (ii) sufficient void space in its structure to minimize blockage of collector channels in the uveolymphatic region in the eye or the Schlemm's canal, when the expansion member is implanted in the uveolymphatic region in the eye or the Schlemm's canal.

The single elongated element can comprise a bent configuration when implanted. The methods may further comprise introducing a delivery tube into the uveolymphatic channel or a Schlemm's canal of the patient and releasing the expansion member from constraint so that the single elongated element radially expands in situ. The single elongated element may comprise a pre-shaped metal or polymeric filament but can also comprise any of the filaments described above.

In some embodiments, the single elongated element in its bent configuration comprises repeating helical turns or repeating serpentine loops. The single elongated element can be curved along its length in its bent configuration when free from constraint to conform to the shape of the uveolymphatic region in the eye or the Schlemm's canal. One of more ends of the single elongated element can have a geometry different than that of the remainder of the single elongated element, and frequently both ends of the single elongated element have a geometry different than that of a central region of the single elongated element.

In further cases of the methods herein, the radius of curvature of the single elongated element approximately matches that of the radius of curvature of the uveolymphatic canal or the Schlemm's canal of the eye. The radius of curvature of the single elongated element may be selected to cause an inward or outward bowing of the uveolymphatic canal or the Schlemm's canal of the eye. An end of the single elongated element may be positioned to collapse Schlemm's canal to allow flow between Schlemm's canal and the trabecular meshwork.

The methods herein may further comprise additional aspects, such as eluting a drug from the single elongated element. The single elongated element may comprise a hydrophilic or hydrophobic coating to aid in the safety and efficacy of the device within the eye. The single elongated element may be positioned into an anterior chamber to provide aqueous flow at an entry, an exit, along a length of the device, into or out of the canal, or to or from the anterior chamber of the eye. The single elongated element may be implanted using fluorescence or image-guided surgery to avoid blockage of collector channels within the uveolymphatic canal or the Schlemm's canal of the eye. The single elongated element may be implanted with aid from expandable member comprising of balloon or aspiration.

Yet further embodiments of the methods herein include customizing the single elongated element based on a preoperative intraocular pressure IOP and desired regulation or decrease in intraocular pressure (IOP). The single elongated element may be able to deliver energy to transform the shape of the device or that of the nearby tissue.

The methods herein further comprise a variety of delivery options. The single elongated element may be delivered with a tool comprising a device channel comprising an outer sheath and an inner member, the device configured to be disposed between the inner member and the outer sheath, the delivery tool comprising a locking member configured to reversibly lock the device within the device channel. In some embodiments, the delivery tool comprises a scope comprising a device channel, an outer sheath, and an inner member, wherein the device is disposed between the inner member and the outer sheath and in a radially compressed configuration during delivery.

The single elongated element may be delivered with access from the angle inside the anterior chamber, or outside the eye from the sub-conjunctival region or the limbus region or the scleral region of the eye. The single elongated element may be delivered with assist from dying or visualization to access the canal of the eye in a minimally invasive manner. The single elongated element may be delivered with a delivery tool that has a pressured system to control the delivery of the device into the eye. The single elongated element may be delivered with a delivery tool that is assisted with a visualization scope or imaging. The single elongated element may be delivered with a delivery tool is attached to a syringe. The single elongated element may be delivered with a delivery tool that has a temperature control to manipulate the physical state of the device before, during and after delivery. The single elongated element may be delivered with a delivery tool that incorporates sliders or plungers or may be controlled using torsional or axial contact boards or contact rollers. The single elongated element may be delivered with a delivery tool that can also provide the incision required to enter the uveolymphatic vessel or canal. The single elongated element may be delivered with a delivery tool that can provide an expansion channel to reduce friction in delivery the device. The single elongated element may be delivered with a delivery tool that pre-tighten or wind-up the device. The single elongated element may be delivered with a delivery tool that may be powered by a piezo-electric or vibrational motor. The single elongated element may be delivered with a delivery tool that may utilize a use a guidewire to deliver, position, re-position or retract the device.

In some embodiments, disclosed is a method of surgically implanting the SES. A delivery system may contain a cannula for incision into the channel and a trigger mechanism to deploy the SES with each click or turn. The SES can be preloaded for the various sizes into a cartridge which can be attached to the delivery system. The advantage of such a technique is to accurately position the SES to deploy in the appropriate zones within the canal. The SES can be implanted via a placement tool allowing use of the manipulating features which can also be used to easily relocate or retract in some cases. The SES can be implanted alone, or in combination with other SES in some embodiments.

The SES can be customized for a specific patient, including age, race, demographic, predispositions, canal dimensions, anatomical differences, and other factors unique to the patient. The SESs can also be customized based on the patient's baseline IOP or desired IOP reduction by choosing the length and width of the SES and control dilation, and hence the aqueous outflow. Due to the unique features of the SES device and the delivery technique, the device may offer several advantages including maximum dilation of the canal with the material presence within the canal, non-blockage of the lymphatic draining collector channels for adequate drainage, nano or micro incision surgery with the least amount of material interaction with tissue, and complete reversibility.

A method of treating glaucoma in a patient, comprising expanding the uveolymphatic channel or the Schlemm's canal in the patient using an expandable member, radially expanding at least one device comprising a shape memory member comprising a plurality of windings within the canal of the Schlemm's canal to expand the diameter of the Schlemm's canal, at least one device comprising a larger diameter portion and a smaller diameter portion, the larger diameter portion providing a radial force against the Schlemm's canal sufficient to maintain or restore patency of the Schlemm's canal, and unlocking a manipulation feature of the at least one device from a delivery tool. In some embodiments, the expandable member comprises a balloon. The method can comprise radially expanding a plurality of devices. In some embodiments, the plurality of devices is radially expanded sequentially. In some embodiments, the plurality of devices comprises varying sizes and shapes.

In some embodiments, the method comprises removing the delivery tool from the Schlemm's canal.

In some embodiments, the method further comprises axially moving the outer sheath relative to the device to allow the device to radially expand. In some embodiments, the device once implanted does not extend axially outside of the Schlemm's canal.

In some embodiments, following radially expanding the at least one device within the canal of the Schlemm's canal, no more than about 25% of an entire surface area of the device is exposed to aqueous flow within the Schlemm's canal.

The methods described herein can comprise delivering energy to at least one device to transform the size or shape of the device. In some embodiments, at least one device is custom created based on biometry of the patient's Schlemm's canal. In some embodiments, at least one device is custom created based on measured patient parameters selected from one or more of pre-operative imaging, Schlemm's canal dimensions, Schlemm's canal cross-sectional area, Schlemm's canal perimeter. In some embodiments, at least one device is custom created based on measured patient preoperative intraocular pressure IOP and desired regulation of IOP.

A method of treating glaucoma in a patient, comprising dilating or by-passing the uveolymphatic channel or the Schlemm's canal in the patient using a single elongated element. The method further comprises radially expanding at least one device comprising a shape memory member comprising a plurality of windings within or across the Schlemm's canal to provide by-pass or expansion into the diameter of the Schlemm's canal, the at least one device comprising a larger continuous diameter portion and a smaller diameter portion, the larger diameter portion providing a radial force against the Schlemm's canal sufficient to maintain or restore patency of the Schlemm's canal. In some embodiments, the shape memory member has a maximum diameter of less than about 0.050".

In some embodiments, the methods described herein further comprise repositioning or removing a device for treating glaucoma in a patient. This can comprise delivering an effector tool proximate to the Schlemm's canal and a previously implanted device residing within the canal of the Schlemm's canal, wherein a previously implanted device comprises one or more shape memory member. The shape memory member can comprise a plurality of windings, the windings forming a canal with a variable inner diameter. A manipulation feature of the previously-implanted device can be contacted with the effector tool locking the manipulation feature of at least one device and removing or repositioning the device. In some embodiments, the method further comprises delivering energy from the effector tool to the manipulation feature to change the size and/or shape of the device. In some embodiments, the manipulation feature comprises a hook, a loop, a magnet, a threaded feature, or any combination thereof.

Disclosed herein are methods for deploying prosthetic devices, including fixed canal or adjustable self-expanding eye stent (SES) or reversible eye tension rings (ETRs) 401 using an expandable member, such as a balloon technique, or an expandable device, e.g., movable cage with struts. In some embodiments, the leading edge of the delivery device for the SES or a cannula can create an entry incision 402 such that the SES 401 can be delivered in a folded state. Once inside the canal 400, the SES 401 can be fully deployed and uncoil in-situ, as shown in FIG. 4A. The SES 401 may contain one or more manipulation features 403 such that they can be used to adjust, reposition, and retrieve to or from and within the uveolymphatic vessel. In some embodiments, the deployment of the SES 401 can be controlled by a spring-loaded plunger or threaded screw type tool. Some embodiments of the SES 401 can be deployed into the balloon expanded canal, such that it anchors or keeps the canal expanded and away from collapse. In some embodiments, multiple SESs 401 can be deployed in various locations within the canal 400 and allow regulation of the flow through controlled dilation along the length of the canal or by-pass of fluid within the canal.

Disclosed herein are various methods of removing the prosthetic devices, including SES 401, in cases where reversibility or repositioning is desired. In some embodiments, a minimally invasive retrieval device can be deployed via the containing a retrieval wire with a feature that links with the manipulating feature 403 in the SES 401, as shown in FIG. 4B. In some embodiments, the manipulating feature 403 can be linked via a hook-loop, hook-hook, or loop-hook type set-up. In some embodiments, one or both of the retrieval or manipulating feature 403 can include complementary magnets, a gripper including, for example, movable jaws, an adhesive, a suction mechanism, and the like. In some embodiments, the retrieval device may wind-in the SES 401 into a track or threaded feature within the devices. The insertion, anchoring/connection to 403 and the removal of the SES 401 may all be performed by external controls (outside the body) of the devices in some cases.

Disclosed herein are methods for deploying prosthetic devices, such as adjustable reversible self-expanding eye stents (SESs) or eye tension rings (ETRs) within the Schlemm's canal. In some embodiments, the leading edge or other portion of the SES 401 can be inserted using an insertion device between the Schlemm's canal. In some embodiments, upon partial or complete insertion, the SES 401 can spring into place, assuming a radially expanded configuration, and keep the Schlemm's canal wide-open, due to the shape-memory nature of the SES 401 material. In some embodiments, multiple SESs 401 of similar or varying diameters can be deployed within the depending on the Schlemm's canal anatomy. Some embodiments can include 2, 3, 4, 5, 6, 7, 8, 9, 10, or more devices, or ranges including any two of the foregoing values, such as between 1 and 10 devices, or between 2 and 8 devices for example. Each device can be placed directly adjacent to, e.g., in contact with each other, overlapping with each other, or spaced apart and not directly contacting each other, or combinations thereof. Additionally, some embodiments may have one, two, or more relatively larger diameter tension rings 404 within the SES 401 relative to other rings of the SES that are either centrally located or positioned elsewhere depending on the anchoring requirements within the Schlemm's canal. In other embodiments, multiple such SESs 401 may be deployed within the canal. In some embodiments, one large SES can be deployed covering the entire length or perimeter of the Schlemm's canal, with similar or varying diameter along its length, as shown in FIG. 5A or 5B.

Figure 15:
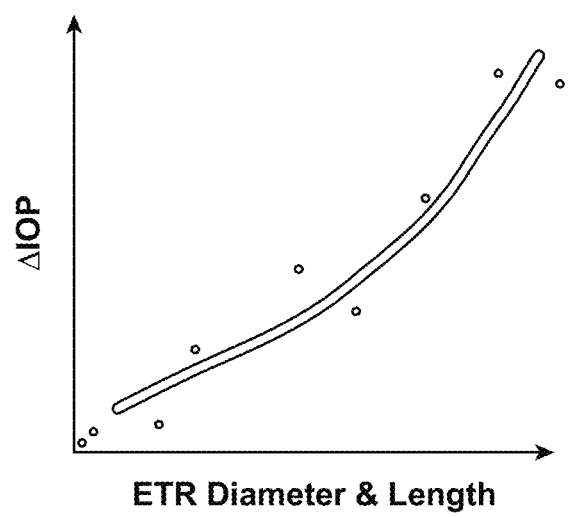
FIG. 15 illustrates a graph demonstrating the correlation of the aqueous flow (and hence change in intraocular pressure or IOP) as a function of the SES diameter and length.

Disclosed herein are embodiments of methods to use pre-operative measurements of the intraocular pressure (IOP) to customize the device, e.g., SES diameter, length, and pitch for the specific requirement of IOP reduction. Yan et al (2016-Schlemm's Canal and Trabecular Meshwork in Eyes with Primary Open Angle Glaucoma: A Comparative Study Using High-Frequency Ultrasound Biomicroscopy, PLOS One, 11 (1) https://doi.org/10.1371/journal.pone.0145824, which is incorporated herein by reference for all purposes) have demonstrated the correlation of Schlemm's canal diameter to IOP. FIG. 15 shows an example to determine and customize the SES 401 design to fit a desired outflow and thus desired IOP decrease for a patient. The aqueous outflow in the uveolymphatic canal can be directly correlated to the extent of dilation of this vessel. One or a plurality of customized devices can then be manufactured and then implanted, e.g., in a separate procedure. The sizing procedure and implantation procedure can be combined into a single procedure in other embodiments.

Disclosed herein are embodiments of methods to use pre-operative measurements of the uveolymphatic features such as diameter, length, tension, modulus, etc. to customize the SES 401 device to adequately provide tension and thus patency across the channel or canal, which in turn provides the required IOP reduction. Finite-element analysis (FEA) and modeling may be used to determine the patient anatomical sizing of the SES device 401 including features such as coil diameter, overall tube or device diameter, pitch, variance in pitch, entry and exit dimensions, etc.

Disclosed herein are embodiments of methods to advance, deliver, position, re-position, and retrieve the prosthetic devices, such as SES 401 in a minimally invasive form. Temperature of the SES 401 can be manipulated (e.g., increased or decreased) by an insertion tool whose temperature can be externally controlled through an energy source (electrical, mechanical, thermal, RF, ultrasonic, etc.), such that it can alter the shape by shrinking or expanding the SES 401 to make insertion or retrieval procedures both minimally invasive, responsive, and easy to manipulate/handle. In some embodiments, the device can be repositioned by at least initially torqueing (e.g., twisting) the device rather than axially pushing or pulling the device in a proximal or distal direction.

Figure 18A:
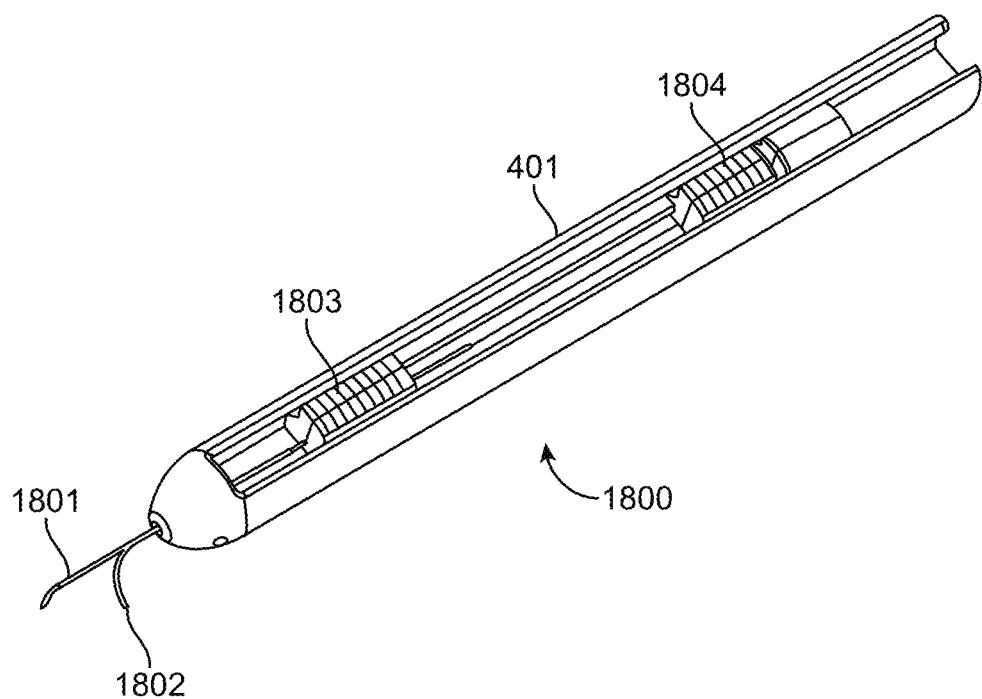
FIGS. 18A-18C illustrates a variant of an SES delivery device containing an outer cannula that houses an inner cannula that in turn houses the SES device. Sliders to move the cannulas and the device are highlighted.
Figure 18B:
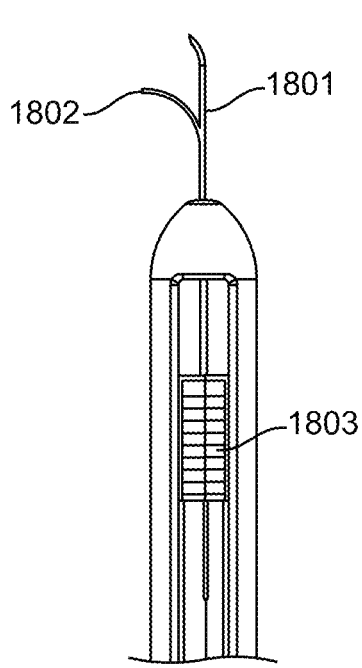
Figure 18C:
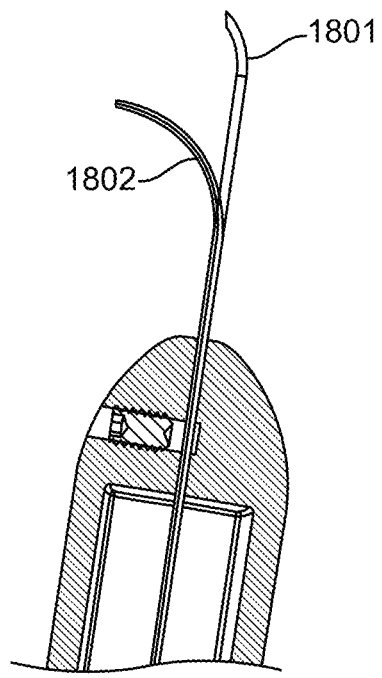

Disclosed in FIGS. 18A-18C are embodiments of methods to advance, deliver, position, re-position, and retrieve the prosthetic devices such as SES 401 in a minimally invasive form. In some embodiments, delivery device 1800 may contain an outer cannula 1801 to access the uveolymphatic vessel 400. The outer cannula 1801 may comprise metals, alloys, ceramics, or polymeric materials to access the canal. In some embodiments, the outer cannula 1801 may have sharp leading edges to provide an incision to access the vessel 400. In some embodiments, the outer cannula 1801 may house an inner cannula 1802 or the SES device 401. In some embodiments the inner cannula 1802 may house the SES device and the inner cannula may comprise metals, alloys, ceramics, or polymeric materials. FIG. 18 illustrates an embodiment of an SES delivery device 1800 containing an outer cannula 1801 that houses an inner cannula 1802 that in turn houses the SES device 401. Sliders 1803 and 1804 to move the cannulas and the device are highlighted. The radius of the outer cannula 1801 and inner cannula 1802 may approximate that of the eye and canal 400 to allow adequacy in turn and advancement.

Disclosed herein are embodiments of methods to advance, deliver, position, re-position, and retrieve the prosthetic devices, such as SES 401 in a minimally invasive form. In some embodiments, delivery device 2000 may contain an outer cannula 1801 to access the uveolymphatic vessel 400.

Figure 19A:
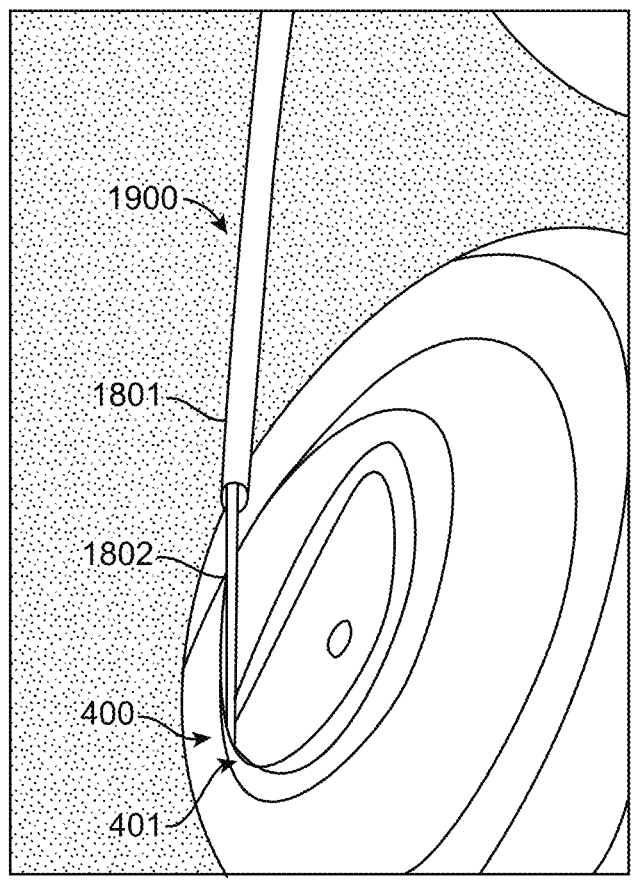
FIGS. 19A-19C illustrate a variant of an SES delivery device in-situ accessing the uveolymphatic vessel using the inner and outer cannula. The SES device delivery from the inner cannula is also shown.
Figure 19B:
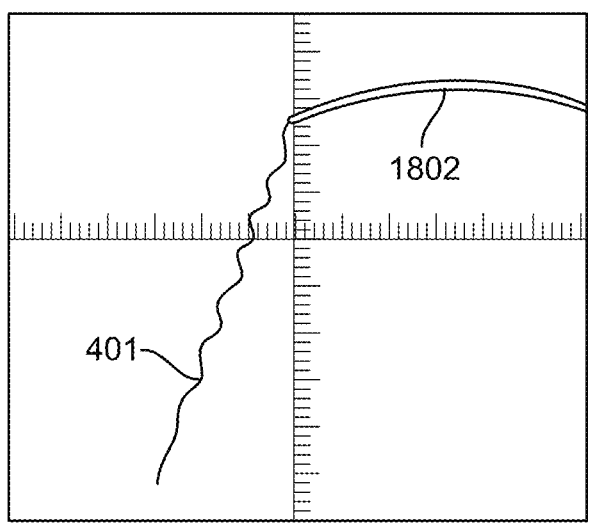
Figure 19C:
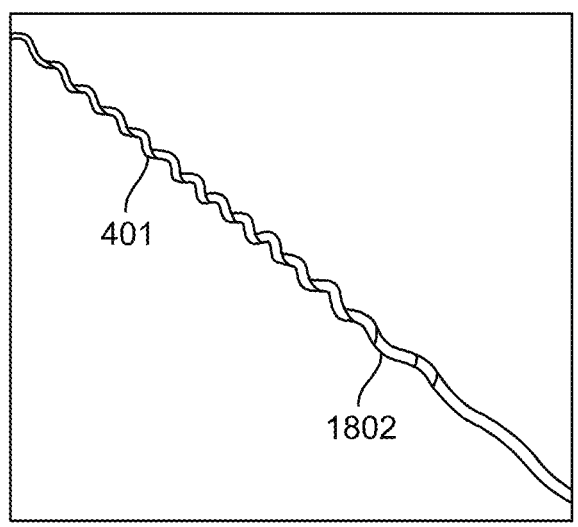

FIGS. 19A-19C illustrate a variant of an SES delivery device 2000 in-situ accessing the uveolymphatic vessel 400 using the outer cannula 1801 and delivering the SES device 401 using the inner cannula 1802. The SES device delivering the SES device 401 from the inner cannula 1802 is also shown.

Figure 20:
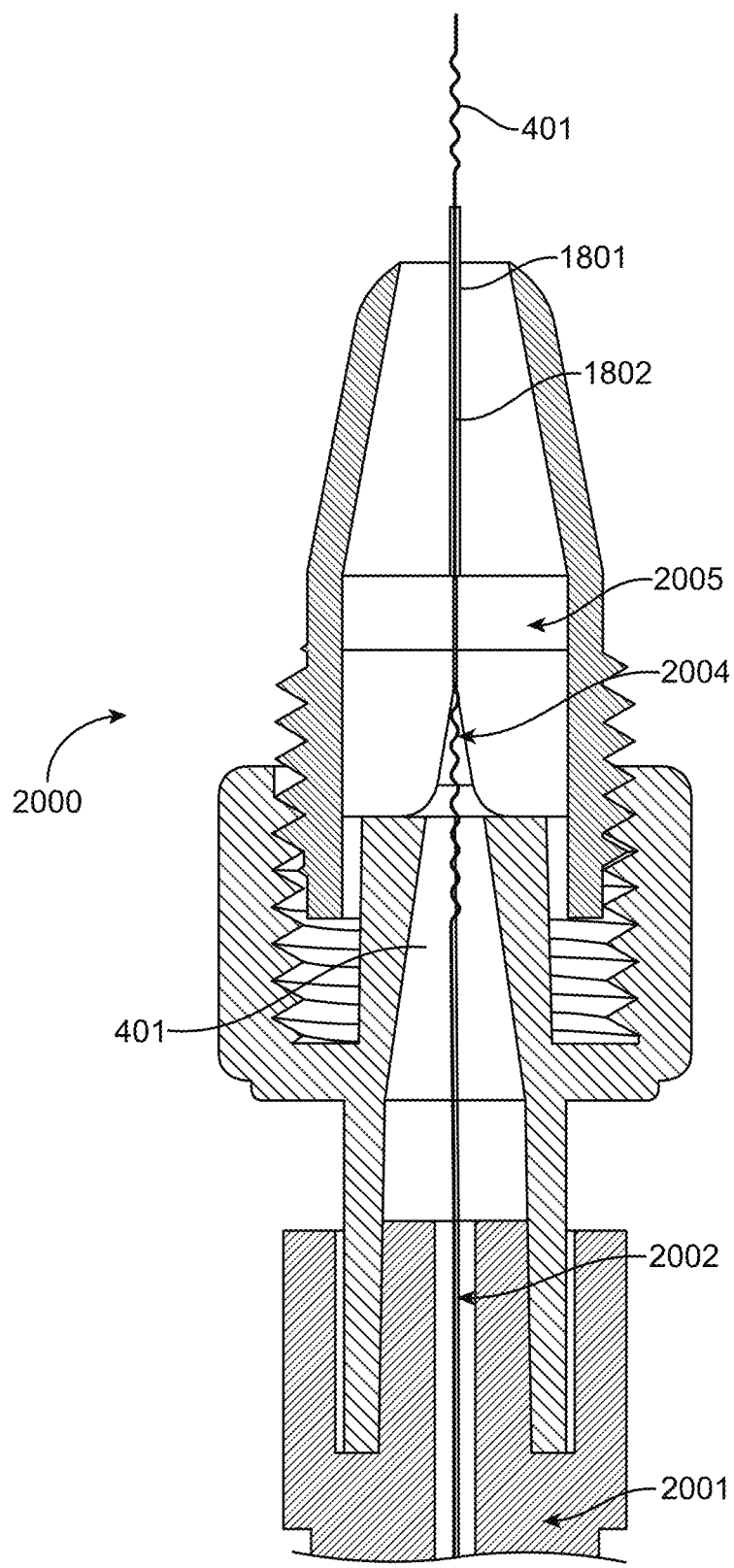
FIG. 20 illustrates a variant of an SES delivery device that utilizes a positive pressure system to control the advancement, deployment, and retraction of the SES device.

Disclosed herein are embodiments of methods to advance, deliver, position, re-position, and retrieve the prosthetic devices, such as SES 401 in a minimally invasive form. In some embodiments, delivery device 2000 may comprise an outer cannula 1801 to access the uveolymphatic vessel 400. FIG. 20 illustrates a variant of an SES delivery device 2000 that utilizes a positive pressure system 2001 to control the advancement, deployment, and retraction of the SES device 401. In some embodiments, the delivery device 2000 may comprise a plunger 2002 to control (increase or decrease the pressure) in the sealed chamber 2001 to control the movement of the SES device 401 further along the cannulas 1802 and 1801 into the uveolymphatic vessel 400. In some embodiments, the delivery device 2000 may comprise a channel with reducing perimeter, such as a cone 2004 to compress the SES device 401 into a smaller diameter into the inner 1802 or outer 1801 cannula or both. In some embodiments, the delivery device 2000 may comprise a sealed region 2005 formed of metal, alloys, ceramic, polymeric, silicone, foam, etc., or any combination thereof. Sealed region 2005 can be used to provide a high-efficiency conversion of pressure differential from the chamber 2001 to linear movement of the SES device 401. In some embodiments, the 2001 chamber may be liquid, gas, or air filled to create a pressure-controlled device. The device may be additionally powered by external energy sources. In some embodiments, the delivery system 2000 may be provided as a unit to mate with existing syringes or delivery devices for ease of use.

Figure 21:
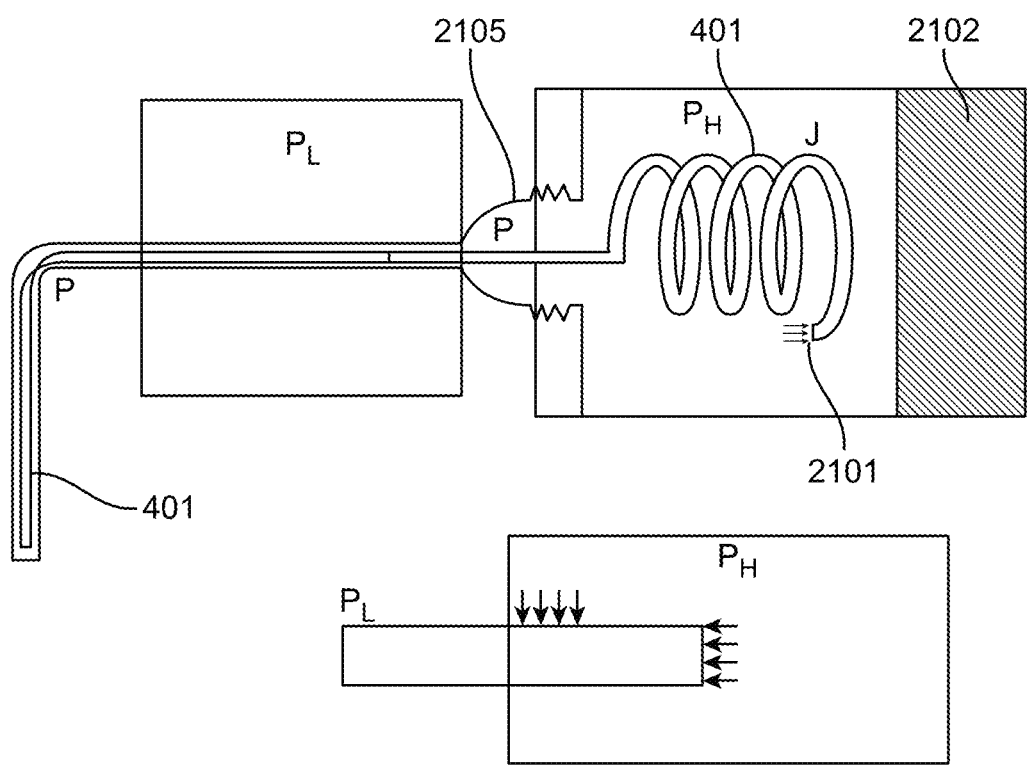
FIG. 21 illustrates a variant of an SES delivery device that utilizes a positive pressure system to control the advancement, deployment, and retraction of the SES device.

Disclosed herein are embodiments of methods to advance, deliver, position, re-position, and retrieve the prosthetic devices, such as SES 401 in a minimally invasive form. In some embodiments, delivery device 2000 may comprise an outer cannula 1801 to access the uveolymphatic vessel 400. FIG. 21 illustrates an embodiment of an SES delivery device 2000 that utilizes a positive pressure system to control the advancement, deployment, and retraction of the SES device 401. In some embodiments, the delivery device 2000 may comprise a sealed region 2105 formed of metal, alloys, ceramic, polymeric, silicone, foam, etc., or any combination thereof. Sealed region 2105 can be used to provide a high-efficiency conversion of pressure differential from the chamber 2101 to linear movement of the SES device 401. In some embodiments the 2101 chamber may be liquid, gas, or air filled to create a pressure-controlled device. The device may be additionally powered by external energy sources. In some embodiments the 2000 device may have a plunger or slider 2102 to control the delivery.

Figure 22A:
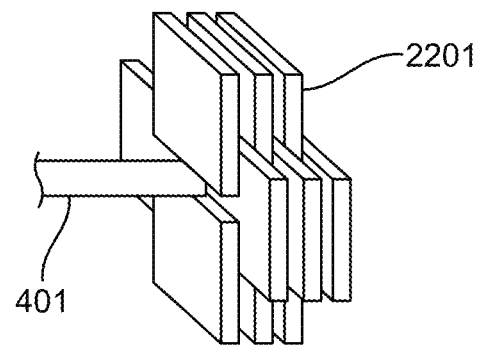
FIGS. 22A and 22B illustrate a variant of an SES delivery device that utilizes a multiple contact system similar to a feather-board to control the advancement, deployment, and retraction of the SES device.
Figure 22B:
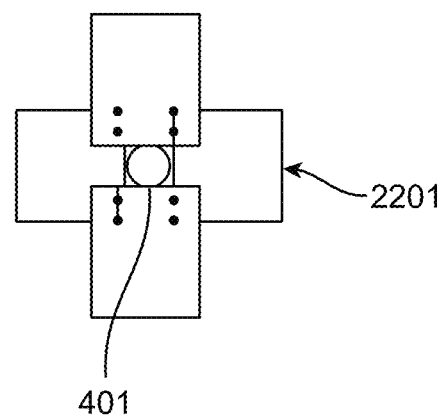

Disclosed herein are embodiments of methods to advance, deliver, position, re-position, and retrieve the prosthetic devices, such as SES 401 in a minimally invasive form. In some embodiments the delivery device may comprise various contact boards 2201 or plates or feather-boards that may contact the SES device 401 at a point, area, or plane such that it can incrementally advance or retreat the device in any direction. In some embodiments, these contact boards 2201 may comprise metal, alloys, ceramic, polymeric, silicone materials. FIGS. 22A and 22B illustrate representative sketches of such as setup to control movement of the SES device 401.

Figure 23A:
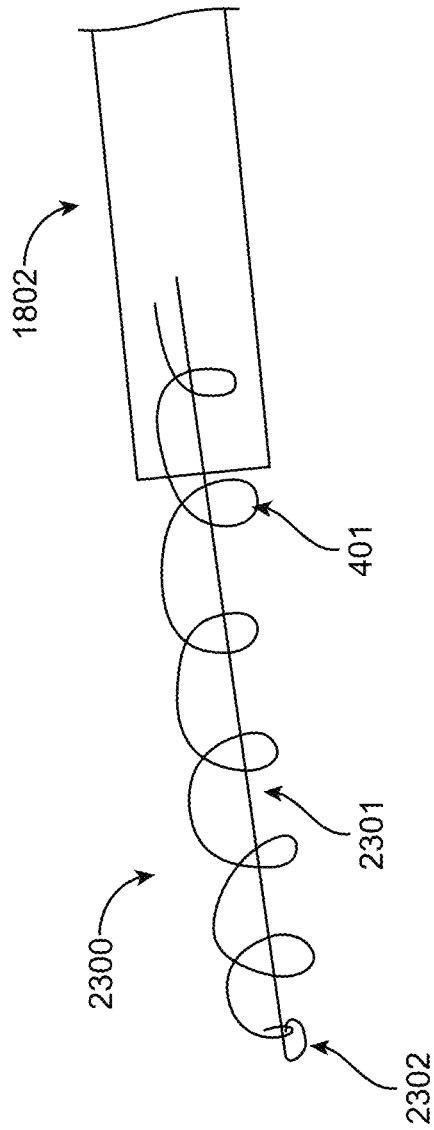
FIGS. 23A and 23B illustrate a variant of an SES delivery device that utilizes a lead guidewire that can selectively attach/detach to the SES device to control the advancement, deployment, and retraction of the SES device.
Figure 23B:
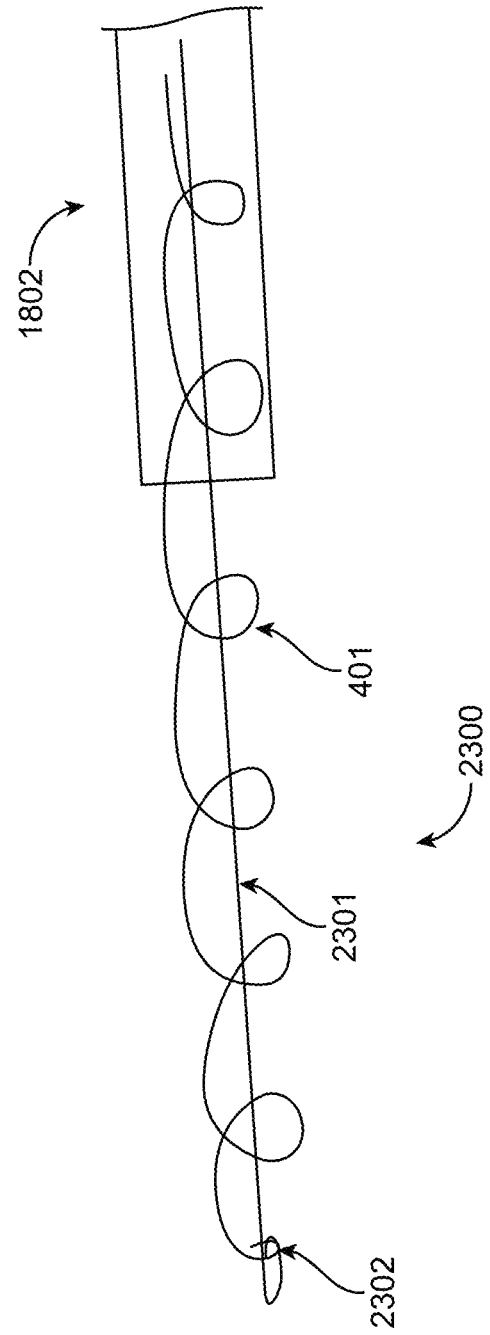

Disclosed herein are embodiments of methods to advance, deliver, position, re-position, and retrieve the prosthetic devices, such as SES 401 in a minimally invasive form. In some embodiments, the SES 401 device may comprise a leading guidewire 2301 that may lead the SES 401 device into the canal 400. In some embodiments, the guidewire 2301 may selectively attach to the SES device 401 with a mating portion 2302 by an external control through a trigger or movement. In some embodiments, the guidewire 2301 may stretch the SES device 401 into a smaller outer diameter to allow easier movement within the inner or outer cannula of the delivery system within or into the canal 400. In some embodiments, the guidewire 2301 may be used to detach from or attach to the SES device 401 using the mating portion 2302 that may be externally controlled trigger movement. FIGS. 23 and 23B illustrate an embodiment of an SES delivery device 2300 that utilizes a lead guidewire that can selectively attach or detach 2302 to the SES device to control the advancement, deployment, and retraction of the SES device 401.

It is contemplated that various combinations or sub combinations of the specific features and aspects of the embodiments disclosed above may be made and still fall within one or more of the devices disclosed herein. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the present disclosure. Thus, it is intended that the scope of the present disclosures herein disclosed should not be limited by the particular disclosed embodiments described above. Moreover, while the present disclosure is susceptible to various modifications, and alternative forms, specific examples thereof have been shown in the drawings and are herein described in detail. It should be understood, however, that the present disclosure is not to be limited to the particular forms or methods disclosed, but to the contrary, the present disclosure is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "inserting the SES proximate to the distal end of the Schlemm's canal" includes "instructing the inserting an SES proximate to the distal end of the Schlemm's canal."

Devices, Systems, and Methods of Delivery Thereof Involving Fluids, Pushers, and/or Guidewires Disclosed herein are devices, systems, and methods for introducing ocular devices as described above into the eye wherein the deployment can be minimally invasive, accompanied with a reduced risk of tissue damage and simplified treatment procedure. The device may be used for minimally invasive treatment of eye conditions including glaucoma. The device may comprise different mechanical configurations, fluid viscosities, delivery methods.

Provided herein are methods of delivery of an ocular device. These methods can use a delivery device (e.g., a cannula, a plunger, etc.). A delivery device can be used in conjunction with an assistive mechanism or device. The assistive mechanism or device can assist with inserting the ocular stent through the Schlemm's canal, especially greater than 90 degrees, greater 180 degrees, greater than 270 degrees, and/or about 360 degrees of the Schlemm's canal. This can be done by one or more of increasing the force with which the stent is expelled from the delivery device (e.g., by a pusher device) and/or by guiding the stent along an arc similar to the Schlemm's canal (e.g., by a guidewire). The assistive mechanism can also reduce friction, interference, and/or damage to and from the Schlemm's canal when moving the stent through the Schlemm's canal (e.g., by covering the stent in a fluid to facilitate movement). In some cases, in addition to reducing backwards force (e.g., friction), the assistive mechanism can itself advance the stent device. For example, the fluid can itself advance the stent, and as the stent advances, the fluid can advance with it. In some cases, one or more of these assistive devices or mechanisms can be used. The systems and methods described herein can use one or more of a guidewire, a pusher, or a fluid. The fluid can be a viscoelastic fluid. The flexible coil can benefit from support to be pushed circumferentially within the soft tissue that forms Schlemm's canal. That support can be provided with either, or combination of, a guidewire support for the helical stent that provides physical support and advancement force and/or a fluid that provides hydraulic support and advancement force. In some cases, a pusher may be used instead of, or in addition to, the guidewire. In this way, the delivery mechanism may advance the device by the advancement of the fluid, or by the advancement of the fluid in combination with a mechanism (e.g. a wire or pusher) that can aid in pushing the device along the cannula. As the device advances, the surface tension and openings in the device can capture and allow the liquid/fluid to advance with it.

Ophthalmic viscoelastic devices (OVDs) can be classified into at least three types based on their zero-shear viscosity and cohesion-dispersion index: cohesive, dispersive, and viscoadaptive. Cohesive OVDs may have a higher potential to create space and can be removed more easily at the end of a surgical operation. Dispersive OVDs may have a lower surface tension, allowing for better coating of intraocular anatomy and a consistency similar to syrup or molasses. Viscoadaptive OVDs may act differently during cataract surgery depending on the flow of fluid controlled by the surgeon, and can help to maintain the shape of the anterior chamber better than cohesive OVDs. The devices, systems, and methods described herein may use any one or more of these at least three types of OVDs.

In some cases, the viscoelastic fluid described herein can comprise, but is not limited to, saline, sodium hyaluronate, hyaluronic acid, chondroitin sulphate, hydroxypropyl methylcellulose, or any combination thereof.

In some cases, the device may comprise a single, flexible, elongate element with a smooth, atraumatic exterior surface. One end of the device can be connected to a viscoelastic fluid delivery system. The other end of the device can be tapered to facilitate insertion into the eye, including but not limited to Schlemm's canal. The distal end may not be tapered. The length and diameter of the device can be customized to suit different anatomical requirements and allow compatibility with various patient-specific Schlemm's canal dimensions.

In some cases, the device may also include multiple lumens or channels within its structure to allow for simultaneous delivery of viscoelastic fluid and other therapeutic agents if required.

In some cases, the device can be inserted into the Schlemm's canal and connected to a viscoelastic fluid delivery system. The viscoelastic fluid can be injected through the device, serving a dual purpose: lubricating the canal walls and providing a medium that assists in the advancing the device through hydraulic and surface tension effects. The viscoelastic fluid may create a friction-free environment, allowing the device to advance smoothly without the need for gears, worm mechanisms, or other mechanical propulsion systems. The viscoelastic fluid can be delivered in a continuous or pulsatile manner, depending on the specific requirements of the procedure and the canal's resistance. The viscoelastic fluid may create an environment in which the device is suspended, such that the advancement of the viscoelastic fluids transfers friction force to the suspended device thus advancing it with the advancement of the viscoelastic fluid. The viscoelastic fluid can extend ahead of the device such that the stent device can be advanced into the viscoelastic fluid. The fluid may maintain friction between the stent device and the Schlemm's canal.

In some cases, the delivery system may advance the device only by the advancement of the fluid, or by the advancement of the fluid in combination with a system (e.g., a wire, pusher, or both) that aids in pushing the device along the pathway.

In some cases, the device may comprise a helical stent which is designed to promote aqueous humor drainage and reduce IOP and housed within a specialized cannula. The stent can be suspended within a fluid medium, the viscosity of which may be tailored to suit specific treatment requirements and patient characteristics. As the fluid is propelled through the cannula, it may exert controlled force on the stent, facilitating its gradual advancement along the intricate pathways of Schlemm's canal. The helical configuration of the stent may enable it to navigate through the tortuous course of Schlemm's canal, ensuring optimal placement and alignment for sustained therapeutic effect. By leveraging fluid propulsion, this embodiment may offer precise, controlled delivery of the stent, minimizing trauma to surrounding tissues and maximizing treatment efficacy.

In some cases, the delivery system may incorporate the use of a viscoelastic fluid, such as hyaluronic acid or saline solution, to enhance lubrication and tissue protection during device insertion. The viscoelastic fluid can be injected into the Schlemm's canal along a predetermined arc, covering a specific segment of the canal's circumference. This extended delivery approach can allow comprehensive coverage of the targeted area, thereby facilitating the subsequent insertion of the ocular device. By combining fluid propulsion with extended viscoelastic delivery, this system may offer enhanced precision and efficacy in device placement, resulting in improved treatment outcomes for glaucoma patients. In some cases, the circumferential delivery of viscoelastic fluid around Schlemm's canal may be at least about 10%, 20%, 30%, 40%, 50%, 60%, 70%, 80%, 90% or 100%.

In some cases, the fluid (e.g., viscoelastic fluid) may comprise at least one drug. The at least one drug can include, but is not limited to, prostaglandin analogs, beta-blockers, alpha agonists, carbonic anhydrase inhibitors, rho kinase inhibitors, or neuroprotective agents. In some cases, the drug-filled fluid can be combined with biodegradable polymers configured for controlled drug release over a predetermined period of time. The biodegradable polymers can include one or more of polylactic acid (PLA), polyglycolic acid (PGA), poly(lactic-co-glycolic acid) (PLGA), polycaprolactone (PCL), or copolymers thereof. In some cases, the drug can be encapsulated in microspheres or nanoparticles formed by the biodegradable polymers to achieve a sustained release. The controlled release of the drug can reduce intraocular pressure (IOP) and provide neuroprotection to the optic nerve. The combination of drugs within the fluid can provide synergistic effects for enhanced glaucoma management and reduction of side effects.

In some cases, the fluid viscosity may be between about 0.1 centipoise (CPS) to about 1000 CPS. In some cases, the fluid viscosity may be between about 0.1 CPS to about 1 CPS, about 0.1 CPS to about 10 CPS, about 0.1 CPS to about 100 CPS, about 0.1 CPS to about 200 CPS, about 0.1 CPS to about 400 CPS, about 0.1 CPS to about 600 CPS, about 0.1 CPS to about 800 CPS, about 0.1 CPS to about 1000 CPS, about 1 CPS to about 10 CPS, about 1 CPS to about 100 CPS, about 1 CPS to about 200 CPS, about 1 CPS to about 400 CPS, about 1 CPS to about 600 CPS, about 1 CPS to about 800 CPS, about 1 CPS to about 1000 CPS, about 10 CPS to about 100 CPS, about 10 CPS to about 200 CPS, about 10 CPS to about 400 CPS, about 10 CPS to about 600 CPS, about 10 CPS to about 800 CPS, about 10 CPS to about 1000 CPS, about 100 CPS to about 200 CPS, about 100 CPS to about 400 CPS, about 100 CPS to about 600 CPS, about 100 CPS to about 800 CPS, about 100 CPS to about 1000 CPS, about 200 CPS to about 400 CPS, about 200 CPS to about 600 CPS, about 200 CPS to about 800 CPS, about 200 CPS to about 1000 CPS, about 400 CPS to about 600 CPS, about 400 CPS to about 800 CPS, about 400 CPS to about 1000 CPS, about 600 CPS to about 800 CPS, about 600 CPS to about 1000 CPS, or between about 800 CPS to about 1000 CPS.

In some case, the fluid viscosity may be less than about 0.1 CPS, less than about 1 CPS, less than about 10 CPS, less than about 100 CPS, less than about 200 CPS, less than about 400 CPS, less than about 600 CPS, less than about 800 CPS, or less than about 1000 CPS.

In some case, the fluid viscosity may be greater than about 0.1 CPS, greater than about 1 CPS, greater than about 10 CPS, greater than about 100 CPS, greater than about 200 CPS, greater than about 400 CPS, greater than about 600 CPS, greater than about 800 CPS, or greater than about 1000 CPS. In some cases, the fluid viscosity may be optimized to advance the fluid.

In some embodiments, the delivery system may deliver viscoelastic fluid circumferentially around Schlemm's canal, enveloping its entire circumference. In some embodiments, the delivery system may deliver viscoelastic fluid circumferentially around Schlemm's canal, enveloping less than its entire circumference. The ocular device can comprise a stent or microshunt. The ocular device can be inserted into a narrower arc within the canal, allowing for targeted pressure modulation and aqueous humor drainage. This full circumferential delivery approach may allow uniform distribution of the viscoelastic fluid within the canal, optimizing tissue lubrication and reducing friction during device insertion. By precisely controlling the delivery of both fluid and device, the devices and systems described herein may offer a tailored approach to glaucoma treatment, addressing the individualized needs of patients with varying disease severities and anatomical variations.

In some cases, the device may capture and advance the fluid medium as the ocular device progresses along the cannula. The device's surface tension and strategically positioned openings may facilitate the capture and retention of the fluid, ensuring synchronized movement during delivery. This fluid-enabled capture system may enhance the overall efficiency and reliability of the delivery system, minimizing the risk of fluid leakage or dispersion within the eye. By optimizing fluid-device interaction, the devices disclosed herein may allow consistent and uniform delivery of therapeutic agents or drainage devices, maximizing treatment efficacy while minimizing adverse effects.

In some embodiments, the device may comprise a helical stent as described above. In some cases, the helical stent may be housed or introduced in a cannula. Fluid may be used to advance and deliver the helical stent into Schlemm's canal. The fluid can be viscoelastic fluid. The viscoelastic fluid can be delivered along an arc of Schlemm's canal and. The viscoelastic fluid can cover the stent and also extend beyond and in front of the stent. The viscoelastic fluid can be delivered into an arc of Schlemm's canal that extends in an arc of a radius up to the full circumference of Schlemm's canal whereby the stent is delivered into an arc that is less than or equal to the arc of delivery of the viscoelastic fluid. The viscoelastic fluid can be delivered into Schlemm's canal in advance of the stent such that the device moves into and with the viscoelastic then present within Schlemm's canal.

In some embodiments, as the device advances, the surface tension and openings in the device can capture and allow the viscoelastic fluid to advance as well into the canal regions. Before delivery of the stent into Schlemm's canal, the stent can be first housed within the delivery system, then the viscoelastic fluid is delivered into the delivery system to flood the stent and fill the cannula, after which the stent is then delivered into Schlemm's canal. The viscoelastic fluid may flow around the device while it is being delivered. The viscoelastic can be delivered to the canal after the device has been delivered partially or entirely into Schlemm's canal.

In some cases, the viscoelastic fluid and the stent device can be inserted into the delivery system comprising a plunger, cannula, syringe, and/or other insertion parts. The viscoelastic fluid and stent device can then together be inserted into Schlemm's canal. In some embodiments, the viscoelastic fluid is inserted into the delivery system comprising a plunger, cannula, syringe, and/or other insertion parts and the stent device is separately inserted into the Schlemm's canal. The viscoelastic fluid can then be squeezed out of the delivery device to envelop and move the stent device.

In some cases, the delivery system may comprise a simple plunger to advance fluid through manual compression or pressure application that advances the device carrying the fluid across the perimeter. The delivery system may also comprise a plethora of mechanical configurations that advance the device across the perimeter wherein mechanical pushers or actuators may be integrated to provide additional force and precision during device insertion. These mechanical advancements may enhance the overall functionality and versatility of the delivery system, enabling tailored treatment approaches for different patient populations and clinical scenarios.

A coring or cleaning wire can be used to clear space as the device, fluid, or both are advancing. The coring or clearing wire can be made of biocompatible materials, such as plastic or metal, and may be incorporated to clear space within the ocular tissues, ensuring unobstructed passage for the fluid and device.

In some cases, the fluid can be used alone or with a guidewire. In some cases, a guidewire alone can be used to facilitate delivery of the stent into Schlemm's canal. In some cases, a guidewire can be used to guide and/or support the stent along the circumference of Schlemm's canal. The guidewire can do this without buckling the flexible coil stent. In some cases, one or both of the guidewire or the stent can comprise shape memory materials that have an arc similar to the circumference of Schlemm's canal. The guidewire may be pre-formed into an arc to encourage the linear advancement force to be transferred along the arc of Schlemm's canal.

The guidewire may be any material including, but not limited to flexible metals such as stainless steel, titanium, etc. and flexible polymers including shape memory polymers (SMPs), silicone, polyvinylidene fluoride (PVDF), polymethylmethacrylate (PMMA), polypropylene (PP), polyethersulfone (PES), poly-lactic acid (PLA), poly-glycolic acid (PGA), poly-glycolic acid (PGA), drug-eluting, shape memory alloys (nitinol, etc.), and/or tunable biodegradable polymers. The guidewire tip may be rounded so as not to penetrate tissue.

In some cases, a diameter of the guidewire can be from about 0.0001 mm to about 10 mm. In some cases, a diameter of the guidewire can be from about 0.0001 mm to about 0.001 mm, about 0.0001 mm to about 0.01 mm, about 0.0001 mm to about 0.1 mm, about 0.0001 mm to about 1 mm, about 0.0001 mm to about 5 mm, about 0.0001 mm to about 10 mm, about 0.001 mm to about 0.01 mm, about 0.001 mm to about 0.1 mm, about 0.001 mm to about 1 mm, about 0.001 mm to about 5 mm, about 0.001 mm to about 10 mm, about 0.01 mm to about 0.1 mm, about 0.01 mm to about 1 mm, about 0.01 mm to about 5 mm, about 0.01 mm to about 10 mm, about 0.1 mm to about 1 mm, about 0.1 mm to about 5 mm, about 0.1 mm to about 10 mm, about 1 mm to about 5 mm, about 1 mm to about 10 mm, or about 5 mm to about 10 mm. In some cases, a diameter of the guidewire can be about 0.0001 mm, about 0.001 mm, about 0.01 mm, about 0.1 mm, about 1 mm, about 5 mm, or about 10 mm. In some cases, a diameter of the guidewire can be at least about 0.0001 mm, about 0.001 mm, about 0.01 mm, about 0.1 mm, about 1 mm, or about 5 mm. In some cases, a diameter of the guidewire can be at most about 0.001 mm, about 0.01 mm, about 0.1 mm, about 1 mm, about 5 mm, or about 10 mm.

In some cases, a diameter of the guidewire can be from about 0.1 mm to about 0.6 mm. In some cases, a diameter of the guidewire can be from about 0.1 mm to about 0.2 mm, about 0.1 mm to about 0.3 mm, about 0.1 mm to about 0.4 mm, about 0.1 mm to about 0.5 mm, about 0.1 mm to about 0.6 mm, about 0.2 mm to about 0.3 mm, about 0.2 mm to about 0.4 mm, about 0.2 mm to about 0.5 mm, about 0.2 mm to about 0.6 mm, about 0.3 mm to about 0.4 mm, about 0.3 mm to about 0.5 mm, about 0.3 mm to about 0.6 mm, about 0.4 mm to about 0.5 mm, about 0.4 mm to about 0.6 mm, or about 0.5 mm to about 0.6 mm. In some cases, a diameter of the guidewire can be about 0.1 mm, about 0.2 mm, about 0.3 mm, about 0.4 mm, about 0.5 mm, or about 0.6 mm. In some cases, a diameter of the guidewire can be at least about 0.1 mm, about 0.2 mm, about 0.3 mm, about 0.4 mm, or about 0.5 mm. In some cases, a diameter of the guidewire can be at most about 0.2 mm, about 0.3 mm, about 0.4 mm, about 0.5 mm, or about 0.6 mm.

In some cases, the guidewire and stent may be advanced using a mechanism that advances both the stent and the wire. The mechanism can then retract only the wire, leaving the stent in place within Schlemm's canal. The guidewire may be sized to enable friction between the guidewire and the stent such that advance of the guidewire brings along the stent within the Schlemm's canal. The guidewire may be sized such that there is no friction between the guidewire and the stent. Nonetheless, advance of the guidewire may still bring along the stent within the Schlemm's canal. There may be friction force between the guidewire and Schlemm's Canal. There may not be friction force between the guidewire and Schlemm's Canal. In some cases, a pusher may be used in conjunction with a guidewire, such that the guidewire guides the arc of the coil and provides stability for a longer advancement, while the pusher may provide force for advancement. In some cases, for example for smaller guidewires or guidewires working with the assistance of fluid advancement forces, a pusher may not be used. In some cases, all three may be used: a pusher, guidewire, and a fluid. In some cases, guidewires may be beneficial for longer stent devices greater than about 10 mm to 12 mm to provide stability. In some cases, there may be sufficient stability in shorter stents with lengths in the coiled form of less than about 10 mm.

In some cases, there may be anchoring features on the guidewire and/or the stent to detachably connect the guidewire and stent during advancement and adjustment of the stent in the Schlemm's canal. These anchoring features can comprise tubular, helical, or other structures such as, for example, loops, barbs, grooves, rings, eyelets, or hooks.

In some cases, the device may include a series of markers along its length to provide visual feedback on the insertion depth and orientation within the canal, aiding the physician in precise placement. The device also can be equipped with a pressure-sensing system to monitor intraocular pressure in real-time and adjust the delivery rate of the viscoelastic fluid accordingly. Optional features such as radio-opaque markers can be included to enhance visualization under imaging techniques like fluoroscopy, assisting in accurate navigation and placement.

Figure 29:
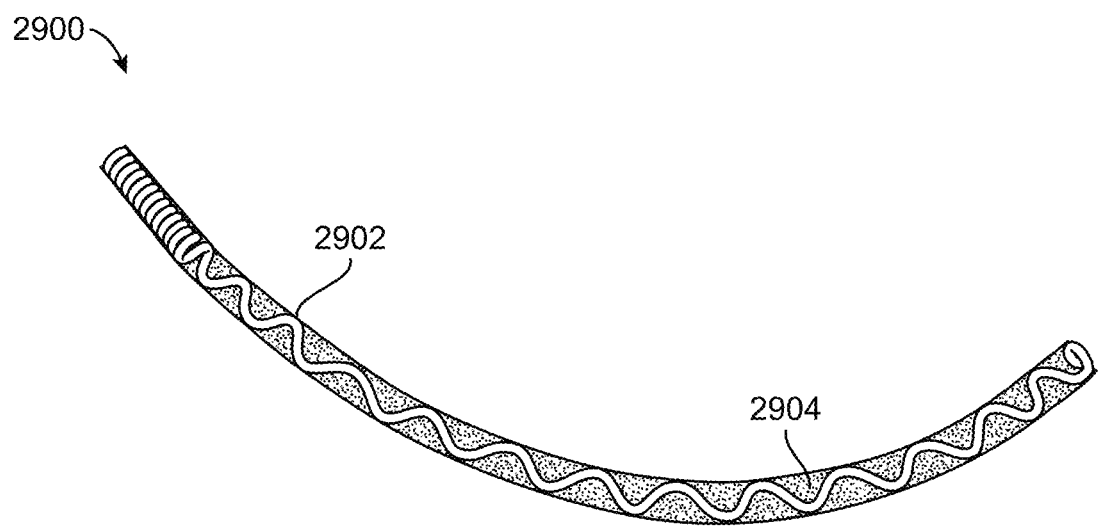
FIG. 29 illustrates a perspective view of an example device and method for treating glaucoma in accordance with some embodiments.

FIG. 29 illustrates a perspective view of a device and system for treating glaucoma. In some embodiments, with reference to FIG. 29, the device for treating glaucoma may comprise the ocular device 2902 and the fluid 2904 which adhere to the stent due to the surface tension effect. The ocular device 2902 can comprise a stent. The stent can be helical. The stent can be mobile and flexible. The stent can comprise a smooth, atraumatic exterior surface designed to reduce friction. The stent can comprise biocompatible materials. The ocular device 2902 and fluid 2904 retain an arced shape due to the shape memory nature of the ocular device 2902, which can comprise shape memory materials (e.g., nitinol). Fluid 2904 can comprise a viscoelastic fluid.

The fluid 2904 can reduce friction, interference, and/or damage to and from the Schlemm's canal when moving the stent 2902 through the Schlemm's canal (e.g., by covering the stent in a fluid to facilitate movement). In some cases, in addition to reducing backwards force (e.g., friction), the fluid 2904 can itself advance the stent device 2902. For example, the fluid 2904 can itself advance the stent, and, as the stent 2902 advances, the fluid 2904 can advance with it.

In some cases, the fluid 2904 itself is what applies force to the stent device 2902 in order to advance it. In some cases, the fluid may have higher viscosity to apply resistant force or enact a grabbing action on the device 2902. The fluid 2904 may be lubricious in order to reduce the friction or resistant forces within the cannula.

The stent 2902 may be housed within the cannula without suspension in the fluid 2904. The delivery system can then advance the fluid 2904 over the device 2902 within the cannula before the fluid 2904 has sufficient force to grab the device and advance it.

In some cases, the fluid 2904 can be delivered along an arc of Schlemm's canal. The fluid 2904 can incorporate/cover the stent. The fluid 2904 can extend beyond and/or in front of the stent. The fluid 2904 can be delivered into an arc of Schlemm's canal that extends in an arc radius up to the full circumference of Schlemm's canal. In some cases, the stent 2902 is delivered into an arc that is less than or equal to the arc of delivery of the fluid 2904. In some cases, the fluid 2904 is delivered into Schlemm's canal in advance of the stent 2902 such that the device 2902 moves into and with the fluid present within Schlemm's canal. In some embodiments, as the device 2902 advances, the surface tension and openings in the device 2902 can capture and allow the fluid 2904 to advance into the canal regions as well.

Prior to delivery of the stent 2902 into Schlemm's canal, the stent 2902 may first be disposed or housed within a delivery system (e.g., a cannula, a plunger, or another delivery device as disclosed below) after which fluid 2904 can be delivered into the delivery system to flood the stent 2902 and fill the cannula. The stent can then be delivered into Schlemm's canal. In some cases, the delivery system may be pre-manufactured to include one or more of a delivery device, the stent, the fluid, and one or more of a guidewire, pusher, coring wire, or other type of insertion device.

In some cases, fluid 2904 flows around the device 2902 while it is being delivered. In some cases, fluid 2904 is delivered to the canal after the device 2902 has been largely delivered into Schlemm's canal. In some cases, fluid 2904 is delivered to the canal after the device 2902 has been partially delivered into Schlemm's canal.

In some cases, the fluid 2904 may comprise at least one drug. The at least one drug can include, but is not limited to, prostaglandin analogs, beta-blockers, alpha agonists, carbonic anhydrase inhibitors, rho kinase inhibitors, or neuroprotective agents. In some cases, the drug-filled fluid can be combined with biodegradable polymers configured for controlled drug release over a predetermined period of time. The biodegradable polymers can include one or more of polylactic acid (PLA), polyglycolic acid (PGA), poly(lactic-co-glycolic acid) (PLGA), polycaprolactone (PCL), or copolymers thereof. In some cases, the drug can be encapsulated in microspheres or nanoparticles formed by the biodegradable polymers to achieve a sustained release. The controlled release of the drug can reduce intraocular pressure (IOP) and provide neuroprotection to the optic nerve. The combination of drugs within the fluid can provide synergistic effects for enhanced glaucoma management and reduction of side effects.

Figure 34:
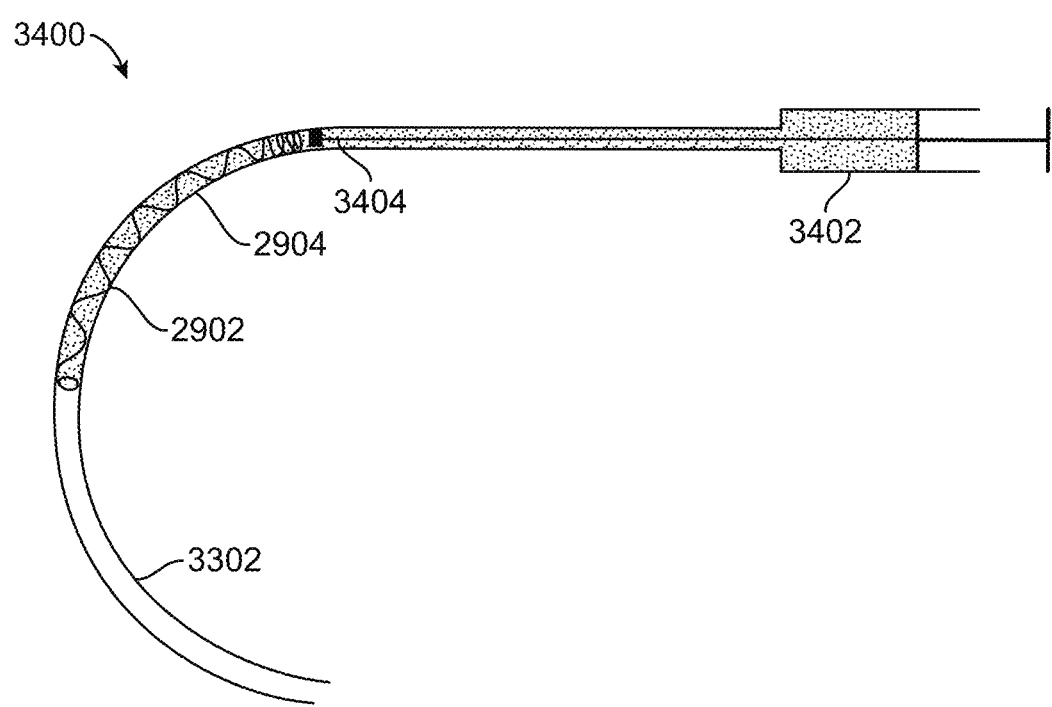
FIG. 34 illustrates a top-down view of an example device and method for treating glaucoma in accordance with some embodiments.
Figure 35A:
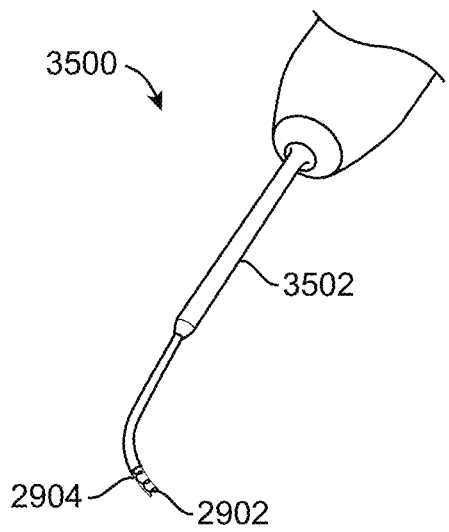
FIGS. 35A-35D illustrate consecutive steps of perspective views of an example device and method for treating glaucoma during deployment in accordance with some embodiments described herein.
Figure 35B:
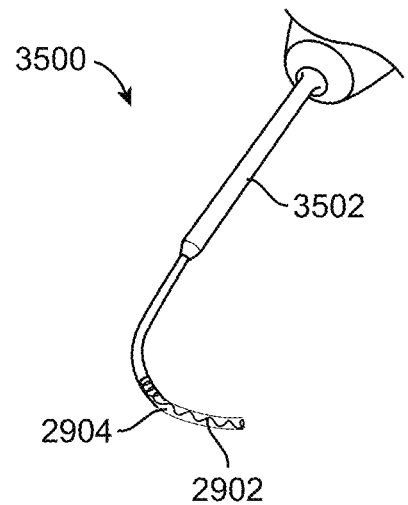
Figure 35C:
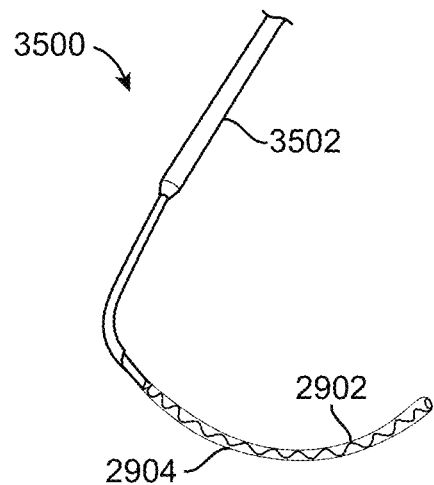
Figure 35D:
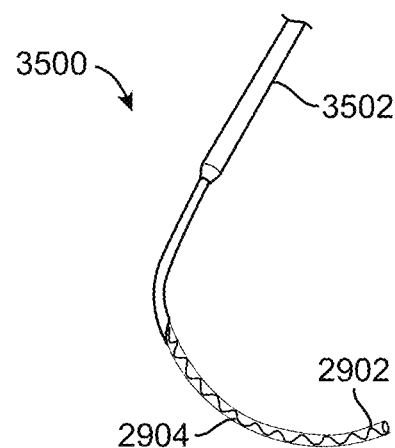

Delivery using fluid may or may not use additional items or gear to maneuver the stent. In some cases, as shown in FIGS. 32A-33C, a simple plunger can be used to advance fluid which in turn advances the stent carrying the fluid across the perimeter. In some cases, as shown in FIG. 34, a mechanical pusher can be used to advance the stent device across the perimeter of Schlemm's canal. In some cases, as shown in FIGS. 37A-38B, a coring/clearing wire (e.g., formed using plastic and/or metal) can be used to clear space as the device, fluid, or both are advanced.

In some cases, the ocular device 2902 can comprise a flexible monofilament or single-stranded helical element, usually a metal wire, such as a nickel-titanium alloy, formed into a bent, typically helical, geometry with sufficient cross-sectional radial strength ("hoop" strength or crush resistance) to open and/or support the walls of the channel to allow uveolymphatic fluid flow within Schlemm's canal, and sufficient longitudinal flexibility to conform to a peripheral or arcuate radius of Schlemm's canal. The single-stranded helical member may comprise a closed distal loop, coil or the like to permit easy insertion and tracking within the canal, a flexible open pitch intermediate section to permit conformance to and tenting of the canal along the natural arc of the canal, and a tightly pitched or partially opened pitch at a proximal end to permit a porting effect.

While the expansion member may comprise a single-stranded or other elongated element from other structure, the device may comprise additional elements and features, such as structures located, coupled, or attached at either or both ends of the single elongated expansion member for assisting in manipulation or anchoring of the device in the uveolymphatic region and/or in the Schlemm's canal. Such features may comprise, for example, tubular, helical or other structures located at a proximal end of the single elongated element and configured to extend across the channel into the anterior chamber to create by-pass for fluid flow. In some cases, such features disposed at either of both ends on a single-stranded device will be formed from the single strand itself, e.g., by varying the pitch of a helical filament.

In some embodiments, the single elongated elements of the devices of the present disclosure may comprise a pre-shaped metal or polymeric filament or "monofilament," where monofilament is defined as a single strand of metal or polymer. While such elongated elements may comprise or consist of a single-stranded, solid core elongated wire, strand, fiber, or the like, in some cases the elongated elements may comprise a thread, cord, cable, or the like comprising multiple individual strands which are sufficiently tightly wound or otherwise bound together to act as a single solid entity. In some cases, the single elongated strand or filament may comprise a pre-shaped metal wire, such as a shape or heat memory alloy wire. In some cases, the single elongated element comprises a nickel-titanium alloy wire. In some cases, nickel-titanium and other metal-wire devices may be formed by drawing the wire into a desired diameter and subsequently heat treating or otherwise forming the wire into a desired helical or other geometry.

The bent configuration of the single elongated element may comprise any one or combination of curves, loops, twists, turns, corners, kinks, arcs, or other non-linearities along an axial length of the single elongated elements that define a volume-occupying virtual envelope that radially supports a wall region of the uveolymphatic region in the eye or the Schlemm's canal when implanted therein. This virtual envelope will typically be generally cylindrical but could have other shapes as well. In specific examples, the single elongated element its bent configuration is at least partially formed with repeating helical turns. In other examples, the single elongated element in its bent configuration is at least partially formed with repeating serpentine loops.

In specific instances, the single elongated element may be curved along its length in its bent configuration when free from constraint, preferably conforming to a shape of the uveolymphatic region in the eye or the Schlemm's canal. In other instances, the at least one end of the single elongated element may have a geometry different than that of the remainder of the single elongated element, often having both ends with a geometry different than that of a central region of the single elongated element. The geometries at the ends may differ in only dimensions, e.g. being helical with a different wire diameter, helical diameter, and/or pitch or may differ in shape, e.g., being loops terminating either or both ends of the single elongated element or ocular device 2902.

The ocular device 2902 can have a variable pitch along the length of the device. In some cases, the pitch at one or both edges of the device may be smaller than the pitch in the center area of the device. The pitch can be between about 0.0001 mm to about 10 mm. The pitch can be between about 0.15 mm to about 1 mm. Both ends of the single elongated element may be formed into a helix having a tighter pitch and smaller diameter than those of the central region, wherein tighter pitch can comprise a range from 0.001 mm to 1 mm, from 0.01 mm to 0.2 mm, and from 0.05 mm to 0.15 mm, and the smaller diameter is in a range from 0.001 mm to 1 mm, from 0.05 mm to 0.4 mm, and from 0.1 mm to 0.3 mm. In some cases, the edges of the device can comprise between about 0.5 mm to about 3 mm. In some cases, the edges of the device can comprise less than about 0.5 mm. In some cases, the edges of the device can comprise greater than about 3 mm.

In some embodiments, the helical diameter of the single elongated element can be between 0.1 mm to 0.4 mm. In some embodiments, the helical diameter can be between 0.1 mm to 0.2 mm, 0.1 mm to 0.3, 0.1 mm to 0.4, 0.2 mm to 0.3 mm, 0.2 mm to 0.4 mm, or 0.3 mm to 0.4 mm. In some embodiments, the helical diameter can be between 0.25 mm to 0.35 mm. In some embodiments, the helical diameter can be between 0.25 mm to 0.30 mm, 0.25 mm to 0.35 mm, or 0.3 to 0.35 mm. In some embodiments, the diameter is 0.3 mm.

In some embodiments, the helical diameter of the single elongated element may be smaller to hold open the scleral spur and avoid obstructing perimetric collector channels. In some embodiments, the helical diameter can be between 0.01 mm to 0.1 mm. In some embodiments, the helical diameter can be between 0.01 mm to 0.04 mm, 0.01 mm to 0.06 mm, 0.01 mm to 0.08 mm, 0.01 mm to 0.1 mm, 0.04 mm to 0.06 mm, 0.04 mm to 0.08 mm, 0.04 mm to 0.1 mm, 0.06 mm to 0.08 mm, 0.06 mm to 0.1 mm, or 0.08 mm to 0.1 mm. In some embodiments, the helical diameter is between 0.04 mm to 0.06 mm. In some embodiments, the helical diameter is 0.05 mm.

In some embodiments, the helical circumference of each rotation of the single elongated element can be between about 0.0003 mm to 31 mm long. The helical circumference can be between 0.0003 mm to 0.003 mm, 0.0003 mm to 0.3 mm, 0.0003 mm to 3 mm, 0.0003 mm to 31 mm, 0.003 mm to 0.3 mm, 0.003 mm to 3 mm, 0.003 mm to 31 mm, 0.03 mm to 3 mm, 0.03 mm to 31 mm, 0.3 mm to 3 mm, 0.3 mm to 31 mm, or between 3 mm to 31 mm. In some cases, the helical circumference can be at least 1 mm, at least 3 mm, at least 5 mm, at least 7 mm, at least 9 mm, at least 11 mm, at least 13 mm, at least 15 mm, at least 17 mm, at least 19 mm, at least 21 mm, at least 23 mm, at least 25 mm, at least 27 mm, at least 29 mm, or at least 31 mm long.

In some embodiments, the helical circumference of each rotation of the single elongated element can be between about 0.15 mm to 3.1 mm. The helical circumference can be between 0.15 mm to 1 mm, 0.15 mm to 2 mm, 0.15 mm to 3.1 mm, 1 mm to 2 mm, 1 mm to 3.1 mm, or between 2 mm to 3.1 mm. In some embodiments, the helical circumference can be between 0.6 mm to 1.3 mm. The helical circumference can be between 0.6 mm to 0.8 mm, 0.6 mm to 1 mm, 0.6 mm to 1.2 mm, 0.6 mm to 1.3 mm, 0.8 mm to 1 mm, 0.8 mm to 1.2 mm, 0.8 to 1.3 mm, 1 mm to 1.2 mm, 1 mm to 1.3 mm, or between 1.2 mm to 1.3 mm. In some embodiments, the helical circumference can be no greater than 0.6 mm, no greater than 0.7 mm, no greater than 0.8 mm, no greater than 0.9 mm, no greater than 1 mm, no greater than 1.1 mm, no greater than 1.2 mm, or no greater than 1.3 mm.

Figure 30A:
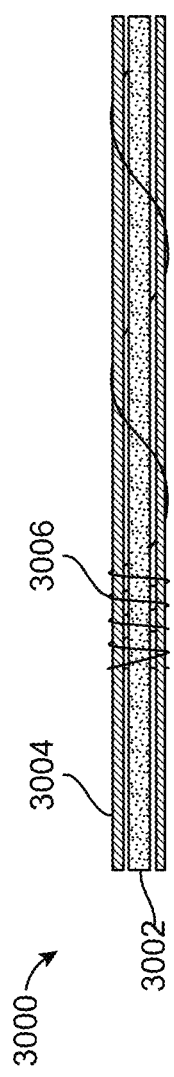
FIGS. 30A-30C show see-through side views of consecutive steps of ejecting an example device in accordance with example methods described herein.
Figure 30B:
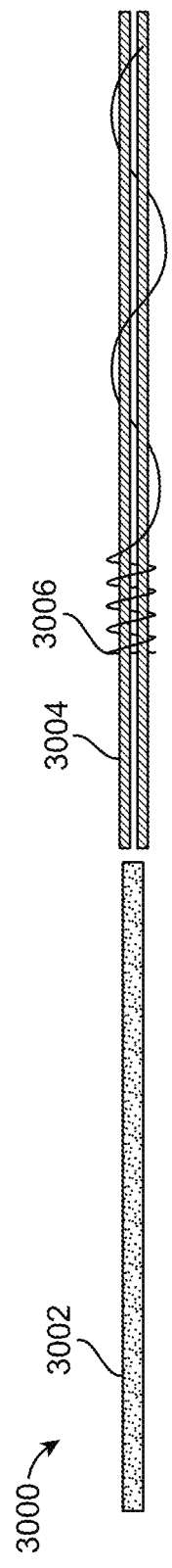
Figure 30C:
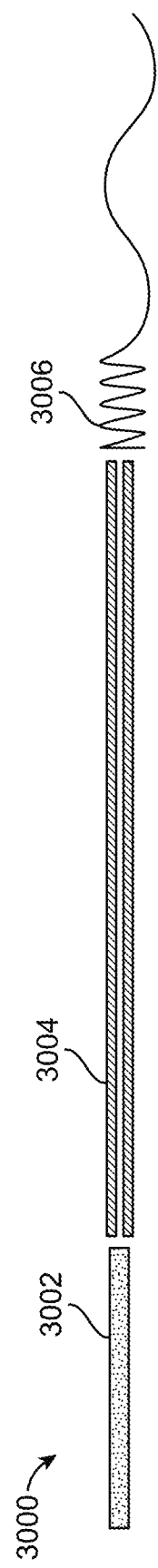

FIGS. 30A-30C show delivery system 3000 comprising hollow core 3004 and internal element 3002, with a stent 3006 as described herein disposed therein. In some cases, hollow core 3004 can comprise a pusher. The internal element 3002 can expand the pusher 3004 to create friction. When the internal element 3002 is withdrawn, the hollow core 3004 can contract to allow the stent 3006 to release from the core 3004. The entirety of this delivery system 3000 may be housing within a delivery cannula as described herein. This expansion and retraction can act as an attachment/detachment mechanism to enable retractability and then release of the stent. FIG. 30B shows the core (pusher) 3004 can extend the length of the stent. FIG. 30C shows the core (pusher) 3004 can extend partway into the stent but sufficient to create purchase. This can be used in the delivery methods described herein. In some cases, the stent 3006 is disposed within the hollow core 3004. In some cases, the stent 3006 surrounds the hollow core 3004. In some cases, substantially all of the hollow guidewire may be expanded to hold the stent. In some cases, a portion of the hollow guidewire may be expanded to hold the stent. The portion can be the tip of the guidewire.

In some cases, the hollow core 3004 can comprise a hollow guidewire. In some cases, the internal element 3002 can comprise an inner guidewire. The inner guidewire can be sized to expand the hollow guidewire, thereby creating friction with the stent coil such that coil may be advanced or retracted into the device until the inner guidewire is retracted and dissociated from the coil. This can reduce the friction with the coil such that the coil can then be delivered and detached from delivery system. In some cases, the hollow guidewire and inner guidewire are disposed inside the coil such that the hollow guidewire exerts a frictional force from inside the coil.

In some cases, a diameter of the hollow core 3004 can be from about 0.0001 mm to about 10 mm. In some cases, a diameter of the hollow core 3004 can be from about 0.0001 mm to about 0.001 mm, about 0.0001 mm to about 0.01 mm, about 0.0001 mm to about 0.1 mm, about 0.0001 mm to about 1 mm, about 0.0001 mm to about 5 mm, about 0.0001 mm to about 10 mm, about 0.001 mm to about 0.01 mm, about 0.001 mm to about 0.1 mm, about 0.001 mm to about 1 mm, about 0.001 mm to about 5 mm, about 0.001 mm to about 10 mm, about 0.01 mm to about 0.1 mm, about 0.01 mm to about 1 mm, about 0.01 mm to about 5 mm, about 0.01 mm to about 10 mm, about 0.1 mm to about 1 mm, about 0.1 mm to about 5 mm, about 0.1 mm to about 10 mm, about 1 mm to about 5 mm, about 1 mm to about 10 mm, or about 5 mm to about 10 mm. In some cases, a diameter of the hollow core 3004 can be about 0.0001 mm, about 0.001 mm, about 0.01 mm, about 0.1 mm, about 1 mm, about 5 mm, or about 10 mm. In some cases, a diameter of the hollow core 3004 can be at least about 0.0001 mm, about 0.001 mm, about 0.01 mm, about 0.1 mm, about 1 mm, or about 5 mm. In some cases, a diameter of the hollow core 3004 can be at most about 0.001 mm, about 0.01 mm, about 0.1 mm, about 1 mm, about 5 mm, or about 10 mm.

In some cases, a diameter of the hollow core 3004 can be from about 0.1 mm to about 0.6 mm. In some cases, a diameter of the hollow core 3004 can be from about 0.1 mm to about 0.2 mm, about 0.1 mm to about 0.3 mm, about 0.1 mm to about 0.4 mm, about 0.1 mm to about 0.5 mm, about 0.1 mm to about 0.6 mm, about 0.2 mm to about 0.3 mm, about 0.2 mm to about 0.4 mm, about 0.2 mm to about 0.5 mm, about 0.2 mm to about 0.6 mm, about 0.3 mm to about 0.4 mm, about 0.3 mm to about 0.5 mm, about 0.3 mm to about 0.6 mm, about 0.4 mm to about 0.5 mm, about 0.4 mm to about 0.6 mm, or about 0.5 mm to about 0.6 mm. In some cases, a diameter of the hollow core 3004 can be about 0.1 mm, about 0.2 mm, about 0.3 mm, about 0.4 mm, about 0.5 mm, or about 0.6 mm. In some cases, a diameter of the hollow core 3004 can be at least about 0.1 mm, about 0.2 mm, about 0.3 mm, about 0.4 mm, or about 0.5 mm. In some cases, a diameter of the hollow core 3004 can be at most about 0.2 mm, about 0.3 mm, about 0.4 mm, about 0.5 mm, or about 0.6 mm.

In some cases, such a delivery system can be used to deliver an ocular stent as described herein that is less than or equal to about 12 mm long in its coiled shape. In some cases, such a delivery system can be used to deliver an ocular stent as described herein that is from about 6 mm to about 12 mm long in its coiled shape. In some cases, such a delivery system can be used to deliver an ocular stent as described herein that is from about 6 mm to about 8 mm, about 6 mm to about 10 mm, about 6 mm to about 12 mm, about 8 mm to about 10 mm, about 8 mm to about 12 mm, or about 10 mm to about 12 mm. In some cases, such a delivery system can be used to deliver an ocular stent as described herein that is about 6 mm, about 8 mm, about 10 mm, or about 12 mm. In some cases, such a delivery system can be used to deliver an ocular stent as described herein that is at least about 6 mm, about 8 mm, or about 10 mm. In some cases, such a delivery system can be used to deliver an ocular stent as described herein that is at most about 8 mm, about 10 mm, or about 12 mm. In some cases, such a delivery system can be used to deliver an ocular stent as described herein that is about 9 mm long.

Figure 31A:
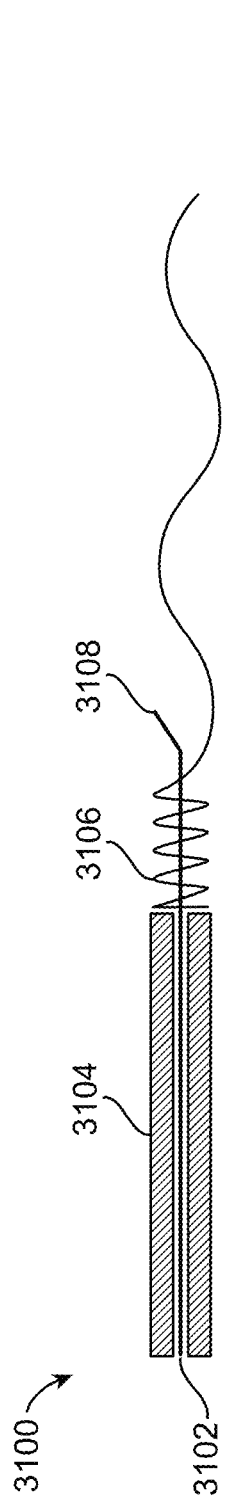
FIGS. 31A-31C show see-through side views of consecutive steps of ejecting an example device in accordance with example methods described herein.
Figure 31B:
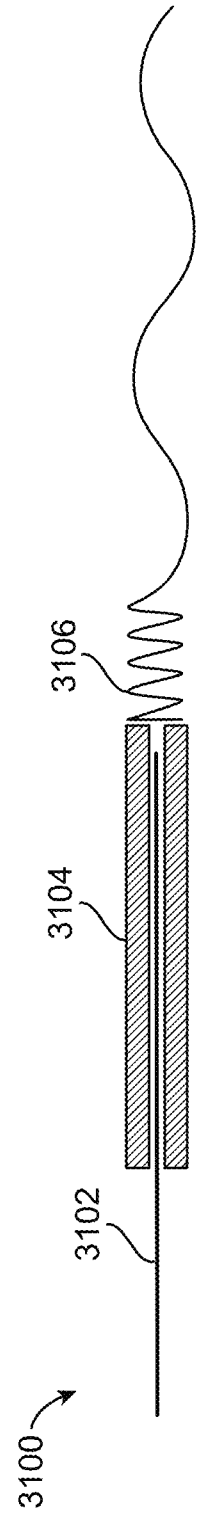
Figure 31C:
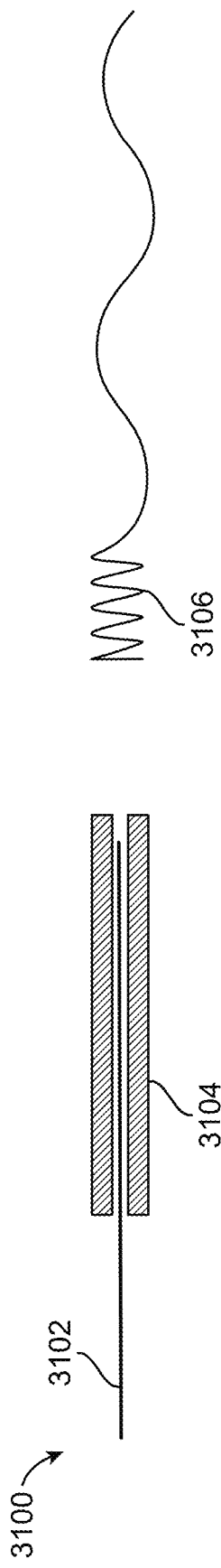

FIGS. 31A-31C show delivery system 3100 comprising hollow core 3104 and internal element 3102 with tip 3108, with a stent 3106 as described herein disposed therein. Tip 3108 can provide purchase on the stent 3106. Tip 3108 may be a flexible hook. When the internal element 3102 is withdrawn into the hollow core 3104, the flexible tip 3108 of the internal element may flex into the core (pusher) 3104 such that the stent 3106 is no longer held and can go free. In some cases, the stent 3106 can be pushed against the hook. The hook may bend and allow the stent to be pushed off and released. The entirety of this delivery system 3100 may be housing within a delivery cannula as described herein. This expansion and retraction can act as an attachment/detachment mechanism to enable retractability and then release of the stent. This can be used in the delivery methods described herein.

In some cases, the internal element 3102 can comprise an inner guidewire. The inner guidewire can have a non-linear portion such that friction is created between the non-linear portion and the coil. This can allow the inner guidewire to maintain purchase on the coil for retraction during surgery while still allowing the stent to be pushed off of inner guidewire, thereby releasing the stent from the delivery system. In some cases, the stent 3106 is disposed within the hollow core 3104. In some cases, the stent 3106 surrounds the hollow core 3104. In some cases, the hollow guidewire and inner guidewire are disposed inside the coil such that the hollow guidewire exerts a frictional force from inside the coil. In some cases, substantially all of the hollow guidewire may be expanded to hold the stent. In some cases, a portion of the hollow guidewire may be expanded to hold the stent. The portion can be the tip of the guidewire.

In some cases, a diameter of the hollow core 3104 can be from about 0.0001 mm to about 10 mm. In some cases, a diameter of the hollow core 3104 can be from about 0.0001 mm to about 0.001 mm, about 0.0001 mm to about 0.01 mm, about 0.0001 mm to about 0.1 mm, about 0.0001 mm to about 1 mm, about 0.0001 mm to about 5 mm, about 0.0001 mm to about 10 mm, about 0.001 mm to about 0.01 mm, about 0.001 mm to about 0.1 mm, about 0.001 mm to about 1 mm, about 0.001 mm to about 5 mm, about 0.001 mm to about 10 mm, about 0.01 mm to about 0.1 mm, about 0.01 mm to about 1 mm, about 0.01 mm to about 5 mm, about 0.01 mm to about 10 mm, about 0.1 mm to about 1 mm, about 0.1 mm to about 5 mm, about 0.1 mm to about 10 mm, about 1 mm to about 5 mm, about 1 mm to about 10 mm, or about 5 mm to about 10 mm. In some cases, a diameter of the hollow core 3104 can be about 0.0001 mm, about 0.001 mm, about 0.01 mm, about 0.1 mm, about 1 mm, about 5 mm, or about 10 mm. In some cases, a diameter of the hollow core 3104 can be at least about 0.0001 mm, about 0.001 mm, about 0.01 mm, about 0.1 mm, about 1 mm, or about 5 mm. In some cases, a diameter of the hollow core 3104 can be at most about 0.001 mm, about 0.01 mm, about 0.1 mm, about 1 mm, about 5 mm, or about 10 mm.

In some cases, a diameter of the hollow core 3104 can be from about 0.1 mm to about 0.6 mm. In some cases, a diameter of the hollow core 3104 can be from about 0.1 mm to about 0.2 mm, about 0.1 mm to about 0.3 mm, about 0.1 mm to about 0.4 mm, about 0.1 mm to about 0.5 mm, about 0.1 mm to about 0.6 mm, about 0.2 mm to about 0.3 mm, about 0.2 mm to about 0.4 mm, about 0.2 mm to about 0.5 mm, about 0.2 mm to about 0.6 mm, about 0.3 mm to about 0.4 mm, about 0.3 mm to about 0.5 mm, about 0.3 mm to about 0.6 mm, about 0.4 mm to about 0.5 mm, about 0.4 mm to about 0.6 mm, or about 0.5 mm to about 0.6 mm. In some cases, a diameter of the hollow core 3104 can be about 0.1 mm, about 0.2 mm, about 0.3 mm, about 0.4 mm, about 0.5 mm, or about 0.6 mm. In some cases, a diameter of the hollow core 3104 can be at least about 0.1 mm, about 0.2 mm, about 0.3 mm, about 0.4 mm, or about 0.5 mm. In some cases, a diameter of the hollow core 3104 can be at most about 0.2 mm, about 0.3 mm, about 0.4 mm, about 0.5 mm, or about 0.6 mm.

In some cases, such a delivery system can be used to deliver an ocular stent as described herein that is less than or equal to about 12 mm long in its coiled shape. In some cases, such a delivery system can be used to deliver an ocular stent as described herein that is from about 6 mm to about 12 mm long in its coiled shape. In some cases, such a delivery system can be used to deliver an ocular stent as described herein that is from about 6 mm to about 8 mm, about 6 mm to about 10 mm, about 6 mm to about 12 mm, about 8 mm to about 10 mm, about 8 mm to about 12 mm, or about 10 mm to about 12 mm. In some cases, such a delivery system can be used to deliver an ocular stent as described herein that is about 6 mm, about 8 mm, about 10 mm, or about 12 mm. In some cases, such a delivery system can be used to deliver an ocular stent as described herein that is at least about 6 mm, about 8 mm, or about 10 mm. In some cases, such a delivery system can be used to deliver an ocular stent as described herein that is at most about 8 mm, about 10 mm, or about 12 mm. In some cases, such a delivery system can be used to deliver an ocular stent as described herein that is about 9 mm long.

FIGS. 32A and 32B illustrate consecutive steps of a method 3200 using a device and system for treating glaucoma. In some embodiments, such as in FIGS. 32A and 32B, the delivery system for treating glaucoma may comprise the ocular device 2902, fluid 2904 and instrument 3202 for propelling the fluid medium to advance the ocular device as shown herein. In some cases, the propelling instrument 3202 can comprise a syringe, plunger, or other device. Such a propelling instrument may use positive pressure to move the internal fluid. In some cases, the propelling instrument 3202 can comprise a cannula. Fluid 2904 can comprise a viscoelastic fluid. In some embodiments, the propelling instrument 3202 can comprise a plunger filled with the fluid 2904. The operator can press the plunger and due to the hydraulic conductivity, the pressure can be transferred to the suspended ocular device. This can result in the displacement of the ocular device 2902 and fluid 2904 along the path as shown herein. FIGS. 32A and 32B show the consecutive steps of pressing the plunger, illustrating the movement of the ocular device 2902 as the plunger is pushed. In some cases, ocular device 2902 can comprise the device described above.

FIGS. 33A-33C illustrate consecutive steps of top-down views of a method using device and system 3300 for treating glaucoma during deployment. In some embodiments, such as in FIGS. 33A-33C, the delivery system for treating glaucoma may comprise the ocular device 2902, fluid 2904, and instruments 3202 for propelling the fluid medium to advance the ocular device as shown herein. In some cases, the propelling instrument 3202 can comprise a syringe, plunger, or other device. In some embodiments, the propelling instrument 3202 is a plunger filled with the fluid 2904. Fluid 2904 can comprise a viscoelastic fluid. The operator can press the plunger and due to the hydraulic conductivity, the pressure can be transferred to the suspended ocular device. This can lead to the displacement of the ocular device 2902 and fluid 2904 into an arc of Schlemm's canal 3302 with a predetermined radius as shown herein. FIGS. 33A-33C show the consecutive steps of pressing the plunger to advance the ocular device 2902 along Schlemm's canal 3302. The ocular device 2902 can comprise any of the ocular devices described herein.

FIG. 34 illustrates a top-down view of a system 3400 for treating glaucoma. In some embodiments, such as in FIG. 34 the delivery system for treating glaucoma may comprise the ocular device 2902, fluid 2904, push rod 3404, and instruments 3402 for propelling the fluid medium to advance the ocular device as shown herein. In some cases, the propelling instrument 3402 can comprise a syringe, plunger, or other device. In some embodiments, the propelling instrument 3402 is a plunger filled with the fluid 2904. The operator can press the plunger and due to the hydraulic conductivity, the pressure can be transferred to the suspended ocular device. This can lead to the displacement of the ocular device 2902 and fluid 2904 into an arc of Schlemm's canal 3302 with a predetermined radius as shown herein. The propelling instrument 3402 can be assisted by push rod 3404, which can manually or mechanically push the ocular device 2902 out of the propelling instrument 3402 in addition to the pressure generated by the instrument 3402. The ocular device 2902 can comprise any of the ocular devices described herein.

In some cases, a pusher may be used in conjunction with a guidewire, such that the guidewire guides the arc of the coil and provides stability for a longer advancement, while the pusher may provide force for advancement. In some cases, for example for smaller guidewires or guidewires working with the assistance of fluid advancement forces, a pusher may not be used. In some cases, all three may be used: a pusher, guidewire, and a fluid.

FIGS. 35A-35D illustrate consecutive steps of perspective views of a method of using device and system 3500 for treating glaucoma during deployment. In some embodiments, such as in FIGS. 35A-35D, the delivery system for treating glaucoma may comprise the ocular device 2902, fluid 2904 and instruments 3502 for propelling the fluid medium to advance the ocular device as shown herein. Fluid 2904 can comprise a viscoelastic fluid. FIGS. 35A-35D show the consecutive steps of ocular device 2902 advancement. FIGS. 35A-35D can also illustrate a method of advancing the device. The fluid 2904 may adhere to the device due to the surface tension effect. The ocular device 2902 and fluid 2904 retain an arced shape due to the shape memory nature of the ocular device 2902, which can comprise shape memory materials (e.g., nitinol). The ocular device 2902 can comprise any of the ocular devices described herein. The fluid 2904 may help to advance the ocular device 2902 through the Schlemm's canal as a plunger at the proximal end of the delivery system is depressed to push the ocular device 2902 and fluid 2904 out of the cannula. In some cases, the cannula may have a curved end to facilitate a curved angle approximating the bend of the Schlemm's canal. In some cases, instruments 3502 may use a pusher as shown in FIG. 34.

Figure 36A:
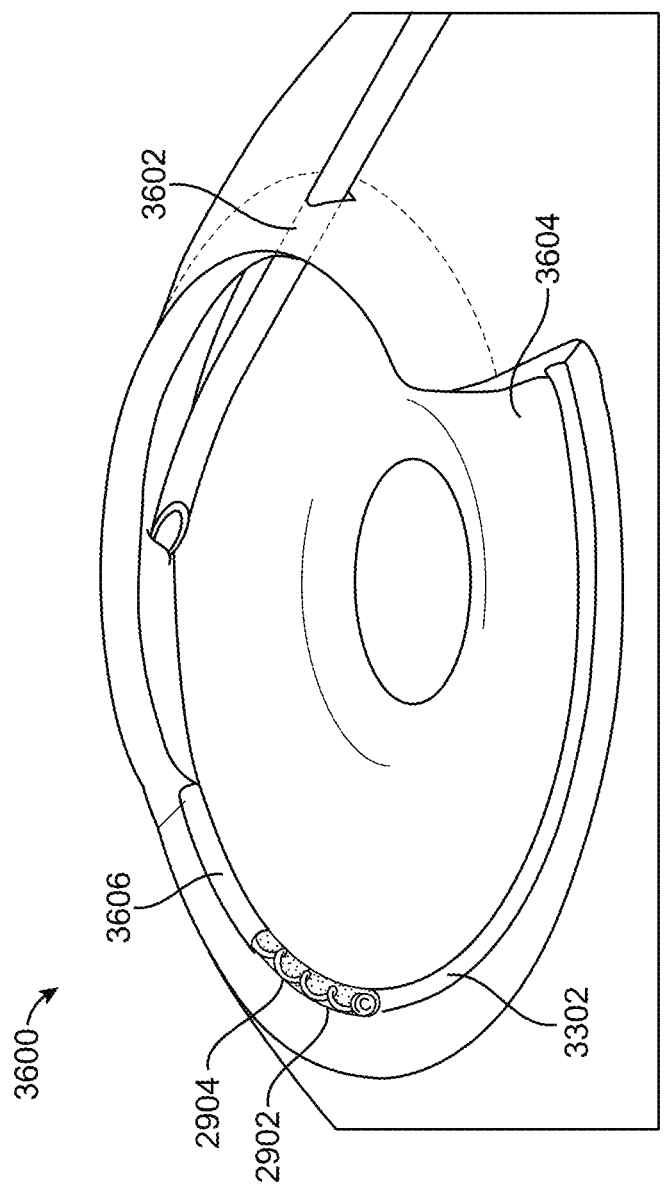
FIGS. 36A-36B illustrate perspective views of another example device and method for treating glaucoma in accordance with some embodiments.

FIG. 36A illustrates a perspective view of another method using device and system 3600 for treating glaucoma. In some embodiments, such as in FIG. 36A the delivery system for treating glaucoma may comprise the ocular device 2902, fluid 2904, a cannula 3602 which is part of an instrument for propelling the fluid medium, and a sheath 3606. Fluid 2904 can comprise a viscoelastic fluid. The ocular device 2902 and fluid 2904 are introduced into the arc of Schlemm's canal 3302 with the predetermined radius inside the eye 3604 as shown herein. In some cases, the radius can be based on a curvature of the sheath. The radius can be based on a curvature of the cannula. The radius can be based on a curvature of the stent device 2902. The radius can be based on the curvature of the Schlemm's canal. The sheath 3606 can provide additional protection for the eye from the ocular device 2902 as it is inserted. The sheath 3606 can help maintain the arc of the ocular device 2902 as it is inserted. The fluid 2904 may help to advance the ocular device 2902 through the Schlemm's canal as a plunger at the proximal end of the delivery system is depressed to push the ocular device 2902 and fluid 2904 out of the cannula. The ocular device 2902 can comprise any of the ocular devices described herein.

Figure 36B:
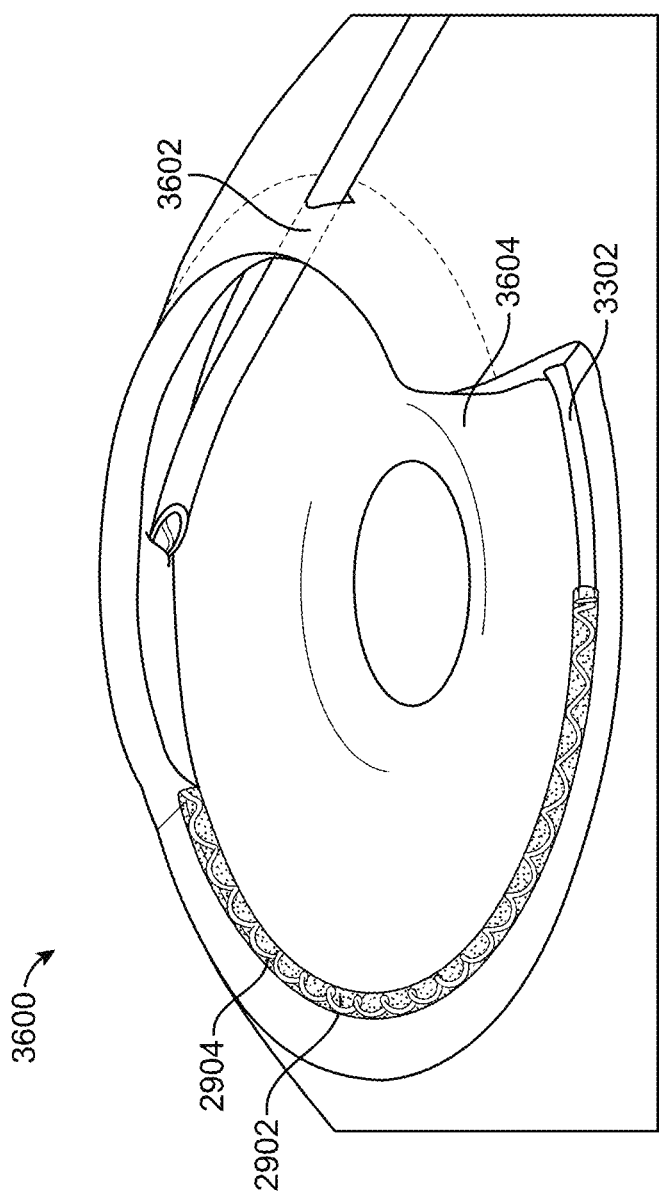

FIG. 36B illustrates another perspective view of the method using device and system 3600 of FIG. 36A. In some embodiments, such as in FIG. 36B the delivery system for treating glaucoma may comprise the ocular device 2902, fluid 2904, and a cannula 3602 which can be part of an instrument for propelling the fluid medium. FIG. 36B shows the ocular device 2902 and the fluid 2904 in Schlemm's canal 3302 after a sheath has been withdrawn into the cannula 3602. Fluid 2904 can comprise a viscoelastic fluid. The sheath can help maintain the arc of the ocular device 2902 as it is inserted. The ocular device 2902 and fluid 2904 are introduced into the arc of Schlemm's canal 3302 with the predetermined radius inside the eye 3604 as shown herein. The fluid 2904 may help to advance the ocular device 2902 through the Schlemm's canal as a plunger at the proximal end of the delivery system is depressed to push the ocular device 2902 and fluid 2904 out of the cannula. The ocular device 2902 can comprise any of the ocular devices described herein.

Figure 37B:
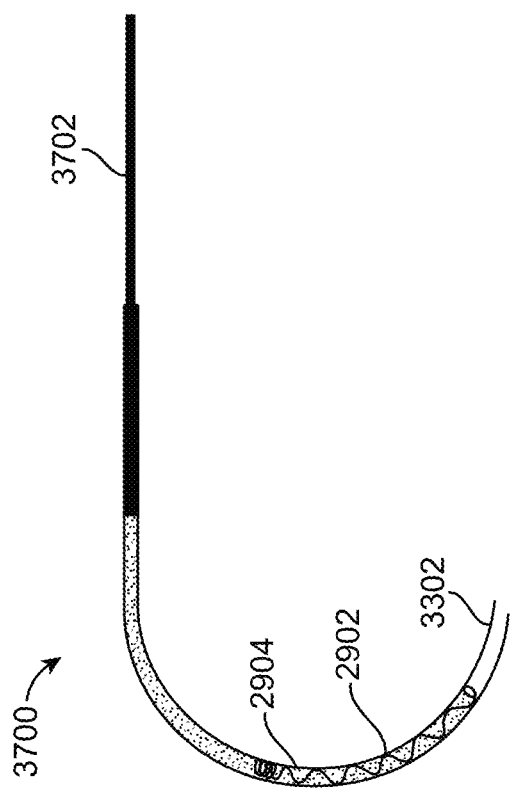
FIGS. 37A-37B illustrate consecutive steps of top-down views of an alternate example device and method for treating glaucoma during deployment in accordance with some embodiments described herein.
Figure 37A:
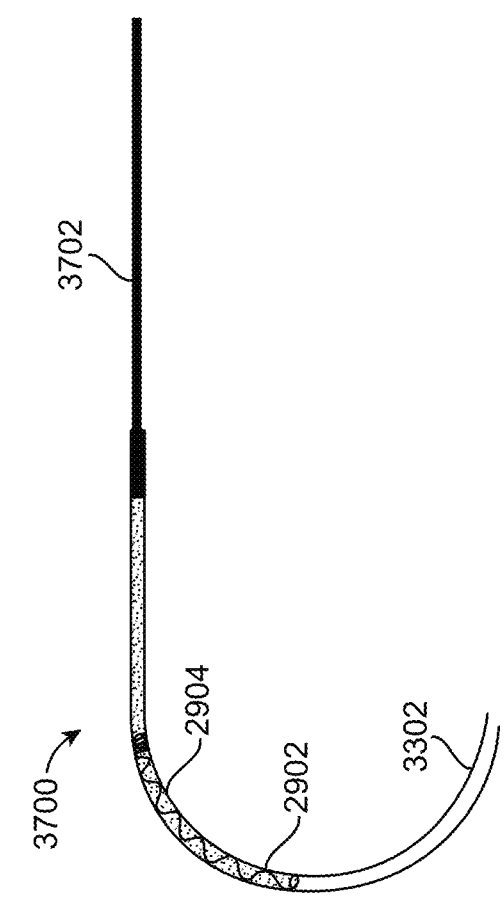

FIGS. 37A and 37B illustrate consecutive steps of top-down views of another method using a device and system 3700 for treating glaucoma during deployment. In some embodiments, such as in FIGS. 37A and 37B the delivery system for treating glaucoma may comprise the ocular device 2902, fluid 2904, and a wire 3702 for propelling the fluid medium to advance the ocular device as shown herein. Fluid 2904 can comprise a viscoelastic fluid. The wire 3702 can be a coring wire. The wire 3702 can be a push wire. The wire 3702 can be a guidewire. The wire 3702 can be controlled by a syringe, piston, or other device, or by the hand of an operator. The operator can push the wire and due to the hydraulic conductivity, the pressure is transferred to the suspended ocular device.

This can lead to the displacement of the ocular device 2902 and fluid 2904 into the arc of Schlemm's canal 3302 with the predetermined radius as shown herein. FIGS. 37A and 37B show the consecutive steps of pushing the wire. The ocular device 2902 can comprise any of the ocular devices described herein.

FIGS. 38A and 38B illustrate consecutive steps of perspective views of another method using a device and system 3800 for treating glaucoma during deployment. In some embodiments, such as in FIGS. 38A and 38B the delivery system for treating glaucoma may comprise the ocular device 2902, a cannula 3602 which is part of an instrument for propelling the ocular device 2902 and a coring or clearing wire 3802. The coring or clearing wire 3802 can be introduced into the arc of Schlemm's canal 3302 inside the eye through the already deployed ocular device 2902 as shown herein. The coring wire can be used in conjunction with, or instead of, the viscoelastic fluid. The coring wire can be controlled by a syringe, piston, or other device, or by the hand of an operator. When the coring wire is used in conjunction with viscoelastic fluid, the operator can push the wire and due to the hydraulic conductivity, the pressure is transferred to the suspended ocular device. This can lead to the displacement of the ocular device 2902 and fluid 2904 into the arc of Schlemm's canal 3302 with the predetermined radius as shown herein. Fluid 2904 can comprise a viscoelastic fluid. FIGS. 38A and 38B show the consecutive steps of the coring or clearing wire 3802 advancement. The ocular device 2902 can comprise any of the ocular devices described herein.

In some cases, the wire 3802 can be pushed through Schlemm's canal. The wire 3802 can follow a degree of arc of the circumference of Schlemm's canal from about 30 degrees to about 360 degrees. The wire 3802 can follow a degree of arc of the circumference of Schlemm's canal from about 30 degrees to about 60 degrees, about 30 degrees to about 90 degrees, about 30 degrees to about 120 degrees, about 30 degrees to about 150 degrees, about 30 degrees to about 180 degrees, about 30 degrees to about 210 degrees, about 30 degrees to about 240 degrees, about 30 degrees to about 270 degrees, about 30 degrees to about 300 degrees, about 30 degrees to about 330 degrees, about 30 degrees to about 360 degrees, about 60 degrees to about 90 degrees, about 60 degrees to about 120 degrees, about 60 degrees to about 150 degrees, about 60 degrees to about 180 degrees, about 60 degrees to about 210 degrees, about 60 degrees to about 240 degrees, about 60 degrees to about 270 degrees, about 60 degrees to about 300 degrees, about 60 degrees to about 330 degrees, about 60 degrees to about 360 degrees, about 90 degrees to about 120 degrees, about 90 degrees to about 150 degrees, about 90 degrees to about 180 degrees, about 90 degrees to about 210 degrees, about 90 degrees to about 240 degrees, about 90 degrees to about 270 degrees, about 90 degrees to about 300 degrees, about 90 degrees to about 330 degrees, about 90 degrees to about 360 degrees, about 120 degrees to about 150 degrees, about 120 degrees to about 180 degrees, about 120 degrees to about 210 degrees, about 120 degrees to about 240 degrees, about 120 degrees to about 270 degrees, about 120 degrees to about 300 degrees, about 120 degrees to about 330 degrees, about 120 degrees to about 360 degrees, about 150 degrees to about 180 degrees, about 150 degrees to about 210 degrees, about 150 degrees to about 240 degrees, about 150 degrees to about 270 degrees, about 150 degrees to about 300 degrees, about 150 degrees to about 330 degrees, about 150 degrees to about 360 degrees, about 180 degrees to about 210 degrees, about 180 degrees to about 240 degrees, about 180 degrees to about 270 degrees, about 180 degrees to about 300 degrees, about 180 degrees to about 330 degrees, about 180 degrees to about 360 degrees, about 210 degrees to about 240 degrees, about 210 degrees to about 270 degrees, about 210 degrees to about 300 degrees, about 210 degrees to about 330 degrees, about 210 degrees to about 360 degrees, about 240 degrees to about 270 degrees, about 240 degrees to about 300 degrees, about 240 degrees to about 330 degrees, about 240 degrees to about 360 degrees, about 270 degrees to about 300 degrees, about 270 degrees to about 330 degrees, about 270 degrees to about 360 degrees, about 300 degrees to about 330 degrees, about 300 degrees to about 360 degrees, or about 330 degrees to about 360 degrees. The wire 3802 can follow a degree of arc of the circumference of Schlemm's canal of about 30 degrees, about 60 degrees, about 90 degrees, about 120 degrees, about 150 degrees, about 180 degrees, about 210 degrees, about 240 degrees, about 270 degrees, about 300 degrees, about 330 degrees, or about 360 degrees. The wire 3802 can follow a degree of arc of the circumference of Schlemm's canal of at least about 30 degrees, about 60 degrees, about 90 degrees, about 120 degrees, about 150 degrees, about 180 degrees, about 210 degrees, about 240 degrees, about 270 degrees, about 300 degrees, or about 330 degrees. The wire 3802 can follow a degree of arc of the circumference of Schlemm's canal of at most about 60 degrees, about 90 degrees, about 120 degrees, about 150 degrees, about 180 degrees, about 210 degrees, about 240 degrees, about 270 degrees, about 300 degrees, about 330 degrees, or about 360 degrees.

In some cases, such as when the coring wire 3802 is used without viscoelastic fluid, the shape memory angle of the coring wire 3802 can be used to guide the ocular device 2902 around a desired path along Schlemm's canal 3302. In some cases, the shape memory of the ocular device 2902 itself is used to guide the device around the canal 3302.

Figure 39D:
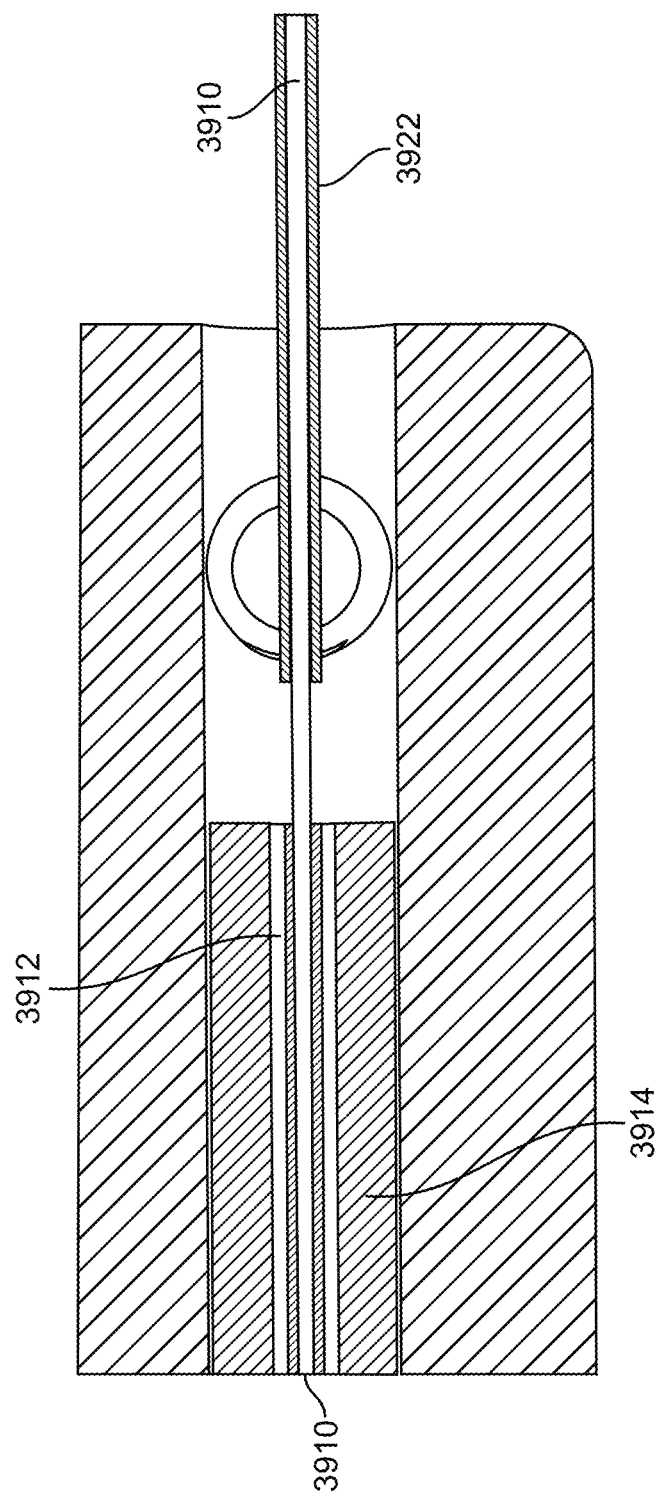

FIGS. 39A-39D show cross-sectional side views of device 3900 for delivering a stent and guidewire. FIG. 39A shows handle 3902, slider extension 3904, locking hull 3906, slider 3908, core 3910, pusher tube 3912, and locking tube 3914. Slider extension 3904 may resemble a skateboard extension to allow a forefinger to advance the slider over the full travel distance of the guidewire and/or coil stent. FIG. 39B shows the assembly of the locking conduit 3916 comprising pusher tube 3912, locking tube 3914, and locking sprocket 3918. FIG. 39C shows the core assembly 3920, comprising the core 3910, slider 3908, and crimp tube 3922. FIG. 39D shows core 3910, pusher tube 3912, locking tube 3914, and crimp tube 3922. The core 3910, pusher tube 3912, locking tube 3914, and crimp tube 3922 can advance and retract together. Core 3910 can be a guidewire, a coring wire, a different type of wire, a pusher, or a hollow guidewire. In some cases, core 3910 can comprise the delivery system shown in FIGS. 30A-30C or FIGS. 31A-31C such that the core comprises a hollow guidewire and inner guidewire.

The crimp tube 3922 can comprise a sheath that the core 3910 is bonded to that allows the set screws to secure onto and not crack or break the core, which may comprise a softer polypropylene. The sheath can be metal.

The method of using this device 3900 can include affixing the core (e.g., the guidewire) 3910 to the slider 3908 and affixing the pusher tube 3912 to the locking tube 3914. This can allow both sets to move forward together. The stent can be mounted over the core 3910. The stent and core can be deployed. Once the stent is deployed, the locking tube 3914 can be secured in place inside the locking hull 3906. The slider and core can be moved backward to retract into device 3900 while the pusher tube 3912 remains locked by having its backward motion blocked by the locking sprocket, allowing the stent to remain in the Schlemm's canal as the core retracts. The core can then be removed, leaving the stent in position inside the eye.

Disclosed herein is a delivery system using device 3900, wherein the helical coil can be mounted on a guidewire. The sliding mechanism within the delivery handpiece 3900 may be advanced by the surgeon or other medical professional such that both the guidewire and stent advance along the delivery cannula, out of the cannula, and along the circumference of Schlemm's canal.

The sliding mechanism can incorporate a ratchet such that a spring loaded clip settles into a well once the guidewire is fully advance with the stent, and whereby the clip thus locks the stent advance mechanism in place. The guidewire can then be withdrawn from Schlemm's canal and back into the delivery handpiece 3900 without moving the stent which thus remains in Schlemm's canal.

The guidewire may have a rounded tip to prevent penetration into the Schlemm's canal tissue. There may or may not be a friction force between the guidewire and Schlemm's canal. The guidewire may be pre-formed into an arc to encourage the linear advancement force to be transferred along the arc of Schlemm's canal.

In some cases, such a delivery system can be used to deliver an ocular stent as described herein that is less than or equal to about 12 mm long in its coiled shape. In some cases, such a delivery system can be used to deliver an ocular stent as described herein that is from about 6 mm to about 12 mm long in its coiled shape. In some cases, such a delivery system can be used to deliver an ocular stent as described herein that is from about 6 mm to about 8 mm, about 6 mm to about 10 mm, about 6 mm to about 12 mm, about 8 mm to about 10 mm, about 8 mm to about 12 mm, or about 10 mm to about 12 mm. In some cases, such a delivery system can be used to deliver an ocular stent as described herein that is about 6 mm, about 8 mm, about 10 mm, or about 12 mm. In some cases, such a delivery system can be used to deliver an ocular stent as described herein that is at least about 6 mm, about 8 mm, or about 10 mm. In some cases, such a delivery system can be used to deliver an ocular stent as described herein that is at most about 8 mm, about 10 mm, or about 12 mm. In some cases, such a delivery system can be used to deliver an ocular stent as described herein that is about 9 mm long.

In some cases, such a delivery system can be used to deliver an ocular stent as described herein that is greater than or equal to about 10 mm long in its coiled shape. In some cases, such a delivery system can be used to deliver an ocular stent as described herein that is from about 10 mm to about 20 mm. In some cases, such a delivery system can be used to deliver an ocular stent as described herein that is from about 10 mm to about 12 mm, about 10 mm to about 14 mm, about 10 mm to about 16 mm, about 10 mm to about 18 mm, about 10 mm to about 20 mm, about 12 mm to about 14 mm, about 12 mm to about 16 mm, about 12 mm to about 18 mm, about 12 mm to about 20 mm, about 14 mm to about 16 mm, about 14 mm to about 18 mm, about 14 mm to about 20 mm, about 16 mm to about 18 mm, about 16 mm to about 20 mm, or about 18 mm to about 20 mm. In some cases, such a delivery system can be used to deliver an ocular stent as described herein that is about 10 mm, about 12 mm, about 14 mm, about 16 mm, about 18 mm, or about 20 mm. In some cases, such a delivery system can be used to deliver an ocular stent as described herein that is at least about 10 mm, about 12 mm, about 14 mm, about 16 mm, or about 18 mm. In some cases, such a delivery system can be used to deliver an ocular stent as described herein that is at most about 12 mm, about 14 mm, about 16 mm, about 18 mm, or about 20 mm. In some cases, device 3900 may provide sufficient support for longer guidewires to be advanced further through Schlemm's canal compared to other delivery devices.

In some cases, multiple of devices 3900 can be used to insert multiple ocular stents as described herein. They may be inserted from different or opposing areas of the Schlemm's canal. They may be inserted at the same or similar area of Schlemm's canal, such that the second stent can push the first. They may be inserted at the same or similar area of Schlemm's canal, such that originate in a similar location but are pushed in opposing directions. In some cases, one delivery device may sequentially inject both. The delivery device may be able to hold both stents at once, such that they can be loaded once. In some cases, there may be one delivery device per stent. In some cases, the length of each of the stents can be between about 6 mm and about 12 mm and/or between about 10 mm and about 20 mm. The stents can be the similar lengths or different lengths. A different combination of stent lengths can be used in each eye of a patient.

FIGS. 40A-40J, 41A-41B, and 42A-42B show an alternate delivery method using retraction with a pusher device instead of a guidewire.

Described herein is a method that can allow a coil stent to be advanced, retracted, readvanced, and/or adjusted before being detached in the Schlemm's canal. A coil that stents open Schlemm's canal can be delivered by means of cannula and a pusher within the cannula that is detachably coupled to the stent. The helical coil may be advanced and retracted at will. Once the stent has been advanced beyond the tip of the cannula, the stent may catch on the tip of the cannula upon retraction such that the pusher can be retracted while the stent is held by the cannula tip edge so that the opposing forces cause the stent to be detached from the pusher.

The stent can be any of the ocular stents described herein.

The cannula may be of any material including, but not limited to flexible metals such as stainless steel, titanium, etc. and flexible polymers including shape memory polymers (SMPs), silicone, polyvinylidene fluoride (PVDF), polymethylmethacrylate (PMMA), polypropylene (PP), polyethersulfone (PES), poly-lactic acid (PLA), poly-glycolic acid (PGA), poly-glycolic acid (PGA), drug-eluting, shape memory alloys (nitinol, etc.), and/or tunable biodegradable polymers.

The pusher may be of any material including, but not limited to flexible metals such as stainless steel, titanium, etc. and flexible polymers including shape memory polymers (SMPs), silicone, polyvinylidene fluoride (PVDF), polymethylmethacrylate (PMMA), polypropylene (PP), polyethersulfone (PES), poly-lactic acid (PLA), poly-glycolic acid (PGA), poly-glycolic acid (PGA), drug-eluting, shape memory alloys (nitinol, etc.), and/or tunable biodegradable polymers.

The pusher may be attached to the stent by one or more of friction between the pusher tip and the stent, by a retractable suture loop, by a mechanical hook, loop or coil, or by an interfacing material designed to provide adherence. The tip of the pusher may be shaped to direct the stent away from the linear angle of the cannula such that the stent is offset from the cannula tip. The tip of the cannula may occupy all, or substantially all, of the diameter of the interior coil space such that the tip of the cannula may catch on the coil loop only. The tip of the cannula may occupy less than substantially all of the diameter of the interior coil space such that the tip of the cannula may catch across an inner cross section of the coil loop diameter. In some cases, the proximal end loop of the stent may have a zero-degree angle to provide a flat interface for the edge of the cannula on retraction.

Figure 40G:
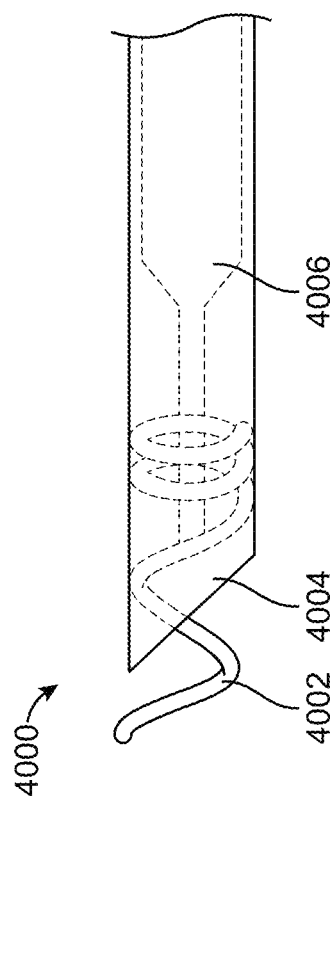
Figure 40H:
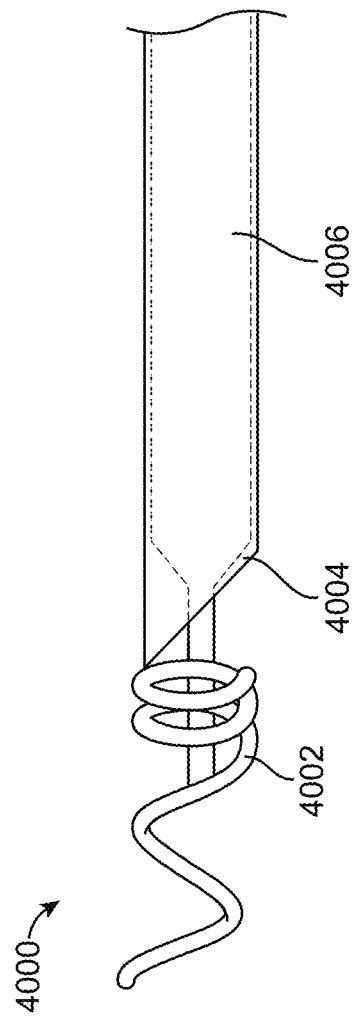
Figure 40I:
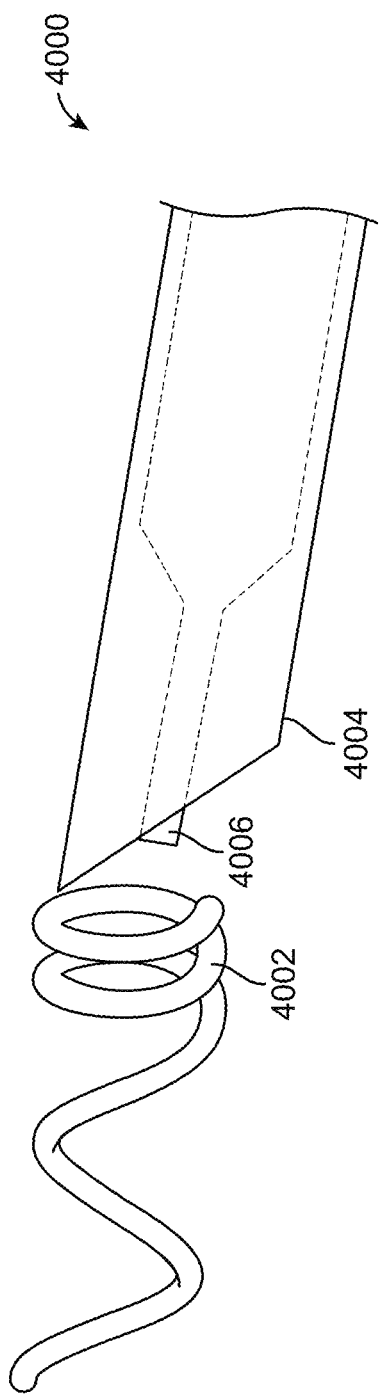
Figure 40J:
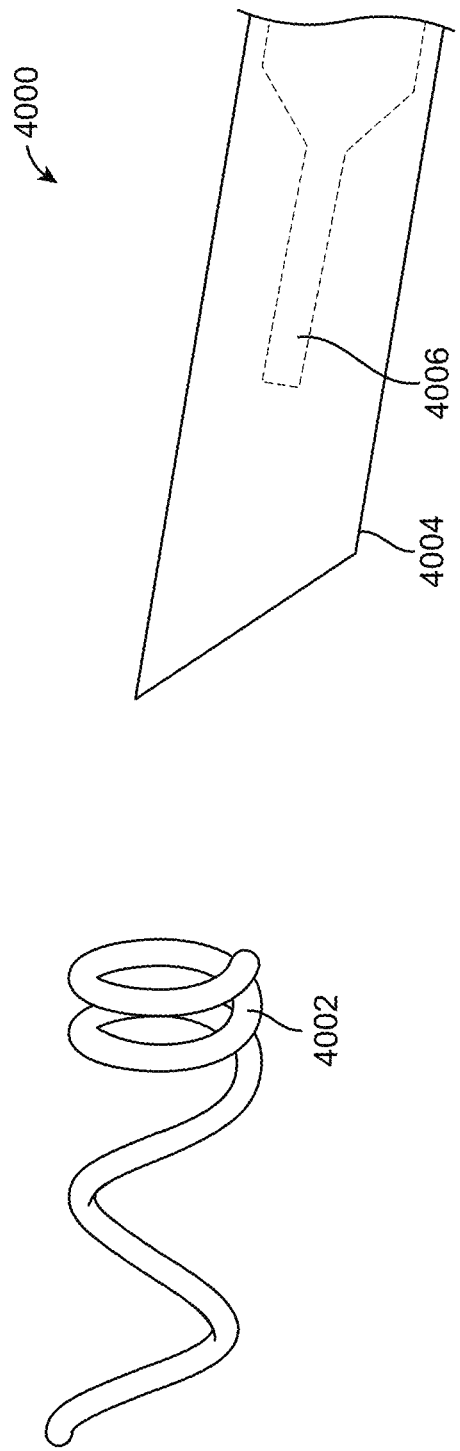

FIGS. 40A-40J show side (FIGS. 40A-40F) and see-through side (FIGS. 40G-40I) views of consecutive steps of method 4000 of ejecting device 4002 via cannula 4004 with pusher 4006. FIG. 40G is a see-through version of FIG. 40A, FIG. 40H is a see-through version of FIG. 40C, and FIGS. 40I-40J show the steps after FIG. 40D.

Method 4000 can include advancing stent device 4002 from a delivery cannula 4004 as shown in FIG. 40A. FIG. 40B shows the progression of this advancement. Once the stent 4002 is advanced but still attached to the pusher 4006, it can be hooked onto an edge of the cannula 4004 such that the cannula 4004 prevents the stent 4002 from retracting. At the same time, as shown in the progression from FIG. 40C to FIG. 40D, the pusher 4006 can be withdrawn until it disconnects from stent 4002. Stent 4002 can then remain in the Schlemm's canal. FIG. 40E shows the separate pusher 4006 and FIG. 40F shows the separate cannula 4004, as the pusher 4006 can be withdrawn from the cannula if desired once the stent has been unhooked from the pusher 4006.

FIG. 40G shows an example of how the stent 4002 can be coupled to or hooked onto pusher 4006. FIG. 40H shows the stent 4002 being advanced. FIG. 40I shows the pusher 4006 retracting into the cannula 4004 without the stent 4002, and FIG. 40J shows the same with a larger distance as the cannula 4004 is withdrawn from the eye while the stent remains in the Schlemm's canal.

Figure 41A:
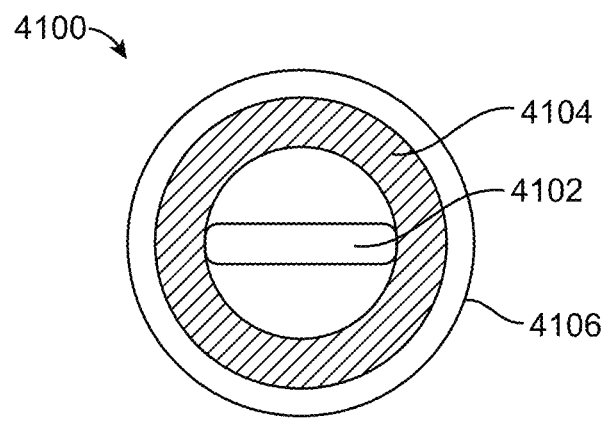
FIGS. 41A-41B show cross-sectional front views of consecutive steps of ejecting an example device in accordance with example methods described herein.
Figure 41B:
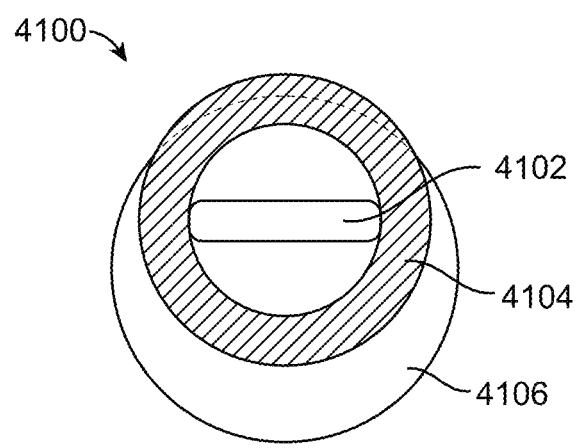

FIGS. 41A-41B show cross-sectional front views of consecutive steps of a method 4100 of ejecting an eye stent device 4104 from cannula 4106 using a pusher 4102. FIG. 41A shows the coil stent 4104 in the cannula 4106. The coil 4104 and pusher 4102 can move back and forward together, thereby being retractable at this stage. This is also shown in FIGS. 40A-40B and 40G. FIG. 41B shows the coil stent 4104 outside of the cannula 4106. The cannula 4106 can block the coil 4104 from retracting while the pusher 4102 is withdrawn. This is also shown in FIGS. 40C-40D and 40H-40J. In some cases, the pusher can be centered within the cannula, as shown in FIGS. 41A-41B. The pusher can be flat (e.g., rectangular) or curved. The curvature can be a semi-circle.

Figure 42A:
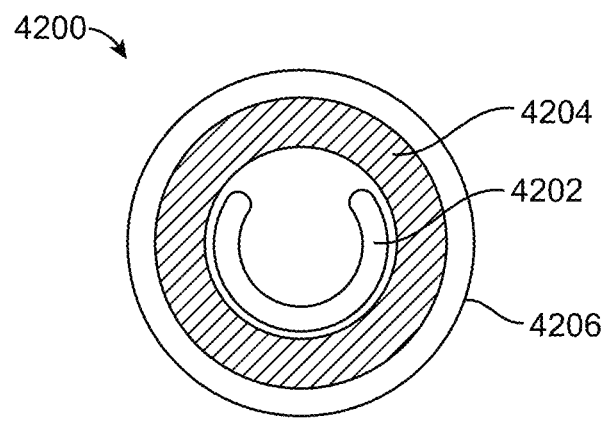
FIGS. 42A-42B show cross-sectional front views of consecutive steps of ejecting an example device in accordance with alternate example methods described herein.
Figure 42B:
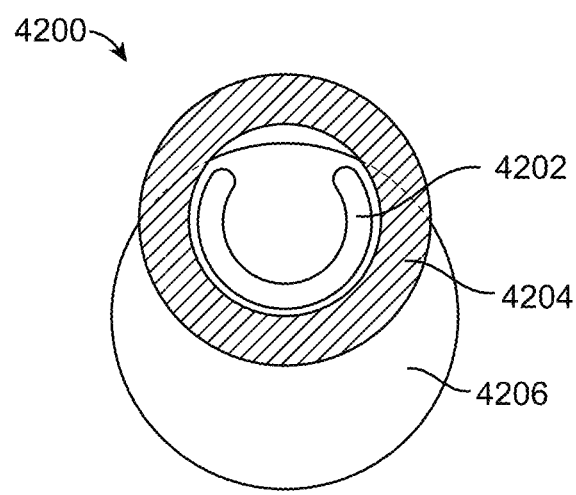

FIGS. 42A-42B show cross-sectional front views of consecutive steps of method 4200 of ejecting stent device 4204 via pusher 4202 through cannula 4206. These figures show an alternate form of pusher compared to FIGS. 41A-41B. FIG. 42A shows the coil in the cannula in a still-retractable stage, whereas FIG. 42B shows the coil outside the cannula such that it is no longer retractable. In some cases, the pusher can be off-center within the cannula, as shown in FIGS. 41A-41B. The pusher can be flat (e.g., rectangular) or curved. The curvature can be a semi-circle.

Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

The ocular eye stent for insertion into the Schlemm's canal as described herein can be referred to interchangeably as an "self-expanding eye stent (SES)", an "ocular stent," an "ocular device," a "stent," an "expansion member," a "single elongated element" or other similar terms.

Throughout this application, various embodiments may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers, and also represent an amount close to the stated amount that still performs a desired function or achieves a desired result. The term "about" or "approximately" may mean within an acceptable error range for the particular value, which will depend in part on how the value is measured or determined, e.g., the limitations of the measurement system. For example, the terms "approximately", "about", and "substantially" may refer to an amount that is within less than 10% of, within less than 5% of, within less than 1% of, within less than 0.1% of, and within less than 0.01% of the stated amount. For example, "about" may mean within 1 or more than 1 standard deviation, per the practice in the art. Alternatively, "about" may mean a range of up to 20%, up to 10%, up to 5%, or up to 1% of a given value. As used herein, the term "about" a number refers to that number plus or minus 10% of that number. The term "about" a range refers to that range minus 10% of its lowest value and plus 10% of its greatest value. Where particular values are described in the application and claims, unless otherwise stated the term "about" meaning within an acceptable error range for the particular value may be assumed.

As used in the specification and claims, the singular forms "a", "an" and "the" include plural references unless the context clearly dictates otherwise. For example, the term "a sample" includes a plurality of samples, including mixtures thereof.

The terms "determining," "measuring," "evaluating," "assessing," "assaying," and "analyzing" are often used interchangeably herein to refer to forms of measurement. The terms include determining if an element is present or not (for example, detection). These terms can include quantitative, qualitative or quantitative and qualitative determinations. Assessing can be relative or absolute. "Detecting the presence of" can include determining the amount of something present in addition to determining whether it is present or absent depending on the context.

The terms "subject," "individual," or "patient" are often used interchangeably herein. A "subject" can be a biological entity containing expressed genetic materials. The biological entity can be a plant, animal, or microorganism, including, for example, bacteria, viruses, fungi, and protozoa. The subject can be tissues, cells and their progeny of a biological entity obtained in vivo or cultured in vitro. The subject can be a mammal. The mammal can be a human. The subject may be diagnosed or suspected of being at high risk for a disease. In some cases, the subject is not necessarily diagnosed or suspected of being at high risk for the disease.

As used herein, the terms "treatment" or "treating" are used in reference to a pharmaceutical or other intervention regimen for obtaining beneficial or desired results in the recipient. Beneficial or desired results include but are not limited to a therapeutic benefit and/or a prophylactic benefit. A therapeutic benefit may refer to eradication or amelioration of symptoms or of an underlying disorder being treated. Also, a therapeutic benefit can be achieved with the eradication or amelioration of one or more of the physiological symptoms associated with the underlying disorder such that an improvement is observed in the subject, notwithstanding that the subject may still be afflicted with the underlying disorder. A prophylactic effect includes delaying, preventing, or eliminating the appearance of a disease or condition, delaying or eliminating the onset of symptoms of a disease or condition, slowing, halting, or reversing the progression of a disease or condition, or any combination thereof. For prophylactic benefit, a subject at risk of developing a particular disease, or to a subject reporting one or more of the physiological symptoms of a disease may undergo treatment, even though a diagnosis of this disease may not have been made.

The section headings used herein are for organizational purposes only and are not to be construed as limiting the subject matter described.

EXAMPLES

Example 1: Selection of an Appropriate Device Described Herein

A patient is diagnosed with glaucoma after having a prolonged, high intra-ocular pressure, as determined by an intra-ocular pressure measuring device. The patient may or may not receive various treatments, such as IOP-lowering drops, trabeculectomy, or other forms of surgical drainage devices that funnel fluid into various locations (ab-interno vs. ab-externo), but these treatments prove ineffective. The decision is made to insert a device as described herein into the Schlemm's canal to increase drainage to collector channels to decrease intra-ocular pressure and thus show improvement in the glaucoma.

The medical practitioner measures the size of the device needed for the patient. The patient's eye may be measured or imaged using a pre-operative scan to determine the customized fit of the device required for the patient's needs. Measurements can include biometric measurements including Schlemm's canal dimensions, Schlemm's canal angle, Schlemm's canal perimeter, and Schlemm's canal cross-sectional area (CSA). The sizing needs may also be affected by the desired reduction in intra-ocular pressure. In some cases, finite-element analysis (FEA) and modeling may be used to determine the desired sizing of the device, including features such as coil diameter, overall tube or device diameter, pitch, variance in pitch, entry and exit dimensions, etc.

The medical practitioner measures the degree of coverage of the Schlemm's canal needed for the patient, based on the severity of the glaucoma. If the patient has mild glaucoma, characterized as an intra-ocular pressure of approximately 18 mm Hg, the patient may be offered a device with a smaller degree of coverage of the Schlemm's canal. If the patient has moderate to severe glaucoma, characterized as an intra-ocular pressure below 15 mm Hg, the patient may be offered a device with full, or nearly-full perimetric coverage as described herein. The medical practitioner may insert one longer device or multiple shorter devices as described herein to achieve the desired coverage.

Based on the physical dimensions of the patient's eye and the Schlemm's canal, and the severity of the glaucoma, a customized device as described herein is chosen for insertion into the patient's Schlemm's canal.

CLAUSES

Clause 1. A device for maintaining or restoring patency of a channel of a Schlemm's canal in a patient's eye, the device comprising:
 a. a single elongated element configured for radial expansion when inserted into a channel of the Schlemm's canal,
 b. wherein the single elongated element is configured to follow an arc of a circumference of the channel,
 c. wherein the arc subtends an angle comprising a degree of arc greater than approximately 140 degrees.

Clause 2. The device of clause 1, wherein the arc subtends an angle comprising a degree of arc greater than approximately 160 degrees.

Clause 3. The device of clause 1 or 2, wherein the arc subtends an angle comprising a degree of arc greater than approximately 180 degrees.

Clause 4. The device of any one of clauses 1 to 3, wherein the arc subtends an angle comprising a degree of arc between approximately 300 degrees and approximately 360 degrees.

Clause 5. The device of any one of clauses 1 to 4, wherein the single elongated element is configured to follow a curvature of the Schlemm's canal when inserted into the channel.

Clause 6. The device of clause 5, wherein the curvature of the single elongated element is configured to substantially not exert force on the Schlemm's canal when the single elongated element is inserted into the channel.

Clause 7. The device of any one of clauses 1 to 6, wherein the single elongated element comprises (i) sufficient radial strength to withstand compressive stresses exerted by the channel and (ii) sufficient void space in its structure to minimize blockage of collector channels in the channel of the Schlemm's canal, when the single elongated element is implanted in the channel.

Clause 8. The device of any one of clauses 1 to 7, wherein the single elongated element comprises a coil shape.

Clause 9. The device of any one of clauses 1 to 8, wherein the single elongated element comprises repeating helical turns.

Clause 10. The device of any one of clauses 1 to 9, wherein the single elongated element comprises repeating serpentine loops.

Clause 11. The device of any one of clauses 1 to 10, wherein the single elongated element is configured to curve along its length when free from constraint to conform to a shape of the channel.

Clause 12. The device of any one of clauses 1 to 11, wherein the single elongated element comprises a pre to shaped metal or polymeric filament.

Clause 13. The device of clause 12, wherein the single elongated element comprises a pre to shaped metal wire.

Clause 14. The device of clause 13, wherein the single elongated element comprises a shape or heat memory alloy wire.

Clause 15. The device of clause 13 or 14, wherein the single elongated element comprises a nickel to titanium alloy wire.

Clause 16. The device of any one of clauses 1 to 15, wherein at least one end of the single elongated element has a geometry different than that of the remainder of the single elongated element.

Clause 17. The device of any one of clauses 1 to 16, wherein both ends of the single elongated element have a geometry different than that of a central region of the single elongated element.

Clause 18. The device of any one of clauses 1 to 17, wherein the single elongated element comprises a shape memory alloy wire comprising a diameter between approximately 0.001 mm to 1 mm; wherein the single elongated element is formed into a cylindrical helix comprising a central region with a pitch between successive turns; wherein the pitch ranges between about 0.001 mm to about 10 mm; and wherein a diameter of the central region ranges between about 0.001 mm to about 10 mm when unconstrained.

Clause 19. The device of any one of clauses 1 to 18, wherein at least one end of the single elongated element is formed into a helix having a tighter pitch and smaller diameter than those of the central region.

Clause 20. The device of clause 19, wherein both ends of the single elongated element are configured to form a helix having a tighter pitch and smaller diameter than those of the central region.

Clause 21. The device of clause 20, wherein the tighter pitch comprises a pitch between about 0.001 mm to about 1 mm, and the smaller diameter is between about 0.001 mm to about 1 mm.

Clause 22. The device of any one of clauses 1 to 21, wherein of the single elongated element comprises a radius of curvature selected to match that of the radius of curvature of the channel.

Clause 23. The device of any one of clauses 1 to 22, wherein the single elongated element has been polished mechanically, chemically, or electrochemically to improve finish and biocompatibility.

Clause 24. The device of any one of clauses 1 to 23, wherein the single elongated element comprises at least one end configured to form a loop.

Clause 25. The device of any one of clauses 1 to 24, wherein the single elongated element comprises at least one end configured to form a wound coil.

Clause 26. The device of clause 25, wherein the wound coil is tightly wound, wherein the wound coil has a pitch from about 0.15 mm to about 1 mm.

Clause 27. The device of clause 25 or 26, wherein the wound coil is configured to have sufficient strength and space between adjacent turns to permit fluid flow therethrough.

Clause 28. The device of any one of clauses 1 to 27, wherein the single elongated element is configured to be at least partially biodegradable or bioresorbable.

Clause 29. The device of any one of clauses 1 to 28, wherein the single elongated element comprises a drug to eluting member formed on a surface thereof or embedded therein.

Clause 30. The device of any one of clauses 1 to 29, wherein the single elongated element comprises a hydrophilic or hydrophobic coating.

Clause 31. The device of any one of clauses 1 to 30, wherein the single elongated element comprises at least one feature configured to facilitate manipulation at one or more ends thereof.

Clause 32. The device of clause 31, wherein the at least one feature comprises one or more of a tubular structure or helical structure located at a proximal end of the single elongated element.

Clause 33. The device of clause 32, wherein the one or more of the tubular structure or helical structure comprises one or more of barbs, hooks, eyelets, grooves, rings, C to loops, or loops.

Clause 34. The device of any one of clauses 1 to 33, wherein the single elongated element comprises a by to pass feature configured to permit aqueous flow between Schlemm's canal and an anterior chamber of the eye.

Clause 35. The device of clause 34, wherein the by to pass feature comprises one or more of a tubular structure or helical structure located at a proximal end, distal end, or both of the single elongated element.

Clause 36. The device of clause 35, wherein the one or more of the tubular structure or helical structure comprises one or more of barbs, hooks, eyelets, grooves, rings, C to loops, or loops.

Clause 37. The device of clause 34, wherein the aqueous flow between Schlemm's canal and the anterior chamber of the eye is not substantially limited when the degree of arc increases.

Clause 38. The device of any one of clauses 34 to 36, wherein the by to pass feature is located at an entry, an exit, or along a length of the device.

Clause 39. The device of any one of clauses 1 to 38, wherein the single elongated element comprises a polymeric material selected from a group comprising polyvinylidene fluoride, polyvinylidene difluoride (PVDF), polyvinylpyrrolidone (PVP), polyurethane, polyethylene glycol (PEG), polylactic acid (PLA), polycaprolactone (PCL), polyglycolic acid (PGA), polymethylmethacrylate (PMMA), polyacrylates, polyamide, polyimide, polyesters, silicone, and carbon to composites.

Clause 40. The device of any one of clauses 1 to 39, wherein the single elongated element comprises a metal or metal alloy selected from a group comprising nitinol, titanium, stainless steel, cobalt to chrome alloy, gold, platinum, silver, iridium, tantalum, tungsten, aluminum, and vanadium.

Clause 41. The device of any one of clauses 1 to 40, wherein the single elongated element is mounted over one or more of a guidewire, a coring wire, or a pusher.

Clause 42. The device of clause 41, wherein the one or more of the guidewire, the coring wire, or the pusher is configured to stabilize the single elongated element to enable advancement over the arc greater than approximately 140 degrees.

Clause 43. The device of clause 41 or 42, wherein the one or more of the guidewire, the coring wire, or the pusher is configured to provide physical support and advancement force to enable advancement of the single elongated element over the arc greater than approximately 180 degrees.

Clause 44. The device of any one of clauses 1 to 43, wherein the single elongated element is configured to be suspended in a fluid.

Clause 45. The device of clause 44, wherein the fluid comprises a viscoelastic fluid.

Clause 46. The device of clause 44 or 45, wherein the fluid is configured to facilitate advancement of the single elongated element along the arc of the circumference.

Clause 47. The device of any one of clauses 44 to 46, wherein the fluid is configured to provide hydraulic support and advancement force to enable advancement of the single elongated element over the arc greater than approximately 140 degrees.

Clause 48. The device of any one of clauses 44 to 47, wherein the fluid comprises a drug.

Clause 49. The device of clause 48, wherein the drug comprises one or more of prostaglandin analogs, beta to blockers, alpha agonists, carbonic anhydrase inhibitors, rho kinase inhibitors, or neuroprotective agents.

Clause 50. The device of clause 48 or 49, wherein the fluid is configured to be combined with biodegradable polymers configured for controlled and sustained drug release over a predetermined period of time.

Clause 51. The device of clause 50, wherein the biodegradable polymers comprise one or more of polylactic acid (PLA), polyglycolic acid (PGA), poly(lactic to co to glycolic acid) (PLGA), polycaprolactone (PCL), or copolymers thereof.

Clause 52. The device of clause 51 or 52, wherein the drug is configured to be encapsulated in microspheres or nanoparticles formed by the biodegradable polymers to achieve sustained drug release.

Clause 53. The device of any one of clauses 50 to 52, wherein the controlled release of the drug is configured to reduce intraocular pressure (IOP) and protect the optic nerve.

Clause 54. The device of any one of clauses 1 to 53, wherein a length of the single elongated element in a coiled form is from about 9 mm to about 16 mm.

Clause 55. A system for treating glaucoma in a patient, comprising:
  a delivery device; and
  at least one single elongated element configured for radial expansion when inserted into a channel of the Schlemm's canal,
  wherein the at least one single elongated element comprises a first single elongated element configured to follow a first arc of a circumference of the channel, wherein the arc subtends an angle comprising a degree of arc greater than approximately 140 degrees.

Clause 56. The system of clause 55, wherein the first arc subtends an angle comprising a degree of arc greater than approximately 160 degrees.

Clause 57. The system of clause 55 or 56, wherein the first arc subtends an angle comprising a degree of arc greater than approximately 180 degrees.

Clause 58. The system of any one of clauses 55 to 57, wherein the first arc subtends an angle comprising a degree of arc between approximately 300 degrees and approximately 360 degrees.

Clause 59. The system of any one of clauses 55 to 57, wherein the at least one single elongated element further comprises a second elongated element separate from the first single elongated element, wherein the second single elongated element is configured to follow a second arc of the circumference of the channel, and wherein the second arc subtends a second angle comprising a second degree of arc.

Clause 60. The system of clause 59, wherein, when the first and second elongated elements are inserted into the channel of the Schlemm's canal and non to overlapping, the degree of arc of the first arc and the degree of arc of the second arc combined comprise a combined degree of arc between approximately 300 degrees and approximately 360 degrees.

Clause 61. The system of any one of clauses 55 to 60, wherein the delivery device comprises a cannula.

Clause 62. The system of any one of clauses 55 to 61, wherein the delivery device comprises a plunger wire.

Clause 63. The system of clause 62, wherein the plunger wire comprises a sliding wire.

Clause 64. The system of any one of clauses 55 to 63, wherein the delivery device is temperature controlled by an external energy source.

Clause 65. The system of clause 64, wherein the temperature of the delivery device alters a shape of the at least one single elongated element.

Clause 66. The system of any one of clauses 55 to 65, wherein the delivery device comprises a deployment mechanism.

Clause 67. The system of clause 66, wherein the deployment mechanism can be configured to measure an advancement of the at least one single elongated element through the delivery device.

Clause 68. The system of any one of clauses 55 to 67, wherein the delivery device comprises a cartridge that is configured to store the at least one single elongated element.

Clause 69. The system of clause 68, wherein the at least one single elongated element are individually dispensed from the cartridge.

Clause 70. The system of clause 68 or 69, wherein the at least one single elongated element is preloaded into the cartridge.

Clause 71. The system of any one of clauses 55 to 70, wherein the delivery device comprises a guide to wire.

Clause 72. The system of any one of clauses 55 to 71, wherein the delivery device can be powered by a piezo to electric or a vibrational motor.

Clause 73. The system of any one of clauses 55 to 72, wherein the at least one single elongated element comprises measurement markers that serve as a reference point during insertion of the at least one single elongated element by the delivery device.

Clause 74. The system of any one of clauses 55 to 73, further comprising a scanning system.

Clause 75. The system of clause 74, wherein the scanning system is configured to conduct imaging and biometric measurements to determine a necessary size of the at least one single elongated element to be used for the patient.

Clause 76. The system of any one of clauses 55 to 75, further comprising an intraocular pressure reader, wherein the intraocular pressure reader can be used to determine a necessary size of the at least one single elongated element for a reduction of an intraocular pressure in the patient.

Clause 77. The system of any one of clauses 55 to 76, wherein the delivery device is configured to be filled with a fluid, wherein the at least one single elongated element is configured to float within the fluid.

Clause 78. The system of clause 77, wherein the fluid comprises a viscoelastic fluid.

Clause 79. The system of clause 77 or 78, wherein the fluid is configured to advance the at least one single elongated element along the channel.

Clause 80. The system of any one of clauses 77 to 79, wherein the fluid is configured to provide hydraulic support and advancement force to enable advancement of the at least one single elongated element over the arc greater than approximately 180 degrees.

Clause 81. The system of any one of clauses 77 to 80, wherein the fluid is configured to minimize injury to a wall of the channel from the at least one single elongated element.

Clause 82. The system of any one of clauses 77 to 81, wherein the fluid is configured to minimize or maintain friction between a wall of the channel and the at least one single elongated element.

Clause 83. The system of any one of clauses 77 to 82, wherein the fluid comprises a drug.

Clause 84. The system of clause 83, wherein the drug comprises one or more of prostaglandin analogs, beta to blockers, alpha agonists, carbonic anhydrase inhibitors, rho kinase inhibitors, or neuroprotective agents.

Clause 85. The system of clause 83 or 84, wherein the fluid is configured to be combined with biodegradable polymers configured for controlled and sustained drug release over a predetermined period of time.

Clause 86. The system of clause 85, wherein the biodegradable polymers comprise one or more of polylactic acid (PLA), polyglycolic acid (PGA), poly(lactic to co to glycolic acid) (PLGA), polycaprolactone (PCL), or copolymers thereof.

Clause 87. The system of clause 85 or 86, wherein the drug is configured to be encapsulated in microspheres or nanoparticles formed by the biodegradable polymers to achieve sustained drug release.

Clause 88. The system of any one of clauses 85 to 87, wherein the controlled release of the drug is configured to reduce intraocular pressure (IOP) and protect the optic nerve.

Clause 89. The system of any one of clauses 55 to 88, wherein the delivery device is configured to be coupled to one or more of a pusher, a guidewire, a coring wire, or a cleaning wire.

Clause 90. The system of clause 89, wherein the one or more of a pusher, a guidewire, a coring wire, or a cleaning wire are configured to advance the at least one single elongated element along the channel.

Clause 91. The system of any one of clauses 55 to 90, wherein the at least one single elongated element is configured to be mounted over a guidewire prior to implanting the at least one single elongated element.

Clause 92. The system of clause 91, wherein the guidewire is configured to stabilize the at least one single elongated element to enable advancement over the arc greater than approximately 140 degrees.

Clause 93. The system of clause 91 or 92, wherein one or more of the guidewire or the at least one single elongated element comprise anchoring features.

Clause 94. The system of clause 93, wherein a tip of the at least one single elongated element does not comprise anchoring features.

Clause 95. The system of clause 93 or 94, wherein the anchoring features comprise one or more of loops, barbs, grooves, rings, eyelets, or hooks.

Clause 96. The system of any one of clauses 91 to 95, further comprising a pusher, wherein the pusher is configured to advance the at least one single elongated element.

Clause 97. The system of any one of clauses 55 to 96, wherein the delivery device comprises a hollow guidewire and an inner guidewire.

Clause 98. The system of clause 97, wherein the inner guidewire is configured to expand the hollow guidewire.

Clause 99. The system of clause 98, wherein the expanded hollow guidewire is configured to exert a frictional force on the at least one single elongated element, such that the hollow guidewire and the at least one single elongated element advance together.

Clause 100. The system of clause 99, wherein the inner guidewire is configured to be retracted to reduce the frictional force on the at least one single elongated element, thereby releasing the at least one single elongated element from the delivery device.

Clause 101. The system of any one of clauses 97 to 100, wherein the inner guidewire comprises a hooked distal end that is configured to hold the at least one single elongated element in place at the distal end of the inner guidewire.

Clause 102. The system of any one of clauses 55 to 101, wherein the at least one single elongated element comprises the device of clauses 1 to 54.

Clause 103. A method of treating glaucoma in a patient, comprising:
 implanting at least one single elongated element into a channel of a Schlemm's canal of the patient, wherein the at least one single elongated element is configured to radially expand when inserted into the channel,
 wherein the at least one single elongated element comprises a first single elongated element configured to follow a first arc of a circumference of the channel, wherein the arc subtends an angle comprising a degree of arc greater than approximately 140 degrees.

Clause 104. The method of clause 103, wherein the arc subtends an angle comprising a degree of arc greater than approximately 160 degrees.

Clause 105. The method of clause 103 or 104, wherein the arc subtends an angle comprising a degree of arc greater than approximately 180 degrees.

Clause 106. The method of any one of clauses 103 to 105, wherein the arc subtends an angle comprising a degree of arc between approximately 300 degrees and approximately 360 degrees.

Clause 107. The method of any one of clauses 103 to 106, wherein the at least one single elongated element further comprises a second elongated element separate from the first single elongated element, wherein the second single elongated element is configured to follow a second arc of the circumference of the channel, and wherein the second arc subtends a second angle comprising a second degree of arc.

Clause 108. The method of clause 107, wherein, when the first and second elongated elements are inserted into the channel of the Schlemm's canal and non to overlapping, the degree of arc of the first arc and the degree of arc of the second arc combined comprise a combined degree of arc between approximately 300 degrees and approximately 360 degrees.

Clause 109. The method of any one of clauses 103 to 108, wherein the implanting is facilitated by one or more of a fluid, a guidewire, or a pusher.

Clause 110. The method of any one of clauses 103 to 109, wherein the at least one single elongated element opens the channel with (i) sufficient radial strength to withstand compressive stresses exerted by the channel and (ii) sufficient void space in its structure to minimize blockage of collector channels in the channel, when the at least one single elongated element is implanted in the channel.

Clause 111. The method of any one of clauses 103 to 110, wherein the at least one single elongated element comprises a by to pass feature configured to permit aqueous flow between Schlemm's canal and an anterior chamber of the eye.

Clause 112. The method of clause 111, wherein the aqueous flow between Schlemm's canal and the anterior chamber of the eye is not substantially limited when the degree of arc increases.

Clause 113. The method of clause 111 or 112, wherein the by to pass feature is located at an entry, an exit, or along a length of the device.

Clause 114. The method of any one of clauses 111 to 113, wherein the by to pass feature comprises one or more of a tubular structure or helical structure located at a proximal end, distal end, or both of the at least one single elongated element.

Clause 115. The method of any one of clauses 111 to 114, wherein the one or more of the tubular structure or helical structure comprises one or more of barbs, hooks, eyelets, grooves, rings, C to loops, or loops.

Clause 116. The method of any one of clauses 103 to 115, further comprising loading the at least one single elongated element into a cannula prior to implanting the at least one single elongated element.

Clause 117. The method of clauses 116, wherein implanting the at least one single elongated element comprises inserting the cannula into an anterior chamber of the patient's eye, through trabecular meshwork and into the channel of the Schlemm's canal of the eye.

Clause 118. The method of clause 117, wherein implanting the at least one single elongated element comprises unloading the at least one single elongated element in the cannula into the Schlemm's canal of the eye.

Clause 119. The method of clause 118, wherein the cannula can be adjusted while unloading the at least one single elongated element into the channel of the Schlemm's canal of the eye.

Clause 120. The method of clause 118 or 119, further comprising withdrawing the cannula from the eye after unloading the at least one single elongated element in the cannula into the Schlemm's canal of the eye.

Clause 121. The method of any one of clauses 103 to 120, wherein the at least one single elongated element comprises a coil shape.

Clause 122. The method of any one of clauses 103 to 121, wherein the at least one single elongated element comprises repeating helical turns.

Clause 123. The method of any one of clauses 103 to 122, wherein the at least one single elongated element comprises repeating serpentine loops.

Clause 124. The method of any one of clauses 103 to 123, wherein at least one end of the at least one single elongated element has a geometry different than that of the remainder of the at least one single elongated element.

Clause 125. The method of any one of clauses 103 to 124, wherein both ends of the at least one single elongated element have a geometry different than that of a central region of the at least one single elongated element.

Clause 126. The method of any one of clauses 103 to 125, wherein the at least one single elongated element comprises at least one end configured to form a wound coil.

Clause 127. The method of clause 126, wherein the wound coil is tightly wound, wherein the wound coil has a pitch from about 0.15 mm to about 1 mm.

Clause 128. The method of clause 126 or 127, wherein the wound coil is configured to have sufficient strength and space between adjacent turns to permit fluid flow therethrough.

Clause 129. The method of any one of clauses 103 to 128, further comprising mounting the at least one single elongated element over one or more of a guidewire, a coring wire, or a pusher prior to implanting the at least one single elongated element.

Clause 130. The method of clause 129, wherein the one or more of the guidewire, the coring wire, or the pusher is configured to stabilize the at least one single elongated element to enable advancement over the arc greater than approximately 140 degrees.

Clause 131. The method of any one of clauses 103 to 130, further comprising suspending the at least one single elongated element in a fluid.

Clause 132. The method of clause 131, wherein the fluid comprises a viscoelastic fluid.

Clause 133. The method of clause 131 or 132, wherein the fluid is configured to facilitate advancement of the at least one single elongated element along the arc of the circumference.

Clause 134. The method of any one of clauses 131 to 133, wherein suspending the at least one single elongated element occurs prior to implanting the at least one single elongated element.

Clause 135. The method of any one of clauses 131 to 134, wherein suspending the at least one single elongated element occurs after implanting the at least one single elongated element, such that the fluid is delivered to the channel after the at least one single elongated element is implanted.

Clause 136. The method of any one of clauses 131 to 135, wherein suspending the at least one single elongated element partially occurs after implanting the at least one single elongated element, such that the fluid is partially delivered to the channel after the at least one single elongated element is implanted.

Clause 137. The method of any one of clauses 131 to 136, wherein suspending comprises depositing the fluid into a delivery device housing the at least one single elongated element.

Clause 138. The method of any one of clauses 131 to 137, wherein suspending comprises implanting the at least one single elongated element into Schlemm's canal after the fluid has been inserted into Schlemm's canal.

Clause 139. The method of any one of clauses 131 to 138, wherein the fluid is configured to provide hydraulic support and advancement force to enable advancement of the at least one single elongated element over the arc greater than approximately 140 degrees.

Clause 140. The method of any one of clauses 103 to 139, wherein the at least one single elongated element comprises the device of clauses 1 to 54.

Clause 141. A fluid to enabled delivery system for introducing at least one single elongated element into the eye comprising:
  a. a delivery device;
  b. a fluid disposed within the delivery device;
  c. the at least one single elongated element configured for radial expansion when inserted into a channel of the Schlemm's canal, wherein the at least one single elongated element is configured to be disposed within the fluid within the delivery device;
  d, wherein a first adherence of the fluid to the at least one single elongated element is greater than a second adherence of the fluid to the delivery device.

Clause 142. The delivery system of clause 141, wherein the fluid medium comprises a viscoelastic fluid.

Clause 143. The delivery system of clause 141 or 142, wherein the at least one single elongated element comprises openings or surface features designed to capture and retain the fluid medium during advancement.

Clause 144. The delivery system of any one of clauses 141 to 143, wherein the delivery device comprises a cannula.

Clause 145. The delivery system of clause 144, wherein the delivery device further comprises a fluid propeller to propel the fluid medium to advance the at least one single elongated element along a path of the cannula.

Clause 146. The delivery system of any one of clauses 144 or 145, further comprising a mechanical pusher for advancing the fluid medium and the at least one single elongated element within the cannula.

Clause 147. The delivery system of clause 146, wherein the mechanical pusher comprises a coring wire, clearing wire, push rod, push rod, or any combination thereof.

Clause 148. The delivery system of any one of clauses 144 to 147, wherein the cannula is configured to deliver the fluid medium and the at least one single elongated element into Schlemm's canal.

Clause 149. The delivery system of any one of clauses 144 to 148, wherein the fluid medium is propelled through the cannula by manual compression of a plunger or syringe.

Clause 150. The delivery system of any one of clauses 144 to 149, wherein the cannula is configured to deliver the fluid medium and the at least one single elongated element into an arc of Schlemm's canal with a predetermined radius.

Clause 151. The delivery system of any one of clauses 144 to 150, wherein the at least one single elongated element is configured to extend beyond the distal end of the cannula upon reaching its intended placement within the eye.

Clause 152. The delivery system of any one of clauses 141 to 151, wherein the fluid medium is advanced solely by the force generated by the fluid propulsion system.

Clause 153. The delivery system of any one of clauses 141 to 152, wherein the fluid medium is advanced by a combination of the fluid propulsion system and an additional mechanical system.

Clause 154. The delivery system of any one of clauses 141 to 153, wherein the single elongated element is configured to follow an arc of a circumference of the channel, wherein the arc subtends an angle comprising a degree of arc greater than approximately 140 degrees.

Clause 155. The delivery system of clause 154, wherein the arc subtends an angle comprising a degree of arc greater than approximately 160 degrees.

Clause 156. The delivery system of clause 154 or 155, wherein the arc subtends an angle comprising a degree of arc greater than approximately 180 degrees.

Clause 157. The delivery system of any one of clauses 154 to 156, wherein the arc subtends an angle comprising a degree of arc between approximately 300 degrees and approximately 360 degrees.

Clause 158. The delivery system of any one of clauses 154 to 157, wherein the at least one single elongated element further comprises a second elongated element separate from the first single elongated element, wherein the second single elongated element is configured to follow a second arc of the circumference of the channel, and wherein the second arc subtends a second angle comprising a second degree of arc.

Clause 159. The delivery system of clause 158, wherein, when the first and second elongated elements are inserted into the channel of the Schlemm's canal and non to overlapping, the degree of arc of the first arc and the degree of arc of the second arc combined comprise a combined degree of arc between approximately 300 degrees and approximately 360 degrees.

Clause 160. The delivery system of any one of clauses 141 to 159, wherein the fluid extends distally to the at least one single elongated element, proximally to the at least one single elongated element, or both.

Clause 161. The delivery system of any one of clauses 141 to 160, wherein the fluid is configured to surround the at least one single elongated element.

Clause 162. The delivery system of any one of clauses 141 to 161, wherein the fluid comprises a drug.

Clause 163. The delivery system of clause 162, wherein the drug comprises one or more of prostaglandin analogs, beta to blockers, alpha agonists, carbonic anhydrase inhibitors, rho kinase inhibitors, or neuroprotective agents.

Clause 164. The delivery system of clause 162 or 163, wherein the fluid is configured to be combined with biodegradable polymers configured for controlled and sustained drug release over a predetermined period of time.

Clause 165. The delivery system of clause 164, wherein the biodegradable polymers comprise one or more of polylactic acid (PLA), polyglycolic acid (PGA), poly(lactic to co to glycolic acid) (PLGA), polycaprolactone (PCL), or copolymers thereof.

Clause 166. The delivery system of clause 164 or 165, wherein the drug is configured to be encapsulated in microspheres or nanoparticles formed by the biodegradable polymers to achieve sustained drug release.

Clause 167. The delivery system of any one of clauses 164 to 166, wherein the controlled release of the drug is configured to reduce intraocular pressure (IOP) and protect the optic nerve.

Clause 168. The delivery system of any one of clauses 141 to 167, further comprising a guidewire, wherein the guidewire and the fluid are configured to advance the at least one single elongated element together.

Clause 169. The delivery system of any one of clauses 141 to 168, wherein the at least one single elongated element comprises the device of clauses 1 to 54.

Clause 170. A device for treating glaucoma comprising:
a. a helical, flexible, single elongated element comprising a proximal end operatively coupled to a viscoelastic fluid delivery system;
b. wherein the single elongated element comprises an atraumatic exterior surface configured to reduce friction when encased in viscoelastic fluid;
c. wherein the single elongated element is configured to follow an arc of a circumference of a channel of the Schlemm's canal, wherein the arc subtends an angle comprising a degree of arc greater than approximately 80 degrees.

Clause 171. The device of clause 170, wherein the elongate body comprises a biocompatible material.

Clause 172. The device of clause 170 or 171, wherein the single elongated element is configured to advance through the Schlemm's canal via injection of the viscoelastic fluid which lubricates the Schlemm's canal walls and utilizes surface tension to propel the single elongated element forward.

Clause 173. The device of any one of clauses 170 to 172, wherein the device may include multiple lumens or channels to deliver additional therapeutic agents alongside the viscoelastic fluid.

Clause 174. The device of any one of clauses 170 to 173, wherein the single elongated element comprises a polymeric material selected from a group comprising polyvinylidene fluoride, polyvinylidene difluoride (PVDF), polyvinylpyrrolidone (PVP), polyurethane, polyethylene glycol (PEG), polylactic acid (PLA), polycaprolactone (PCL), polyglycolic acid (PGA), polymethylmethacrylate (PMMA), polyacrylates, polyamide, polyimide, polyesters, silicone, and carbon to composites.

Clause 175. The device of any one of clauses 170 to 174, wherein the single elongated element comprises a metal or metal alloy selected from a group comprising nitinol, titanium, stainless steel, cobalt to chrome alloy, gold, platinum, silver, iridium, tantalum, tungsten, aluminum, and vanadium.

Clause 176. The device of any one of clauses 170 to 175, wherein the arc subtends an angle comprising a degree of arc greater than approximately 140 degrees.

Clause 177. The device of any one of clauses 170 to 176, wherein the arc subtends an angle comprising a degree of arc greater than approximately 160 degrees.

Clause 178. The device of any one of clauses 170 to 177, wherein the arc subtends an angle comprising a degree of arc greater than approximately 180 degrees.

Clause 179. The device of any one of clauses 170 to 178, wherein the arc subtends an angle comprising a degree of arc between approximately 300 degrees and approximately 360 degrees.

Clause 180. The device of any one of clauses 170 to 179, wherein the single elongated element is configured to be delivered using a guidewire and the viscoelastic fluid.

Clause 181. The device of any one of clauses 170 to 180, wherein the viscoelastic fluid comprises a drug.

Clause 182. The device of clause 181, wherein the drug comprises one or more of prostaglandin analogs, beta to blockers, alpha agonists, carbonic anhydrase inhibitors, rho kinase inhibitors, or neuroprotective agents.

Clause 183. The device of clause 181 or 182, wherein the viscoelastic fluid is configured to be combined with biodegradable polymers configured for controlled and sustained drug release over a predetermined period of time.

Clause 184. The device of clause 183, wherein the biodegradable polymers comprise one or more of polylactic acid (PLA), polyglycolic acid (PGA), poly(lactic to co to glycolic acid) (PLGA), polycaprolactone (PCL), or copolymers thereof.

Clause 185. The device of clause 183 or 184, wherein the drug is configured to be encapsulated in microspheres or nanoparticles formed by the biodegradable polymers to achieve sustained drug release.

Clause 186. The device of any one of clauses 183 to 185, wherein the controlled release of the drug is configured to reduce intraocular pressure (IOP) and protect the optic nerve.

Clause 187. The device of any one of clauses 170 to 186, wherein the single elongated element comprises the device of clauses 1 to 54.

Clause 188. A method for treating glaucoma comprising:
a. coating at least one single elongated element with a viscoelastic fluid, wherein the at least one single elongated element comprises a proximal end configured to be operatively connected to a viscoelastic fluid delivery system; and
b. inserting the at least one coated single elongated element into Schlemm's canal, wherein the at least one coated single elongated element is configured to enhance aqueous humor outflow and reduce intraocular pressure via the viscoelastic fluid.

Clause 189. The method of clause 188, further comprising coupling the at least one single elongated element to the viscoelastic fluid delivery system.

Clause 190. The method of clause 188 or 189, wherein the viscoelastic fluid delivery system comprises the viscoelastic fluid, a cannula, and a plunger.

Clause 191. The method of any one of clauses 188 to 190, wherein coating a at least one single elongated element comprises injecting the viscoelastic fluid through the at least one single elongated element, thereby lubricating the Schlemm's canal and facilitating the device's advancement without mechanical propulsion.

Clause 192. The method of any one of clauses 188 to 191, further comprising monitoring intraocular pressure and adjusting a delivery rate of the viscoelastic fluid in response to real to time measurements.

Clause 193. The method of any one of clauses 188 to 192, wherein the viscoelastic fluid is delivered in a continuous or pulsatile manner to optimize the treatment efficacy and device advancement.

Clause 194. The method of any one of clauses 188 to 193, wherein the device comprises pressure to sensing systems and visual markers for precise navigation and placement within the Schlemm's canal.

Clause 195. The method of any one of clauses 188 to 194, wherein the at least one single elongated element comprises a first single elongated element configured to follow a first arc of a circumference of the channel, wherein the arc subtends an angle comprising a degree of arc greater than approximately 140 degrees.

Clause 196. The method of clause 195, wherein the viscoelastic fluid is configured to provide hydraulic support and advancement force to enable advancement of the at least one single elongated element over the degree of arc greater than approximately 140 degrees.

Clause 197. The method of clause 195 or 196, wherein the arc subtends an angle comprising a degree of arc greater than approximately 160 degrees.

Clause 198. The method of any one of clauses 195 to 197, wherein the arc subtends an angle comprising a degree of arc greater than approximately 180 degrees.

Clause 199. The method of any one of clauses 195 to 198, wherein the arc subtends an angle comprising a degree of arc between approximately 300 degrees and approximately 360 degrees.

Clause 200. The method of any one of clauses 195 to 199, wherein the at least one single elongated element further comprises a second elongated element separate from the first single elongated element, wherein the second single elongated element is configured to follow a second arc of the circumference of the channel, and wherein the second arc subtends a second angle comprising a second degree of arc.

Clause 201. The method of clause 200, wherein, when the first and second elongated elements are inserted into the channel of the Schlemm's canal and non to overlapping, the degree of arc of the first arc and the degree of arc of the second arc combined comprise a combined degree of arc between approximately 300 degrees and approximately 360 degrees.

Clause 202. The method of any one of clauses 188 to 201, wherein the fluid is configured to facilitate advancement of the at least one single elongated element along the arc of the circumference.

Clause 203. The method of any one of clauses 188 to 202, wherein coating the at least one single elongated element occurs prior to inserting the at least one single elongated element.

Clause 204. The method of any one of clauses 188 to 203, wherein coating the at least one single elongated element occurs after inserting the at least one single elongated element, such that the viscoelastic fluid is delivered to the Schlemm's canal after the at least one single elongated element is inserted.

Clause 205. The method of any one of clauses 188 to 204, wherein coating the at least one single elongated element partially occurs after inserting the at least one single elongated element, such that the viscoelastic fluid is partially delivered to the Schlemm's canal after the at least one single elongated element is inserted.

Clause 206. The method of any one of clauses 188 to 205, wherein coating comprises depositing the viscoelastic fluid into the viscoelastic fluid delivery system housing the at least one single elongated element.

Clause 207. The method of any one of clauses 188 to 206, wherein coating comprises inserting the at least one single elongated element into Schlemm's canal after the viscoelastic fluid has been inserted into Schlemm's canal.

Clause 208. The method of any one of clauses 188 to 207, further comprising advancing the at least one single elongated element through Schlemm's canal, wherein the at least one single elongated element is configured to be advanced using the viscoelastic fluid and a guidewire.

Clause 209. The method of any one of clauses 188 to 208, wherein the at least one single elongated element comprises the device of clauses 1 to 54.

Clause 210. A system for delivering a stent into Schlemm's canal, the system comprising:
  a. at least one single elongated element configured for radial expansion when inserted into a channel of the Schlemm's canal,
  b. a guidewire, wherein the guidewire is configured to guide the at least one single elongated element along a first arc of a circumference of the channel, wherein the arc subtends an angle comprising a degree of arc at least about 140 degrees.

Clause 211. The system of clause 210, wherein the guidewire comprises a polymeric material selected from a group comprising polyvinylidene fluoride, polyvinylidene difluoride (PVDF), polyvinylpyrrolidone (PVP), polyurethane, polyethylene glycol (PEG), polylactic acid (PLA), polycaprolactone (PCL), polyglycolic acid (PGA), polymethylmethacrylate (PMMA), polyacrylates, polyamide, polyimide, polyesters, silicone, and carbon to composites.

Clause 212. The system of clause 210 or 211, wherein the guidewire comprises a metal or metal alloy selected from a group comprising nitinol, titanium, stainless steel, cobalt to chrome alloy, gold, platinum, silver, iridium, tantalum, tungsten, aluminum, and vanadium.

Clause 213. The system of any one of clauses 210 to 212, wherein the first arc subtends an angle comprising a degree of arc greater than approximately 160 degrees.

Clause 214. The system of any one of clauses 210 to 213, wherein the first arc subtends an angle comprising a degree of arc greater than approximately 180 degrees.

Clause 215. The system of any one of clauses 210 to 214, wherein the first arc subtends an angle comprising a degree of arc between approximately 300 degrees and approximately 360 degrees.

Clause 216. The system of any one of clauses 210 to 215, wherein the at least one single elongated element further comprises a second elongated element separate from the first single elongated element, wherein the second single elongated element is configured to follow a second arc of the circumference of the channel, and wherein the second arc subtends a second angle comprising a second degree of arc.

Clause 217. The system of clause 216, wherein, when the first and second elongated elements are inserted into the channel of the Schlemm's canal and non to overlapping, the degree of arc of the first arc and the degree of arc of the second arc combined comprise a combined degree of arc between approximately 300 degrees and approximately 360 degrees.

Clause 218. The system of any one of clauses 210 to 217, wherein a tip of the guidewire is rounded.

Clause 219. The system of any one of clauses 210 to 218, wherein the guidewire is pre to formed into an arc.

Clause 220. The system of any one of clauses 210 to 219, wherein the guidewire is configured to be retracted.

Clause 221. The system of any one of clauses 210 to 220, wherein the guidewire comprises a hollow guidewire and an inner guidewire.

Clause 222. The system of clause 221, wherein the inner guidewire is configured to expand the hollow guidewire.

Clause 223. The system of clause 222, wherein the expanded hollow guidewire is configured to exert a frictional force on the at least one single elongated element, such that the hollow guidewire and the at least one single elongated element advance together.

Clause 224. The system of clause 223, wherein the inner guidewire is configured to be retracted to reduce the frictional force on the at least one single elongated element, thereby releasing and delivering the at least one single elongated element from the delivery device.

Clause 225. The system of any one of clauses 221 to 224, wherein the inner guidewire comprises a hooked distal end that is configured to hold the at least one single elongated element in place at the distal end of the inner guidewire.

Clause 226. The system of any one of clauses 210 to 225, further comprising a fluid, wherein the guidewire and the fluid are configured to advance the at least one single elongated element together.

Clause 227. The system of clause 226, wherein the fluid is a viscoelastic fluid.

Clause 228. The system of clauses 226 or 227, wherein the fluid comprises a drug.

Clause 229. The system of clause 228, wherein the drug comprises one or more of prostaglandin analogs, beta to blockers, alpha agonists, carbonic anhydrase inhibitors, rho kinase inhibitors, or neuroprotective agents.

Clause 230. The system of clause 228 or 229, wherein the fluid is configured to be combined with biodegradable polymers configured for controlled and sustained drug release over a predetermined period of time.

Clause 231. The system of clause 230, wherein the biodegradable polymers comprise one or more of polylactic acid (PLA), polyglycolic acid (PGA), poly(lactic to co to glycolic acid) (PLGA), polycaprolactone (PCL), or copolymers thereof.

Clause 232. The system of clause 230 or 231, wherein the drug is configured to be encapsulated in microspheres or nanoparticles formed by the biodegradable polymers to achieve sustained drug release.

Clause 233. The system of any one of clauses 230 to 232, wherein the controlled release of the drug is configured to reduce intraocular pressure (IOP) and protect the optic nerve.

Clause 234. The system of any one of clauses 210 to 233, wherein the at least one single elongated element comprises the device of clauses 1 to 54.

Clause 235. A method for delivering a stent into Schlemm's canal, the method comprising:
a. advancing at least one single elongated element and a guidewire through a channel of the Schlemm's canal, wherein the at least one single elongated element comprises a first single elongated element configured to follow a first arc of a circumference of the channel, wherein the arc subtends an angle comprising a degree of arc greater than approximately 140 degrees, wherein the at least one single elongated element is mounted over a guidewire disposed in a delivery device, wherein the at least one single elongated element is configured to radially expand when inserted into the channel, wherein a proximal end of the guidewire is coupled to the delivery device; and
b. retracting the guidewire out of the channel;
c. wherein the at least one single elongated element is configured to remain in the channel.

Clause 236. The method of clause 235, wherein the guidewire comprises a hollow guidewire and an inner guidewire.

Clause 237. The method of clause 236, further comprising expanding the hollow guidewire with the inner guidewire after mounting the at least one single elongated element to stabilize the location of the at least one single elongated element over the guidewire.

Clause 238. The method of clause 237, wherein the expanded hollow guidewire is configured to exert a frictional force on the at least one single elongated element, such that the hollow guidewire and the at least one single elongated element advance together.

Clause 239. The method of clause 238, further comprising retracting the inner guidewire to reduce the frictional force on the at least one single elongated element after advancing the at least one single elongated element, thereby allowing retraction of the guidewire and delivery of the at least one single elongated element from the delivery device.

Clause 240. The method of any one of clauses 236 to 239, wherein the inner guidewire comprises a hooked distal end that is configured to hold the at least one single elongated element in place at the distal end of the inner guidewire.

Clause 241. The method of clause 240, wherein retracting the guidewire comprises straightening the hooked distal end of the inner guidewire.

Clause 242. The method of any one of clauses 235 to 241, wherein the arc subtends an angle comprising a degree of arc greater than approximately 160 degrees.

Clause 243. The method of any one of clauses 235 to 242, wherein the arc subtends an angle comprising a degree of arc greater than approximately 180 degrees.

Clause 244. The method of any one of clauses 235 to 243, wherein the arc subtends an angle comprising a degree of arc between approximately 300 degrees and approximately 360 degrees.

Clause 245. The method of any one of clauses 235 to 244, wherein the at least one single elongated element further comprises a second elongated element separate from the first single elongated element, wherein the second single elongated element is configured to follow a second arc of the circumference of the channel, and wherein the second arc subtends a second angle comprising a second degree of arc.

Clause 246. The method of clause 245, wherein, when the first and second elongated elements are inserted into the channel of the Schlemm's canal and non to overlapping, the degree of arc of the first arc and the degree of arc of the second arc combined comprise a combined degree of arc between approximately 300 degrees and approximately 360 degrees.

Clause 247. The method of any one of clauses 235 to 246, wherein advancing the at least one single elongated element comprises advancing the at least one single elongated element using a fluid and the guidewire.

Clause 248. The method of clause 247, wherein the fluid is a viscoelastic fluid.

Clause 249. The method of any one of clauses 235 to 248, wherein advancing the at least one single elongated element and the guidewire comprises pushing the at least one single elongated element and the guidewire with a pusher at least partially disposed in the delivery device.

Clause 250. The method of any one of clauses 235 to 249, wherein the at least one single elongated element comprises the device of clauses 1 to 54.

Clause 251. A method for delivering a stent into Schlemm's canal, the method comprising:
  a. detachably coupling a helical single elongated element to a pusher disposed inside a delivery device, wherein the helical single elongated element is configured to radially expand when inserted into a channel of the Schlemm's canal;
  b. advancing the helical single elongated element into the channel;
  c. adjusting the advancement of the helical single elongated element into the channel; and
  d. uncoupling the helical single elongated element from the pusher;
  e, wherein the delivery device is configured to block retraction of the helical single elongated element.

Clause 252. The method of clause 251, wherein detachably coupling comprises inserting the pusher into a coil of the helical single elongated element.

Clause 253. The method of clause 251 or 252, wherein detachably coupling the helical single elongated element to the pusher comprises detachably coupling by one or more of friction between a tip of the pusher and the helical single elongated element; by a retractable suture loop; by a mechanical hook, loop, or coil; or by an interfacing material configured to provide adherence.

Clause 254. The method of any one of clauses 251 to 253, wherein adjusting comprises advancing and retracting the helical single elongated element to achieve a predetermined degree of arc of insertion.

Clause 255. The method of any one of clauses 251 to 254, wherein blocking retraction of the helical single elongated element does not block retraction of the pusher.

Clause 256. The method of any one of clauses 251 to 255, further comprising withdrawing the pusher and the delivery device from the channel.

Clause 257. The method of any one of clauses 251 to 256, wherein the pusher is configured to be disposed centrally within the helical single elongated element.

Clause 258. The method of any one of clauses 251 to 257, wherein the pusher is disposed off to center within the helical single elongated element.

Clause 259. The method of any one of clauses 251 to 258, wherein advancing the helical single elongated element comprises advancing the helical single elongated element using a fluid and the pusher.

Clause 260. The method of clause 259, wherein the fluid is a viscoelastic fluid.

Clause 261. The method of any one of clauses 251 to 260, wherein the helical single elongated element comprises the device of clauses 1 to 54.

Clause 262. A system for delivering a stent into Schlemm's canal, the system comprising:
  a. at least one helical single elongated element configured for radial expansion when inserted into a channel of the Schlemm's canal;
  b. a pusher detachably coupled to the at least one helical single elongated element and disposed in a delivery device, wherein the pusher is configured to control advancement, retraction, and adjustment of the at least one helical single elongated element in the channel;
  c. wherein the delivery device is configured to uncouple the pusher from the at least one helical single elongated element when the at least one helical single elongated element reaches a predetermined location in the channel.

Clause 263. The system of clause 262, wherein the delivery device comprises a cannula.

Clause 264. The system of clause 262 or 263, wherein the pusher is configured to be disposed centrally within the at least one helical single elongated element.

Clause 265. The system of clause 262 or 264, wherein the pusher is disposed off to center within the at least one helical single elongated element.

Clause 266. The system of any one of clauses 262 to 265, wherein the delivery device is configured to uncouple the pusher from the at least one helical single elongated element by bracing a proximal end of the at least one helical single elongated element against a distal end of the delivery device such that the at least one helical single elongated element does not retract while retracting the pusher.

Clause 267. The system of any one of clauses 262 to 266, wherein the pusher and the at least one helical single elongated element are detachably coupled by one or more of friction between a tip of the pusher and the at least one helical single elongated element; by a retractable suture loop; by a mechanical hook, loop, or coil; or by an interfacing material configured to provide adherence.

Clause 268. The system of any one of clauses 262 to 267, wherein a tip of the pusher is configured to direct the helical single elongated element away from a centerline of the delivery device.

Clause 269. The system of any one of clauses 262 to 268, wherein the pusher comprises a polymeric material selected from a group comprising polyvinylidene fluoride, polyvinylidene difluoride (PVDF), polyvinylpyrrolidone (PVP), polyurethane, polyethylene glycol (PEG), polylactic acid (PLA), polycaprolactone (PCL), polyglycolic acid (PGA), polymethylmethacrylate (PMMA), polyacrylates, polyamide, polyimide, polyesters, silicone, and carbon to composites.

Clause 270. The system of any one of clauses 262 to 269, wherein the pusher comprises a metal or metal alloy selected from a group comprising nitinol, titanium, stainless steel, cobalt to chrome alloy, gold, platinum, silver, iridium, tantalum, tungsten, aluminum, and vanadium.

Clause 271. The system of any one of clauses 262 to 270, wherein the delivery device comprises a polymeric material selected from a group comprising polyvinylidene fluoride, polyvinylidene difluoride (PVDF), polyvinylpyrrolidone (PVP), polyurethane, polyethylene glycol (PEG), polylactic acid (PLA), polycaprolactone (PCL), polyglycolic acid (PGA), polymethylmethacrylate (PMMA), polyacrylates, polyamide, polyimide, polyesters, silicone, and carbon to composites.

Clause 272. The system of any one of clauses 262 to 271, wherein the delivery device comprises a metal or metal alloy selected from a group comprising nitinol, titanium, stainless steel, cobalt to chrome alloy, gold, platinum, silver, iridium, tantalum, tungsten, aluminum, and vanadium.

Clause 273. The system of any one of clauses 262 to 272, wherein the pusher is configured to facilitate advancement of the at least one helical single elongated element into Schlemm's canal.

Clause 274. The system of any one of clauses 262 to 273, wherein the at least helical one single elongated element comprises a first helical single elongated element configured to follow a first arc of a circumference of the channel, wherein the arc subtends an angle comprising a degree of arc greater than approximately 140 degrees.

Clause 275. The system of clause 274, wherein the arc subtends an angle comprising a degree of arc greater than approximately 160 degrees.

Clause 276. The system of clauses 274 or 275, wherein the arc subtends an angle comprising a degree of arc greater than approximately 180 degrees.

Clause 277. The system of any one of clauses 274 to 276, wherein the arc subtends an angle comprising a degree of arc between approximately 300 degrees and approximately 360 degrees.

Clause 278. The system of any one of clauses 274 to 277, wherein the at least one single elongated element further comprises a second elongated element separate from the first single elongated element, wherein the second single elongated element is configured to follow a second arc of the circumference of the channel, and wherein the second arc subtends a second angle comprising a second degree of arc.

Clause 279. The system of clause 278, wherein, when the first and second elongated elements are inserted into the channel of the Schlemm's canal and non to overlapping, the degree of arc of the first arc and the degree of arc of the second arc combined comprise a combined degree of arc between approximately 300 degrees and approximately 360 degrees.

Clause 280. The system of any one of clauses 262 to 279, further comprising a fluid, wherein the pusher and the fluid are configured to advance the at least one helical single elongated element together.

Clause 281. The system of clause 280, wherein the fluid is a viscoelastic fluid.

Clause 282. The system of any one of clauses 262 to 281, wherein the at least one helical single elongated element comprises the device of clauses 1 to 54.

Clause 283. A delivery device for delivering at least one single elongated element into Schlemm's canal, the delivery device comprising:
 a. a pusher tube configured to advance the at least one single elongated element into Schlemm's canal;
 b. a locking tube configured to block retraction of the at least one single elongated element into the delivery device from Schlemm's canal;
 c. a slider coupled to a guidewire, wherein the at least one single elongated element is mounted on the guidewire, wherein the slider is configured to advance and retract the guidewire.

Clause 284. The delivery device of clause 283, wherein the delivery device comprises a polymeric material selected from a group comprising polyvinylidene fluoride, polyvinylidene difluoride (PVDF), polyvinylpyrrolidone (PVP), polyurethane, polyethylene glycol (PEG), polylactic acid (PLA), polycaprolactone (PCL), polyglycolic acid (PGA), polymethylmethacrylate (PMMA), polyacrylates, polyamide, polyimide, polyesters, silicone, and carbon to composites.

Clause 285. The delivery device of clause 283 or 284, wherein the delivery device comprises a metal or metal alloy selected from a group comprising nitinol, titanium, stainless steel, cobalt to chrome alloy, gold, platinum, silver, iridium, tantalum, tungsten, aluminum, and vanadium.

Clause 286. The delivery device of any one of clauses 283 to 285, wherein the at least one single elongated element comprises a first single elongated element configured to follow a first arc of a circumference of the channel, wherein the arc subtends an angle comprising a degree of arc greater than approximately 140 degrees.

Clause 287. The system of clause 286, wherein the arc subtends an angle comprising a degree of arc greater than approximately 160 degrees.

Clause 288. The system of clause 286 or 287, wherein the arc subtends an angle comprising a degree of arc greater than approximately 180 degrees.

Clause 289. The system of any one of clauses 286 to 288, wherein the arc subtends an angle comprising a degree of arc between approximately 300 degrees and approximately 360 degrees.

Clause 290. The system of any one of clauses 286 to 289, herein the at least one single elongated element further comprises a second elongated element separate from the first single elongated element, wherein the second single elongated element is configured to follow a second arc of the circumference of the channel, and wherein the second arc subtends a second angle comprising a second degree of arc.

Clause 291. The system of clause 290, wherein, when the first and second elongated elements are inserted into the channel of the Schlemm's canal and non to overlapping, the degree of arc of the first arc and the degree of arc of the second arc combined comprise a combined degree of arc between approximately 300 degrees and approximately 360 degrees.

Clause 292. The delivery device of any one of clauses 283 to 291, wherein a tip of the guidewire is rounded.

Clause 293. The delivery device of any one of clauses 283 to 292, wherein the slider is configured to advance the guidewire and the at least one single elongated element together.

Clause 294. The delivery device of any one of clauses 283 to 293, wherein the locking tube is configured to minimize motion of the at least one single elongated element as the delivery device is withdrawn from Schlemm's canal.

Clause 295. The delivery device of any one of clauses 283 to 294, wherein the guidewire is pre to formed into an arc.

Clause 296. The delivery device of any one of clauses 283 to 295, wherein the guidewire comprises a hollow guidewire and an inner guidewire.

Clause 297. The delivery device of clause 296, wherein the inner guidewire is configured to expand the hollow guidewire.

Clause 298. The delivery device of clause 297, wherein the expanded hollow guidewire is configured to exert a frictional force on the at least one single elongated element, such that the hollow guidewire and the at least one single elongated element advance together.

Clause 299. The delivery device of clause 298, wherein the inner guidewire is configured to be retracted to reduce the frictional force on the at least one single elongated element, thereby releasing the at least one single elongated element from the delivery device.

Clause 300. The delivery device of any one of clauses 296 to 299, wherein the inner guidewire comprises a hooked distal end that is configured to hold the at least one single elongated element in place at the distal end of the inner guidewire.

Clause 301. The delivery device of any one of clauses 283 to 300, wherein the at least one single elongated element comprises the device of clauses 1 to 54.

Clause 302. A system for treating glaucoma in a patient, comprising:
 a delivery device;

a first single elongated element configured for radial expansion when inserted into a channel of the Schlemm's canal; and a second single elongated element configured for radial expansion when inserted into a channel of the Schlemm's canal;

wherein the first single elongated element and the second single elongated element are each configured to follow an arc of a circumference of the channel;

wherein the first single elongated element follows a first arc of the circumference, wherein the first arc subtends an angle comprising a first degree of arc;

wherein the second single elongated element follows a second arc of the circumference, wherein the second arc subtends an angle comprising a second degree of arc; and wherein each of the first degree of arc and the second degree of arc are greater than approximately 140 degrees.

Clause 303. The system of clause 302, wherein each of the first degree of arc and the second degree of arc are greater than approximately 160 degrees.

Clause 304. The system of clause 302 or 303, wherein each of the first degree of arc and the second degree of arc are greater than approximately 180 degrees.

Clause 305. The system of any one of clauses 302 to 304, wherein the first degree of arc and the second degree of arc combined are between approximately 300 degrees and approximately 360 degrees.

Clause 306. The system of any one of clauses 302 to 305, wherein the first arc and the second arc subtend similar angles.

Clause 307. The system of clause 306, wherein a first length of the first single elongated element and a second length of the second single elongated element are similar.

Clause 308. The system of any one of clauses 302 to 307, wherein the first arc and the second arc subtend different angles.

Clause 309. The system of clause 308, wherein a first length of the first single elongated element and a second length of the second single elongated element are different.

Clause 310. The system of any one of clauses 302 to 309, wherein the first single elongated element, the second elongated element, or both have a length in a coiled form from about 9 mm to about 16 mm.

Clause 311. The system of any one of clauses 302 to 310, wherein the first single elongated element and the second single elongated element are configured to be delivered in opposite directions of the circumference of the channel.

Clause 312. The system of any one of clauses 302 to 311, wherein the delivery device is configured to deliver one or both of the first single elongated element and the second single elongated element.

Clause 313. The system of any one of clauses 302 to 312, wherein the delivery device comprises a cannula.

Clause 314. The system of any one of clauses 302 to 313, wherein the delivery device comprises a plunger wire.

Clause 315. The system of clause 314, wherein the plunger wire comprises a sliding wire.

Clause 316. The system of any one of clauses 302 to 315, wherein the delivery device is temperature controlled by an external energy source.

Clause 317. The system of clause 316, wherein the temperature of the delivery device alters a shape of the first single elongated element, the second single elongated element, or both.

Clause 318. The system of any one of clauses 302 to 317, wherein the delivery device comprises a deployment mechanism.

Clause 319. The system of clause 318, wherein the deployment mechanism can be configured to measure an advancement of the first single elongated element, the second single elongated element, or both through the delivery device.

Clause 320. The system of any one of clauses 302 to 319, wherein the delivery device comprises a cartridge that is configured to store the first single elongated element, the second single elongated element, or both.

Clause 321. The system of clause 320, wherein the first single elongated element and the second single elongated element are individually dispensed from the cartridge.

Clause 322. The system of clause 320 or 321, wherein the first single elongated element, the second single elongated element, or both are preloaded into the cartridge.

Clause 323. The system of any one of clauses 302 to 322, wherein the delivery device comprises a guidewire.

Clause 324. The system of any one of clauses 302 to 323, wherein the delivery device can be powered by a piezo to electric or a vibrational motor.

Clause 325. The system of any one of clauses 302 to 324, wherein the single elongated element comprises measurement markers that serve as a reference point in during insertion of the first single elongated element, the second single elongated element, or both by the delivery device.

Clause 326. The system of any one of clauses 302 to 325, further comprising a scanning system.

Clause 327. The system of clause 326, wherein the scanning system is configured to conduct imaging and biometric measurements to determine a necessary size of the first single elongated element, the second single elongated element, or both to be used for the patient.

Clause 328. The system of any one of clauses 302 to 327, further comprising an intraocular pressure reader, wherein the intraocular pressure reader can be used to determine a necessary size the first single elongated element, the second single elongated element, or both for a reduction of an intraocular pressure in the patient.

Clause 329. The system of any one of clauses 302 to 328, wherein the delivery device is configured to be filled with a fluid, wherein the first single elongated element, the second single elongated element, or both are configured to float within the fluid.

Clause 330. The system of clause 329, wherein the fluid comprises a viscoelastic fluid.

Clause 331. The system of clause 329 or 330, wherein the fluid is configured to advance the first single elongated element, the second single elongated element, or both along the channel.

Clause 332. The system of any one of clauses 329 to 331, wherein the fluid is configured to provide hydraulic support and advancement force to enable advancement of the first single elongated element, the second single elongated element, or both over the arc greater than approximately 140 degrees.

Clause 333. The system of any one of clauses 329 to 332, wherein the fluid is configured to minimize injury to a wall of the channel from the first single elongated element, the second single elongated element, or both.

Clause 334. The system of any one of clauses 329 to 333, wherein the fluid is configured to minimize friction between a wall of the channel and the first single elongated element, the second single elongated element, or both.

Clause 335. The system of any one of clauses 329 to 334, wherein the fluid comprises a drug.

Clause 336. The system of clause 335, wherein the drug comprises one or more of prostaglandin analogs, beta to blockers, alpha agonists, carbonic anhydrase inhibitors, rho kinase inhibitors, or neuroprotective agents.

Clause 337. The system of clause 335 or 336, wherein the fluid is configured to be combined with biodegradable polymers configured for controlled and sustained drug release over a predetermined period of time.

Clause 338. The system of clause 337, wherein the biodegradable polymers comprise one or more of polylactic acid (PLA), polyglycolic acid (PGA), poly(lactic to co to glycolic acid) (PLGA), polycaprolactone (PCL), or copolymers thereof.

Clause 339. The system of clause 337 or 338, wherein the drug is configured to be encapsulated in microspheres or nanoparticles formed by the biodegradable polymers to achieve sustained drug release.

Clause 340. The system of any one of clauses 337 to 339, wherein the controlled release of the drug is configured to reduce intraocular pressure (IOP) and protect the optic nerve.

Clause 341. The system of any one of clauses 302 to 340, wherein the delivery device is configured to be coupled to one or more of a pusher, a guidewire, a coring wire, or a cleaning wire.

Clause 342. The system of clause 341, wherein the one or more of a pusher, a guidewire, a coring wire, or a cleaning wire are configured to advance the single elongated element along the channel.

Clause 343. The system of any one of clauses 302 to 342, wherein the first single elongated element, the second single elongated element, or both are configured to be mounted over a guidewire prior to implanting the single elongated element.

Clause 344. The system of clause 343, wherein the guidewire is configured to stabilize the first single elongated element, the second single elongated element, or both to enable advancement over the arc greater than approximately 140 degrees.

Clause 345. The system of clause 343 or 344, wherein one or more of the guidewire, the first single elongated element, or the second single elongated element comprise anchoring features.

Clause 346. The system of clause 345, wherein a tip of the first single elongated element and a tip of the second single elongated element do not comprise anchoring features.

Clause 347. The system of clause 345 or 346, wherein the anchoring features comprise one or more of loops, barbs, grooves, rings, eyelets, or hooks.

Clause 348. The system of any one of clauses 343 to 347, further comprising a pusher, wherein the pusher is configured to advance the first single elongated element, the second single elongated element, or both.

Clause 349. The system of any one of clauses 302 to 348, wherein the delivery device comprises a hollow guidewire and an inner guidewire.

Clause 350. The system of clause 349, wherein the inner guidewire is configured to expand the hollow guidewire.

Clause 351. The system of clause 350, wherein the expanded hollow guidewire is configured to exert a frictional force on the first single elongated element, the second single elongated element, or both, such that the hollow guidewire and the first single elongated element, the second single elongated element, or both advance together.

Clause 352. The system of clause 351, wherein the inner guidewire is configured to be retracted to reduce the frictional force on the first single elongated element, the second single elongated element, or both, thereby releasing the first single elongated element, the second single elongated element, or both from the delivery device.

Clause 353. The system of any one of clauses 349 to 352, wherein the inner guidewire comprises a hooked distal end that is configured to hold the first single elongated element, the second single elongated element, or both in place at the distal end of the inner guidewire.

Clause 354. The system of any one of clauses 302 to 353, further comprising a second delivery device.

Clause 355. The system of clause 354, wherein the second delivery device is similar to the delivery device of clauses 302 to 353.

Clause 356. The system of any one of clauses 302 to 355, wherein the first single elongated element, the second single elongated element, or both comprise the device of clauses 1 to 54.

Clause 357. A method of treating glaucoma in a patient, comprising:
- implanting a first single elongated element into a channel of a Schlemm's canal of the patient, wherein the first single elongated element is configured to radially expand when inserted into the channel; and
- implanting a second single elongated element into the channel, wherein the second single elongated element is configured to radially expand when inserted into the channel;
- wherein the first single elongated element and the second single elongated element are each configured to follow an arc of a circumference of the channel;
- wherein the first single elongated element follows a first arc of the circumference, wherein the first arc subtends an angle comprising a first degree of arc;
- wherein the second single elongated element follows a second arc of the circumference, wherein the second arc subtends an angle comprising a second degree of arc; and
- wherein each of the first degree of arc and the second degree of arc are greater than approximately 140 degrees.

Clause 358. The method of clause 357, wherein each of the first degree of arc and the second degree of arc are greater than approximately 160 degrees.

Clause 359. The method of clause 357 or 358, wherein each of the first degree of arc and the second degree of arc are greater than approximately 180 degrees.

Clause 360. The method of any one of clauses 357 to 359, wherein the first degree of arc and the second degree of arc combined are between approximately 300 degrees and approximately 360 degrees.

Clause 361. The method of any one of clauses 357 to 360, wherein the implanting of the first single elongated element, the second single elongated element, or both is facilitated by one or more of a fluid, a guidewire, or a pusher.

Clause 362. The method of any one of clauses 357 to 361, wherein the first single elongated element, the second single elongated element, or both open the channel with (i) sufficient radial strength to withstand compressive stresses exerted by the channel and (ii) sufficient void space in its structure to minimize blockage of collector channels in the channel, when the first single elongated element, the second single elongated element, or both is implanted in the channel.

Clause 363. The method of any one of clauses 357 to 362, wherein the first single elongated element, the second single elongated element, or both comprise a by to pass feature configured to permit aqueous flow between Schlemm's canal and an anterior chamber of the eye.

Clause 364. The method of clause 363, wherein the aqueous flow between Schlemm's canal and the anterior chamber of the eye is not substantially limited when the degree of arc increases.

Clause 365. The method of clause 363 or 364, wherein the by to pass feature is located at an entry, an exit, or along a length of the device.

Clause 366. The method of any one of clauses 363 to 365, wherein the by to pass feature comprises one or more of a tubular structure or helical structure located at a proximal end, distal end, or both of the single elongated element.

Clause 367. The method of any one of clauses 363 to 366, wherein the one or more of the tubular structure or helical structure comprises one or more of barbs, hooks, eyelets, grooves, rings, C to loops, or loops.

Clause 368. The method of any one of clauses 357 to 367, further comprising loading the first single elongated element, the second single elongated element, or both into a cannula prior to implanting the first single elongated element, the second single elongated element, or both.

Clause 369. The method of clauses 368, wherein implanting the first single elongated element, the second single elongated element, or both comprises inserting the cannula into an anterior chamber of an eye of the patient, through trabecular meshwork and into the channel of the Schlemm's canal of the eye.

Clause 370. The method of clause 369, wherein implanting the first single elongated element, the second single elongated element, or both comprises unloading the first single elongated element, the second single elongated element, or both in the cannula into the Schlemm's canal of the eye.

Clause 371. The method of clause 370, wherein the cannula can be adjusted while unloading the first single elongated element, the second single elongated element, or both into the channel of the Schlemm's canal of the eye.

Clause 372. The method of clause 370 or 371, further comprising withdrawing the cannula from the eye after unloading the first single elongated element, the second single elongated element, or both in the cannula into the Schlemm's canal of the eye.

Clause 373. The method of any one of clauses 357 to 372, wherein the first single elongated element, the second single elongated element, or both comprises a coil shape.

Clause 374. The method of any one of clauses 357 to 373, wherein the first single elongated element, the second single elongated element, or both comprises repeating helical turns.

Clause 375. The method of any one of clauses 357 to 374, wherein the first single elongated element, the second single elongated element, or both comprises repeating serpentine loops.

Clause 376. The method of any one of clauses 357 to 375, wherein at least one end of the first single elongated element, the second single elongated element, or both has a geometry different than that of the remainder of the first single elongated element, the second single elongated element, or both.

Clause 377. The method of any one of clauses 357 to 376, wherein both ends of the first single elongated element, the second single elongated element, or both have a geometry different than that of a central region of the first single elongated element, the second single elongated element, or both.

Clause 378. The method of any one of clauses 357 to 377, wherein the first single elongated element, the second single elongated element, or both comprise at least one end configured to form a wound coil.

Clause 379. The method of clause 378, wherein the wound coil is tightly wound, wherein the wound coil has a pitch from about 0.15 mm to about 1 mm.

Clause 380. The method of clause 378 or 379, wherein the wound coil is configured to have sufficient strength and space between adjacent turns to permit fluid flow therethrough.

Clause 381. The method of any one of clauses 357 to 380, further comprising mounting the first single elongated element, the second single elongated element, or both over one or more of a guidewire, a coring wire, or a pusher prior to implanting the first single elongated element, the second single elongated element, or both.

Clause 382. The method of clause 381, wherein the one or more of the guidewire, the coring wire, or the pusher is configured to stabilize the first single elongated element, the second single elongated element, or both to enable advancement over the arc greater than approximately 140 degrees.

Clause 383. The method of any one of clauses 357 to 382, further comprising suspending the single elongated element in a fluid.

Clause 384. The method of clause 383, wherein the fluid comprises a viscoelastic fluid.

Clause 385. The method of clause 383 or 384, wherein the fluid is configured to facilitate advancement of the first single elongated element, the second single elongated element, or both along the arc of the circumference.

Clause 386. The method of any one of clauses 383 to 385, wherein suspending the first single elongated element, the second single elongated element, or both occurs prior to implanting the first single elongated element, the second single elongated element, or both.

Clause 387. The method of any one of clauses 383 to 386, wherein suspending the first single elongated element, the second single elongated element, or both occurs after implanting the first single elongated element, the second single elongated element, or both, such that the fluid is delivered to the channel after the first single elongated element, the second single elongated element, or both are implanted.

Clause 388. The method of any one of clauses 383 to 387, wherein suspending the first single elongated element, the second single elongated element, or both partially occurs after implanting the first single elongated element, the second single elongated element, or both, such that the fluid is partially delivered to the channel after the first single elongated element, the second single elongated element, or both are implanted.

Clause 389. The method of any one of clauses 383 to 388, wherein suspending comprises depositing the fluid into a delivery device housing the first single elongated element, the second single elongated element, or both.

Clause 390. The method of any one of clauses 383 to 389, wherein suspending comprises implanting the first single elongated element, the second single elongated element, or both into Schlemm's canal after the fluid has been inserted into Schlemm's canal.

Clause 391. The method of any one of clauses 383 to 390, wherein the fluid is configured to provide hydraulic support and advancement force to enable advancement of the first single elongated element, the second single elongated element, or both over the arc greater than approximately 140 degrees.

Clause 392. The method of any one of clauses 357 to 391, wherein the single elongated element comprises the device of clauses 1 to 54.

While embodiments of the present disclosure have been shown and described herein, it will be obvious to those skilled in the art that such embodiments are provided by way of example only. It is not intended that the present disclosure be limited by the specific examples provided within the specification. While the present disclosure has been described with reference to the aforementioned specification, the descriptions and illustrations of the embodiments herein are not meant to be construed in a limiting sense. Numerous variations, changes, and substitutions will now occur to those skilled in the art without departing from the present disclosure. Furthermore, it shall be understood that all aspects of the present disclosure are not limited to the specific depictions, configurations or relative proportions set forth herein which depend upon a variety of conditions and variables. It should be understood that various alternatives to the embodiments of the present disclosure described herein may be employed in practicing the present disclosure. It is therefore contemplated that the present disclosure shall also cover any such alternatives, modifications, variations, or equivalents. It is intended that the following claims define the scope of the present disclosure and that methods and structures within the scope of these claims and their equivalents be covered thereby.

What is claimed is:

1. A method for delivering a stent into Schlemm's canal, the method comprising:
   a. detachably coupling a helical single elongated element to a pusher disposed inside a delivery device;
   b. advancing the helical single elongated element into a channel of the Schlemm's canal;
   c. adjusting the advancement of the helical single elongated element into the channel; and
   d. uncoupling the helical single elongated element from the pusher, such that the helical single elongated element is inserted into the channel to radially expand or maintain patency of the channel;
   e, wherein the delivery device is configured to block retraction of the helical single elongated element by bracing a proximal end of the helical single elongated element against a distal end of the delivery device such that the helical single elongated element does not retract while retracting the pusher.

2. The method of claim 1, wherein detachably coupling comprises inserting a full diameter of the pusher into a coil of the helical single elongated element.

3. The method of claim 1, wherein detachably coupling the helical single elongated element to the pusher comprises detachably coupling by one or more of friction between a tip of the pusher and the helical single elongated element; a retractable suture loop; a mechanical hook, loop, or coil; or an interfacing material configured to provide adherence.

4. The method of claim 1, wherein adjusting comprises advancing and retracting the helical single elongated element to achieve a predetermined degree of arc of insertion.

5. The method of claim 1, wherein blocking retraction of the helical single elongated element does not block retraction of the pusher.

6. The method of claim 1, further comprising withdrawing the pusher and the delivery device from the channel.

7. The method of claim 1, wherein the pusher is configured to be disposed centrally within the helical single elongated element.

8. The method of claim 1, wherein the pusher is disposed off-center within the helical single elongated element.

9. The method of claim 1, wherein advancing the helical single elongated element comprises advancing the helical single elongated element using a fluid and the pusher.

10. The method of claim 9, wherein the fluid is a viscoelastic fluid.

11. The method of claim 1, wherein the helical single elongated element is configured to follow an arc of a circumference of the channel, wherein the arc subtends an angle comprising a degree of arc greater than approximately 140 degrees.

12. A system for delivering a stent into Schlemm's canal, the system comprising:
   a. at least one helical single elongated element configured to radially expand or maintain patency of a channel of the Schlemm's canal when inserted into the channel; and
   b. a pusher detachably coupled to the at least one helical single elongated element and disposed in a delivery device, wherein the pusher is configured to control advancement, retraction, and adjustment of the at least one helical single elongated element in the channel;
   c. wherein the delivery device is configured to uncouple the pusher from the at least one helical single elongated element when the at least one helical single elongated element reaches a predetermined location in the channel by bracing a proximal end of the at least one helical single elongated element against a distal end of the delivery device such that the at least one helical single elongated element does not retract while retracting the pusher.

13. The system of claim 12, wherein the delivery device comprises a cannula.

14. The system of claim 12, wherein the pusher is configured to be disposed centrally within the at least one helical single elongated element.

15. The system of claim 12, wherein the pusher is disposed off-center within the at least one helical single elongated element.

16. The system of claim 12, wherein the pusher and the at least one helical single elongated element are detachably coupled by one or more of friction between a tip of the pusher and the at least one helical single elongated element; a retractable suture loop; a mechanical hook, loop, or coil; or an interfacing material configured to provide adherence.

17. The system of claim 12, wherein a tip of the pusher is configured to direct the helical single elongated element away from a centerline of the delivery device.

18. The system of claim 12, wherein one or more of the at least one helical single elongated element, the delivery device, or the pusher comprises a polymeric material selected from a group comprising polyvinylidene fluoride, polyvinylidene difluoride (PVDF), polyvinylpyrrolidone (PVP), polyurethane, polyethylene glycol (PEG), polylactic acid (PLA), polycaprolactone (PCL), polyglycolic acid (PGA), polymethylmethacrylate (PMMA), polyacrylates, polyamide, polyimide, polyesters, silicone, and carbon composites.

19. The system of claim 12, wherein one or more of the at least one helical single elongated element, the delivery device, or the pusher comprises a metal or metal alloy selected from a group comprising nitinol, titanium, stainless steel, cobalt-chrome alloy, gold, platinum, silver, iridium, tantalum, tungsten, aluminum, and vanadium.

20. The system of claim 12, wherein the pusher is configured to facilitate advancement of the at least one helical single elongated element into the Schlemm's canal.

21. The system of claim 12, wherein the at least one helical single elongated element comprises a first helical single elongated element configured to follow a first arc of a circumference of the channel, wherein the arc subtends an angle comprising a degree of arc greater than approximately 140 degrees.

22. The system of claim 21, wherein the arc subtends an angle comprising a degree of arc greater than approximately 160 degrees.

23. The system of claim 21, wherein the at least one helical single elongated element further comprises a second helical elongated element separate from the first helical single elongated element, wherein the second helical single elongated element is configured to follow a second arc of the circumference of the channel, and wherein the second arc subtends a second angle comprising a second degree of arc.

24. The system of claim 23, wherein, when the first and second helical single elongated elements are inserted into the channel of the Schlemm's canal and non-overlapping, the degree of arc of the first arc and the degree of arc of the second arc combined comprise a combined degree of arc between approximately 300 degrees and approximately 360 degrees.

25. The system of claim 12, further comprising a fluid, wherein the pusher and the fluid are configured to advance the at least one helical single elongated element together.

26. The system of claim 25, wherein the fluid is a viscoelastic fluid.

27. The system of claim 12, wherein the at least one helical single elongated element comprises a pre-shaped metal or polymeric filament, wherein the pre-shaped metal filament comprises a shape memory alloy wire.

28. The system of claim 12, wherein the at least one helical single elongated element is configured to curve along its length when free from constraint to conform to a shape of the channel, wherein the curvature of the at least one helical single elongated element is configured to substantially not exert force on the Schlemm's canal when the at least one helical single elongated element is inserted into the channel.

29. The system of claim 12, wherein at least one end of the at least one helical single elongated element has a geometry different than that of the remainder of the at least one helical single elongated element.

* * * * *